United States Patent
He et al.

(10) Patent No.: US 11,898,898 B2
(45) Date of Patent: Feb. 13, 2024

(54) SYSTEMS AND METHODS FOR ACOUSTIC MONITORING

(71) Applicant: Delos Living LLC, New York, NY (US)

(72) Inventors: Chuan He, Bellevue, WA (US); Yiwen Di, Shanghai (CN)

(73) Assignee: Delos Living LLC, New York, NY (US)

( * ) Notice: Subject to any disclaimer, the term of this patent is extended or adjusted under 35 U.S.C. 154(b) by 0 days.

(21) Appl. No.: 17/442,916

(22) PCT Filed: Mar. 24, 2020

(86) PCT No.: PCT/US2020/024377
§ 371 (c)(1),
(2) Date: Sep. 24, 2021

(87) PCT Pub. No.: WO2020/198183
PCT Pub. Date: Oct. 1, 2020

(65) Prior Publication Data
US 2022/0196460 A1      Jun. 23, 2022

Related U.S. Application Data

(60) Provisional application No. 62/823,459, filed on Mar. 25, 2019.

(51) Int. Cl.
*G01H 7/00*      (2006.01)

(52) U.S. Cl.
CPC ......... *G01H 7/00* (2013.01); *H04R 2201/401* (2013.01)

(58) Field of Classification Search
CPC .................... G01H 7/00; H04R 2201/401
See application file for complete search history.

(56) References Cited

U.S. PATENT DOCUMENTS

| 628,351 A | 7/1899 | O'Neill |
|---|---|---|
| 828,733 A | 8/1906 | Fuller |

(Continued)

FOREIGN PATENT DOCUMENTS

| CA | 2307458 | 11/2001 |
|---|---|---|
| CA | 2740939 | 3/2010 |

(Continued)

OTHER PUBLICATIONS

"Sound Matters How to achieve acoustic comfort in the contemporary office", Jan. 2012, GSA Public Buildings Service, Available online: https://www.gsa.gov/cdnstatic/GSA_Sound_Matters_%28Dec_2011%29_508.pdf, pp. 1-42. (Year: 2012).*

(Continued)

*Primary Examiner* — Daniel R Sellers
(74) *Attorney, Agent, or Firm* — Fitch, Even, Tabin & Flannery LLP

(57) ABSTRACT

Systems, methods, and apparatus are provided for monitoring and improving one or more acoustic parameters in single- and multi-zone habitable environments. The acoustic monitoring system includes a built structure, a central control circuit, an acoustic control system, an environment database, an electronic user device, and acoustic sensor arrays which are installed within the built structure. To facilitate the sensor installation process, the built structure may be delineated into one or more zones. The central control circuit may be configured to instruct the installation of acoustic sensor arrays in particular zones within the built structure to obtain improved or even optimal or near optimal acoustic sensor array placement.

21 Claims, 8 Drawing Sheets

(56) References Cited

U.S. PATENT DOCUMENTS

| | | | |
|---|---|---|---|
| 853,033 A | 5/1907 | Roberts |
| 1,648,277 A | 11/1927 | Korb |
| 1,856,969 A | 5/1932 | Reiter |
| 2,184,644 A | 12/1939 | Homberger |
| 3,483,302 A | 12/1969 | Ashkenas |
| RE27,027 E | 1/1971 | Cristofv |
| 3,621,838 A | 11/1971 | Harding |
| 3,678,337 A | 7/1972 | Grauvogel |
| 3,782,006 A | 1/1974 | Symmes |
| 3,901,215 A | 8/1975 | John |
| 3,910,701 A | 10/1975 | Henderson |
| 4,074,124 A | 2/1978 | Maute |
| 4,122,334 A | 10/1978 | Owens |
| 4,135,116 A | 1/1979 | Smith |
| 4,233,545 A | 11/1980 | Webster |
| 4,236,101 A | 11/1980 | Luchaco |
| 4,247,766 A | 1/1981 | Warren |
| 4,273,999 A | 6/1981 | Pierpoint |
| 4,308,911 A | 1/1982 | Mandl |
| 4,319,088 A * | 3/1982 | Orfield .................. H04K 3/825 381/73.1 |
| 4,587,459 A | 5/1986 | Blake |
| 4,638,853 A | 1/1987 | Papak |
| 4,701,669 A | 10/1987 | Head |
| 4,717,343 A | 1/1988 | Densky |
| D295,934 S | 5/1988 | Dyrhood |
| 4,755,140 A | 7/1988 | Rimland |
| 4,770,636 A | 9/1988 | Buschke |
| 4,803,625 A | 2/1989 | Fu |
| 4,828,609 A | 5/1989 | Anderson |
| 4,853,854 A | 8/1989 | Behar |
| 4,858,609 A | 8/1989 | Cole |
| 4,882,166 A | 11/1989 | Graham |
| 4,893,291 A | 1/1990 | Bick |
| 4,911,166 A | 3/1990 | Leighton |
| 4,911,737 A | 3/1990 | Yehl |
| 4,916,642 A | 4/1990 | Kaiser |
| 4,930,505 A | 6/1990 | Hatje |
| 4,938,582 A | 7/1990 | Leslie |
| 4,947,928 A | 8/1990 | Parker |
| 4,953,784 A | 9/1990 | Yasufuku |
| 4,962,687 A | 10/1990 | Belliveau |
| D312,018 S | 11/1990 | Giesy |
| 5,006,985 A | 4/1991 | Ehret |
| 5,010,777 A | 4/1991 | Yehl |
| 5,017,142 A | 5/1991 | Bemis |
| 5,043,840 A | 8/1991 | Yehl |
| 5,079,682 A | 1/1992 | Roberts |
| 5,079,726 A | 1/1992 | Keller |
| 5,082,173 A | 1/1992 | Poehlman |
| 5,086,385 A | 2/1992 | Launey |
| 5,092,669 A | 3/1992 | Anderson |
| 5,103,391 A | 4/1992 | Barrett |
| 5,103,408 A | 4/1992 | Greenberg |
| 5,121,030 A | 6/1992 | Schott |
| 5,176,133 A | 1/1993 | Czeisler |
| 5,193,900 A | 3/1993 | Yano |
| 5,197,941 A | 3/1993 | Whitaker |
| 5,207,580 A | 5/1993 | Strecher |
| 5,214,736 A | 5/1993 | Uemiya |
| D335,978 S | 6/1993 | Grahn |
| 5,230,629 A | 7/1993 | Buschke |
| 5,250,799 A | 10/1993 | Werner |
| 5,259,553 A | 11/1993 | Shyu |
| 5,285,356 A | 2/1994 | Skene |
| 5,285,430 A | 2/1994 | Decker |
| D345,071 S | 3/1994 | Gould |
| 5,290,200 A | 3/1994 | Kiser |
| 5,292,345 A | 3/1994 | Gerardo |
| 5,295,491 A | 3/1994 | Gevins |
| 5,304,212 A | 4/1994 | Czeisler |
| 5,343,121 A | 8/1994 | Terman |
| 5,344,068 A | 9/1994 | Haessig |
| 5,344,324 A | 9/1994 | O'Donnell |
| 5,350,977 A | 9/1994 | Hamamoto |
| 5,357,170 A | 10/1994 | Luchaco |
| 5,374,876 A | 12/1994 | Horibata |
| 5,377,258 A | 12/1994 | Bro |
| 5,395,042 A | 3/1995 | Riley |
| 5,433,923 A | 7/1995 | Wolverton |
| 5,436,535 A | 7/1995 | Yang |
| 5,462,485 A | 10/1995 | Kinkead |
| D364,762 S | 12/1995 | Compton |
| D365,484 S | 12/1995 | Trattner, Jr. |
| 5,473,537 A | 12/1995 | Glazer |
| 5,503,637 A | 4/1996 | Kyricos |
| 5,545,192 A | 8/1996 | Czeisler |
| 5,589,741 A | 12/1996 | Terman |
| 5,596,994 A | 1/1997 | Bro |
| 5,648,656 A | 7/1997 | Begemann |
| 5,692,501 A | 12/1997 | Minturn |
| 5,721,471 A | 2/1998 | Begemann |
| 5,722,418 A | 3/1998 | Bro |
| 5,724,987 A | 3/1998 | Gevins |
| 5,742,516 A | 4/1998 | Olcerst |
| 5,749,365 A | 5/1998 | Magill |
| D396,581 S | 8/1998 | Schubert |
| 5,791,982 A | 8/1998 | Curry |
| 5,805,267 A | 9/1998 | Goldman |
| 5,813,863 A | 9/1998 | Sloane |
| D401,085 S | 11/1998 | Grant |
| 5,833,466 A | 11/1998 | Borg |
| 5,861,717 A | 1/1999 | Begemann |
| 5,892,690 A | 4/1999 | Boatman |
| 5,908,301 A | 6/1999 | Lutz |
| 5,911,581 A | 6/1999 | Reynolds |
| 5,919,217 A | 7/1999 | Hughes |
| 5,937,387 A | 8/1999 | Summerell |
| 5,954,510 A | 9/1999 | Merrill |
| 5,963,294 A | 10/1999 | Schiffer |
| 5,967,789 A | 10/1999 | Segel |
| 5,976,010 A | 11/1999 | Reese |
| 6,053,936 A | 4/2000 | Koyama |
| 6,055,480 A | 4/2000 | Nevo |
| D424,356 S | 5/2000 | Hahn |
| 6,118,230 A | 9/2000 | Fleischmann |
| 6,135,970 A | 10/2000 | Kadhiresan |
| 6,166,496 A | 12/2000 | Lys |
| 6,170,318 B1 | 1/2001 | Lewis |
| 6,197,094 B1 | 3/2001 | Thofelt |
| 6,208,905 B1 | 3/2001 | Giddings |
| 6,235,046 B1 | 5/2001 | Gerdt |
| 6,238,337 B1 | 5/2001 | Kambhatla |
| 6,269,339 B1 | 7/2001 | Silver |
| 6,280,198 B1 | 8/2001 | Calhoun |
| 6,290,140 B1 | 9/2001 | Pesko |
| 6,331,160 B1 | 12/2001 | Bardy |
| 6,340,864 B1 | 1/2002 | Wacyk |
| 6,340,868 B1 | 1/2002 | Lys |
| 6,344,641 B1 | 2/2002 | Blalock |
| 6,348,867 B1 | 2/2002 | Matti |
| 6,350,275 B1 | 2/2002 | Vreman |
| 6,369,716 B1 | 4/2002 | Abbas |
| 6,387,844 B1 | 5/2002 | Fujishima |
| 6,411,046 B1 | 6/2002 | Muthu |
| 6,416,472 B1 | 7/2002 | Cady |
| 6,417,019 B1 | 7/2002 | Mueller |
| 6,419,629 B1 | 7/2002 | Balkin |
| 6,435,878 B1 | 8/2002 | Reynolds |
| 6,439,893 B1 | 8/2002 | Byrd |
| 6,441,558 B1 | 8/2002 | Muthu |
| 6,448,550 B1 | 9/2002 | Nishimura |
| 6,448,978 B1 | 9/2002 | Salvador |
| 6,459,919 B1 | 10/2002 | Lys |
| 6,488,698 B1 | 12/2002 | Hyman |
| 6,498,440 B2 | 12/2002 | Stam |
| 6,503,462 B1 | 1/2003 | Michalakos |
| 6,507,159 B2 | 1/2003 | Muthu |
| 6,507,709 B2 | 1/2003 | Hirai |
| 6,525,658 B2 | 2/2003 | Streetman |
| 6,535,190 B2 | 3/2003 | Evanicky |
| 6,553,252 B2 | 4/2003 | Balkin |
| 6,554,439 B1 | 4/2003 | Teicher |
| 6,565,359 B2 | 5/2003 | Calhoun |

(56) References Cited

U.S. PATENT DOCUMENTS

| | | |
|---|---|---|
| 6,567,009 B2 | 5/2003 | Ohishi |
| 6,582,380 B2 | 6/2003 | Kazlausky |
| 6,583,573 B2 | 6/2003 | Bierman |
| 6,583,720 B1 | 6/2003 | Quigley |
| D477,158 S | 7/2003 | Calcerano |
| 6,589,912 B2 | 7/2003 | Kawai |
| 6,607,484 B2 | 8/2003 | Suzuki |
| 6,608,453 B2 | 8/2003 | Morgan |
| 6,610,127 B2 | 8/2003 | Lu |
| 6,614,013 B2 | 9/2003 | Pitigoi-Aron |
| 6,618,723 B1 | 9/2003 | Smith |
| 6,623,512 B1 | 9/2003 | Heller |
| 6,632,174 B1 | 10/2003 | Breznitz |
| 6,661,798 B2 | 12/2003 | Sano |
| 6,666,567 B1 | 12/2003 | Feldman |
| 6,669,481 B2 | 12/2003 | Winter |
| 6,683,419 B2 | 1/2004 | Kriparos |
| 6,691,070 B1 | 2/2004 | Williams |
| 6,711,470 B1 | 3/2004 | Hartenstein |
| 6,712,615 B2 | 3/2004 | Martin |
| 6,720,745 B2 | 4/2004 | Lys |
| 6,727,091 B2 | 4/2004 | Darlington |
| 6,738,551 B2 | 5/2004 | Noda |
| 6,743,171 B1 | 6/2004 | Bowles |
| 6,755,783 B2 | 6/2004 | Cosentino |
| 6,756,998 B1 | 6/2004 | Bilger |
| 6,757,710 B2 | 6/2004 | Reed |
| 6,769,915 B2 | 8/2004 | Murgia |
| 6,772,016 B1 | 8/2004 | Oern |
| 6,774,802 B2 | 8/2004 | Bachinski |
| 6,782,351 B2 | 8/2004 | Reichel |
| 6,806,659 B1 | 10/2004 | Mueller |
| 6,834,208 B2 | 12/2004 | Gonzales |
| 6,862,529 B2 | 3/2005 | Brown |
| 6,865,428 B2 | 3/2005 | Gonzales |
| 6,872,221 B2 | 3/2005 | Lytle |
| 6,878,191 B2 | 4/2005 | Escaffre |
| 6,879,451 B1 | 4/2005 | Hewlett |
| 6,884,078 B2 | 4/2005 | Wiig |
| 6,888,453 B2 | 5/2005 | Lutz |
| 6,888,779 B2 | 5/2005 | Mollicone |
| 6,904,508 B2 | 6/2005 | Selkirk |
| 6,912,429 B1 | 6/2005 | Bilger |
| 6,923,653 B2 | 8/2005 | Ito |
| 6,933,486 B2 | 8/2005 | Pitigoi-Aron |
| 6,955,684 B2 | 10/2005 | Savage, Jr. |
| 6,964,638 B2 | 11/2005 | Theodoracopulos |
| 6,967,565 B2 | 11/2005 | Lingemann |
| 6,991,029 B2 | 1/2006 | Orfield |
| 6,992,803 B2 | 1/2006 | Chang |
| 7,004,606 B2 | 2/2006 | Schofield |
| 7,014,336 B1 | 3/2006 | Ducharme |
| 7,024,256 B2 | 4/2006 | Krzyzanowski |
| 7,038,399 B2 | 5/2006 | Lys |
| 7,065,280 B2 | 6/2006 | Ogawa |
| 7,067,995 B2 | 6/2006 | Gunter |
| 7,081,128 B2 | 7/2006 | Hart |
| D526,512 S | 8/2006 | Hahn |
| 7,092,101 B2 | 8/2006 | Brady |
| 7,095,056 B2 | 8/2006 | Vitta |
| 7,097,111 B2 | 8/2006 | Riley |
| 7,099,723 B2 | 8/2006 | Gonzales |
| 7,113,086 B2 | 9/2006 | Shorrock |
| D530,940 S | 10/2006 | Raile |
| 7,129,855 B2 | 10/2006 | Krzyzanowski |
| 7,145,295 B1 | 12/2006 | Lee |
| 7,145,614 B2 | 12/2006 | Lee |
| 7,173,384 B2 | 2/2007 | Ludwig |
| 7,190,126 B1 | 3/2007 | Paton |
| 7,196,619 B2 | 3/2007 | Perlman |
| 7,202,613 B2 | 4/2007 | Morgan |
| 7,204,611 B2 | 4/2007 | Lukas |
| 7,213,940 B1 | 5/2007 | Van De Ven |
| 7,215,086 B2 | 5/2007 | Maxik |
| 7,224,282 B2 | 5/2007 | Terauchi |
| 7,234,943 B1 | 6/2007 | Aleali |
| 7,256,554 B2 | 8/2007 | Lys |
| 7,260,950 B2 | 8/2007 | Choi |
| 7,274,160 B2 | 9/2007 | Mueller |
| 7,288,902 B1 | 10/2007 | Melanson |
| 7,294,107 B2 | 11/2007 | Simon |
| 7,298,871 B2 | 11/2007 | Lee |
| 7,302,313 B2 | 11/2007 | Sharp |
| 7,308,296 B2 | 12/2007 | Lys |
| 7,319,298 B2 | 1/2008 | Jungwirth |
| 7,324,874 B2 | 1/2008 | Jung |
| 7,327,337 B2 | 2/2008 | Callahan |
| 7,328,243 B2 | 2/2008 | Yeager |
| 7,347,818 B2 | 3/2008 | Simon |
| 7,348,949 B2 | 3/2008 | Lee |
| D566,428 S | 4/2008 | Kester |
| 7,354,172 B2 | 4/2008 | Chemel |
| 7,358,679 B2 | 4/2008 | Lys |
| 7,364,583 B2 | 4/2008 | Rose |
| 7,366,989 B2 | 4/2008 | Naik |
| 7,369,903 B2 | 5/2008 | Diederiks |
| 7,387,405 B2 | 6/2008 | Ducharme |
| 7,415,310 B2 | 8/2008 | Bovee |
| 7,446,303 B2 | 11/2008 | Maniam |
| 7,453,217 B2 | 11/2008 | Lys |
| 7,457,834 B2 | 11/2008 | Jung |
| 7,507,091 B1 | 3/2009 | Aleali |
| 7,520,634 B2 | 4/2009 | Ducharme |
| 7,524,279 B2 | 4/2009 | Auphan |
| 7,534,255 B1 | 5/2009 | Streeter |
| 7,536,388 B2 | 5/2009 | Jung |
| 7,545,267 B2 | 6/2009 | Stortoni |
| 7,553,039 B2 | 6/2009 | Harris |
| 7,556,604 B2 | 7/2009 | Murata |
| 7,557,521 B2 | 7/2009 | Lys |
| 7,558,546 B2 | 7/2009 | Johnson |
| 7,567,956 B2 | 7/2009 | Yu |
| 7,572,028 B2 | 8/2009 | Mueller |
| 7,573,210 B2 | 8/2009 | Ashdown |
| 7,574,320 B2 | 8/2009 | Corwin |
| 7,577,915 B2 | 8/2009 | Hunter |
| 7,621,871 B2 | 11/2009 | Downs, III |
| 7,624,028 B1 | 11/2009 | Brown |
| 7,647,285 B2 | 1/2010 | Heckerman |
| 7,652,582 B2 | 1/2010 | Littell |
| 7,659,673 B2 | 2/2010 | Lys |
| 7,676,280 B1 | 3/2010 | Bash |
| 7,679,281 B2 | 3/2010 | Kim |
| 7,680,745 B2 | 3/2010 | Hunter |
| 7,689,437 B1 | 3/2010 | Teller |
| 7,725,842 B2 | 5/2010 | Bronkema |
| 7,759,854 B2 | 7/2010 | Miller |
| 7,766,503 B2 | 8/2010 | Heiking |
| 7,767,280 B2 | 8/2010 | Klasen-Memmer |
| 7,772,965 B2 | 8/2010 | Farhan |
| 7,779,097 B2 | 8/2010 | Lamkin |
| 7,792,920 B2 | 9/2010 | Istvan |
| 7,827,039 B2 | 11/2010 | Butcher |
| 7,828,205 B2 | 11/2010 | Cronin |
| 7,837,472 B1 | 11/2010 | Elsmore |
| 7,839,275 B2 | 11/2010 | Spalink |
| 7,840,310 B2 | 11/2010 | Orfield |
| 7,843,353 B2 | 11/2010 | Pan |
| 7,845,823 B2 | 12/2010 | Mueller |
| 7,848,945 B2 | 12/2010 | Rozell |
| D632,102 S | 2/2011 | Sato |
| 7,878,810 B2 | 2/2011 | Kuntz |
| D634,952 S | 3/2011 | Gile |
| 7,901,071 B1 | 3/2011 | Kulas |
| 7,906,789 B2 | 3/2011 | Jung |
| 7,914,172 B2 | 3/2011 | Nagara |
| 7,918,406 B2 | 4/2011 | Rosen |
| 7,918,407 B2 | 4/2011 | Patch |
| 7,925,673 B2 | 4/2011 | Beard |
| 7,953,678 B2 | 5/2011 | Hunter |
| 7,967,731 B2 | 6/2011 | Kil |
| 7,973,759 B2 | 7/2011 | Huang |
| 7,977,904 B2 | 7/2011 | Berman |
| 7,987,490 B2 | 7/2011 | Ansari |

(56) References Cited

U.S. PATENT DOCUMENTS

| | | |
|---|---|---|
| 8,025,687 B2 | 9/2011 | Streeter |
| 8,028,706 B2 | 10/2011 | Skene |
| 8,035,320 B2 | 10/2011 | Sibert |
| 8,038,615 B2 | 10/2011 | Gobeyn |
| 8,042,049 B2 | 10/2011 | Killian |
| 8,064,295 B2 | 11/2011 | Palmer |
| 8,066,405 B2 | 11/2011 | Simon |
| 8,081,216 B2 | 12/2011 | Cheung |
| 8,083,675 B2 | 12/2011 | Robinson |
| 8,086,407 B2 | 12/2011 | Chan |
| 8,095,153 B2 | 1/2012 | Jenkins |
| 8,100,552 B2 | 1/2012 | Spero |
| 8,100,746 B2 | 1/2012 | Heidel |
| 8,137,108 B2 | 3/2012 | Hamway |
| 8,140,391 B2 | 3/2012 | Jacobi |
| 8,143,792 B2 | 3/2012 | Joo |
| 8,147,302 B2 | 4/2012 | Desrochers |
| 8,150,707 B2 | 4/2012 | Hayet |
| 8,154,398 B2 | 4/2012 | Rolf |
| 8,159,150 B2 | 4/2012 | Ashdown |
| 8,172,153 B1 | 5/2012 | Kennedy |
| 8,188,873 B2 | 5/2012 | Barth |
| 8,200,744 B2 | 6/2012 | Jung |
| 8,202,095 B2 | 6/2012 | Shankle |
| 8,219,115 B1 | 7/2012 | Nelissen |
| 8,226,418 B2 | 7/2012 | Lycas |
| D666,123 S | 8/2012 | Sichello |
| 8,253,349 B2 | 8/2012 | Shteynberg |
| 8,271,575 B2 | 9/2012 | Hunter |
| 8,292,468 B2 | 10/2012 | Narendran |
| 8,296,408 B2 | 10/2012 | Anke |
| 8,301,482 B2 | 10/2012 | Reynolds |
| 8,308,784 B2 | 11/2012 | Streeter |
| 8,321,192 B2 | 11/2012 | Boyce |
| 8,344,665 B2 | 1/2013 | Verfuerth |
| 8,352,408 B2 | 1/2013 | Guillama |
| 8,358,214 B2 | 1/2013 | Amigo |
| 8,359,208 B2 | 1/2013 | Slutzky |
| 8,380,359 B2 | 2/2013 | Duchene |
| 8,385,812 B2 | 2/2013 | Bertelsen |
| 8,392,025 B2 | 3/2013 | Orfield |
| 8,429,223 B2 | 4/2013 | Gilley |
| 8,436,556 B2 | 5/2013 | Eisele |
| 8,446,275 B2 | 5/2013 | Utter, II |
| 8,449,300 B2 | 5/2013 | Lycas |
| 8,454,729 B2 | 6/2013 | Mittelmark |
| 8,469,547 B2 | 6/2013 | Paolini |
| 8,484,153 B2 | 7/2013 | Mott |
| 8,490,006 B1 | 7/2013 | Reeser |
| 8,497,871 B2 | 7/2013 | Zulch |
| 8,506,612 B2 | 8/2013 | Ashdown |
| 8,508,169 B2 | 8/2013 | Zaharchuk |
| 8,515,785 B2 | 8/2013 | Clark |
| 8,527,213 B2 | 9/2013 | Kailas |
| 8,540,515 B2 | 9/2013 | Williams |
| 8,543,244 B2 | 9/2013 | Keeling |
| 8,543,665 B2 | 9/2013 | Ansari |
| 8,558,466 B2 | 10/2013 | Curasi |
| 8,558,687 B2 | 10/2013 | Haupt |
| 8,560,344 B2 | 10/2013 | Earles |
| 8,609,121 B2 | 12/2013 | Averett |
| 8,622,560 B2 | 1/2014 | Di Trapani |
| 8,630,741 B1 | 1/2014 | Matsuoka |
| 8,632,209 B2 | 1/2014 | Graeber |
| 8,640,038 B1 | 1/2014 | Reeser |
| 8,655,717 B2 | 2/2014 | Schwarzberg |
| 8,660,861 B2 | 2/2014 | Chun |
| 8,662,897 B2 | 3/2014 | Sims, Jr. |
| 8,666,666 B2 | 3/2014 | Bassa |
| 8,674,608 B2 | 3/2014 | Holland |
| 8,674,842 B2 | 3/2014 | Zishaan |
| 8,690,771 B2 | 4/2014 | Wekell |
| 8,707,619 B2 | 4/2014 | Edwards |
| 8,716,952 B2 | 5/2014 | Van De Ven |
| 8,740,623 B2 | 6/2014 | Walker |
| 8,755,942 B2 | 6/2014 | Bonilla |
| 8,760,370 B2 | 6/2014 | Maxik |
| 8,783,902 B2 | 7/2014 | Takakura |
| 8,795,169 B2 | 8/2014 | Cosentino |
| 8,801,636 B2 | 8/2014 | Lewicke |
| 8,823,507 B1 | 9/2014 | Touloumtzis |
| 8,827,489 B2 | 9/2014 | Li |
| 8,836,243 B2 | 9/2014 | Eisele |
| 8,843,484 B2 | 9/2014 | Gu |
| 8,852,254 B2 | 10/2014 | Moscovici |
| 8,855,757 B2 | 10/2014 | Kapoor |
| 8,862,532 B2 | 10/2014 | Beaulieu |
| 8,870,740 B2 | 10/2014 | Clegg |
| 8,896,427 B1 | 11/2014 | Ramirez |
| 8,907,803 B2 | 12/2014 | Martin |
| 8,924,026 B2 | 12/2014 | Federspiel |
| 8,939,885 B2 | 1/2015 | Martin |
| 8,941,500 B1 | 1/2015 | Faaborg |
| 8,952,626 B2 | 2/2015 | Huang |
| 8,961,414 B2 | 2/2015 | Teller |
| 8,975,827 B2 | 3/2015 | Chobot |
| 8,979,913 B2 | 3/2015 | D Ambrosio |
| 8,986,204 B2 | 3/2015 | Pacey |
| 8,986,427 B2 | 3/2015 | Hauville |
| 9,007,877 B2 | 4/2015 | Godlieb |
| 9,010,019 B2 | 4/2015 | Mittelmark |
| 9,015,610 B2 | 4/2015 | Hunter |
| 9,020,647 B2 | 4/2015 | Johnson |
| 9,032,097 B2 | 5/2015 | Albanese |
| 9,032,215 B2 | 5/2015 | Kalofonos |
| 9,041,530 B2 | 5/2015 | Sprigg |
| 9,042,563 B1* | 5/2015 | Beaty .................... H04R 29/00 381/56 |
| 9,044,567 B2 | 6/2015 | Poirrier |
| 9,063,739 B2 | 6/2015 | Ward |
| 9,066,405 B2 | 6/2015 | Van De Ven |
| 9,068,887 B1 | 6/2015 | Bennouri |
| D734,958 S | 7/2015 | Gosling |
| 9,095,029 B2 | 7/2015 | Lu |
| D737,078 S | 8/2015 | McKinney |
| 9,098,114 B2 | 8/2015 | Potter |
| 9,104,183 B2 | 8/2015 | Zheng |
| 9,110,958 B2 | 8/2015 | Brust |
| 9,118,499 B2 | 8/2015 | Hunter |
| 9,125,257 B2 | 9/2015 | Eisele |
| 9,125,274 B1 | 9/2015 | Brunault |
| 9,131,573 B2 | 9/2015 | Maxik |
| 9,147,296 B2 | 9/2015 | Ricci |
| 9,154,559 B1 | 10/2015 | Bovee |
| 9,155,165 B2 | 10/2015 | Chobot |
| 9,204,518 B2 | 12/2015 | Jung |
| 9,220,202 B2 | 12/2015 | Maxik |
| 9,226,371 B2 | 12/2015 | Mohan |
| 9,230,064 B2 | 1/2016 | Yanev |
| 9,230,560 B2 | 1/2016 | Ehsani |
| 9,235,978 B1 | 1/2016 | Charlton |
| 9,236,026 B2 | 1/2016 | Jia |
| 9,248,309 B2 | 2/2016 | Pugh |
| 9,251,716 B2 | 2/2016 | Drane |
| 9,286,442 B2 | 3/2016 | Csoma |
| 9,297,748 B2 | 3/2016 | Risk |
| 9,306,763 B2 | 4/2016 | Tatzel |
| 9,307,608 B2 | 4/2016 | Maxik |
| 9,326,363 B2 | 4/2016 | Godlieb |
| 9,339,227 B2 | 5/2016 | D'Arcy |
| 9,345,091 B2 | 5/2016 | Pickard |
| 9,360,364 B2 | 6/2016 | Hingorani |
| 9,360,731 B2 | 6/2016 | Berman |
| 9,370,689 B2 | 6/2016 | Guillama |
| D761,598 S | 7/2016 | Goodman |
| 9,380,978 B2 | 7/2016 | Reiner |
| 9,392,665 B2 | 7/2016 | Eisele |
| 9,401,098 B2 | 7/2016 | Ellis |
| 9,410,664 B2 | 8/2016 | Krames |
| 9,420,667 B2 | 8/2016 | Mohan |
| 9,420,671 B1 | 8/2016 | Sugimoto |
| 9,426,867 B2 | 8/2016 | Beghelli |
| 9,429,009 B2 | 8/2016 | Paulk |
| 9,430,617 B2 | 8/2016 | Brust |

(56) References Cited

U.S. PATENT DOCUMENTS

| | | |
|---|---|---|
| 9,430,927 B2 | 8/2016 | Yu |
| 9,450,904 B2 | 9/2016 | Wheeler |
| 9,456,482 B1 | 9/2016 | Pope |
| 9,465,392 B2 | 10/2016 | Bradley |
| 9,471,751 B1 | 10/2016 | Kahn |
| 9,473,321 B1 | 10/2016 | Bazar |
| 9,480,115 B2 | 10/2016 | Bradford |
| 9,493,112 B2 | 11/2016 | Thomas |
| 9,500,325 B2 | 11/2016 | Tong et al. |
| 9,501,049 B2 | 11/2016 | Balakrishnan |
| 9,510,426 B2 | 11/2016 | Chemel |
| 9,526,455 B2 | 12/2016 | Horseman |
| 9,528,876 B2 | 12/2016 | Micheels |
| 9,562,702 B2 | 2/2017 | Law |
| 9,576,939 B2 | 2/2017 | Roth |
| 9,589,475 B2 | 3/2017 | Lycas |
| 9,589,480 B2 | 3/2017 | Ellis |
| 9,593,861 B1 | 3/2017 | Burnett |
| 9,595,118 B2 | 3/2017 | Maxik |
| 9,602,589 B1 * | 3/2017 | Jackson ............. G06F 16/9032 |
| 9,609,724 B2 | 3/2017 | Bulut |
| 9,615,429 B2 | 4/2017 | Roosli |
| 9,636,520 B2 | 5/2017 | Pedersen |
| 9,642,209 B2 | 5/2017 | Eisele |
| 9,655,195 B2 | 5/2017 | Tseng |
| 9,659,150 B2 | 5/2017 | Greene |
| 9,661,715 B2 | 5/2017 | Van De Ven |
| RE46,430 E | 6/2017 | Sibert |
| 9,672,335 B2 | 6/2017 | Shuart |
| 9,672,472 B2 | 6/2017 | Snyder |
| 9,687,187 B2 | 6/2017 | Dagum |
| 9,693,724 B2 | 7/2017 | Dagum |
| 9,694,496 B2 | 7/2017 | Martinson |
| 9,696,052 B2 | 7/2017 | Malchiondo |
| 9,699,874 B2 | 7/2017 | Phillips |
| 9,703,931 B2 | 7/2017 | Hinkel |
| 9,715,242 B2 | 7/2017 | Pillai |
| 9,717,459 B2 | 8/2017 | Sereno |
| 9,730,298 B2 | 8/2017 | Vangeel |
| 9,734,293 B2 | 8/2017 | Collins, Jr. |
| 9,734,542 B2 | 8/2017 | Ji |
| 9,737,842 B2 | 8/2017 | Matlin |
| 9,750,116 B2 | 8/2017 | Witzgall |
| 9,763,592 B2 | 9/2017 | Le |
| 9,774,697 B2 | 9/2017 | Li |
| 9,788,373 B1 | 10/2017 | Chowdhury |
| 9,791,129 B2 | 10/2017 | Dennis |
| 9,794,355 B2 | 10/2017 | Moghaddam |
| 9,801,259 B2 | 10/2017 | Rasmussen |
| 9,820,656 B2 | 11/2017 | Olivier |
| 9,827,439 B2 | 11/2017 | Maxik |
| 9,839,083 B2 | 12/2017 | Van De Ven |
| 9,842,313 B2 | 12/2017 | B'Far |
| 9,848,811 B2 | 12/2017 | Yasumura |
| 9,870,449 B2 | 1/2018 | Rajan |
| 9,874,317 B2 | 1/2018 | Dijken |
| 9,875,667 B2 | 1/2018 | Thompson |
| 9,881,511 B1 | 1/2018 | Srinivasan |
| 9,883,563 B2 | 1/2018 | Bosua |
| 9,887,854 B2 | 2/2018 | Park |
| 9,890,969 B2 | 2/2018 | Martin |
| 9,894,729 B2 | 2/2018 | Forbis |
| 9,907,149 B1 | 2/2018 | Dolan |
| 9,909,772 B2 | 3/2018 | Bazar |
| 9,913,583 B2 | 3/2018 | Smith, Sr. |
| 9,915,438 B2 | 3/2018 | Cheatham, III |
| 9,916,474 B2 | 3/2018 | Tribble |
| 9,924,243 B2 | 3/2018 | Lupien |
| 9,933,182 B2 | 4/2018 | Alfakhrany |
| 9,939,823 B2 | 4/2018 | Ovadia |
| 9,944,519 B2 | 4/2018 | Bohler |
| 9,949,074 B2 | 4/2018 | Austraat |
| 9,952,614 B2 | 4/2018 | Hunter |
| 9,954,147 B2 | 4/2018 | Pentlehner |
| 9,955,423 B2 | 4/2018 | Kates |
| 9,955,550 B2 | 4/2018 | Baek |
| 9,958,180 B2 | 5/2018 | Mahar |
| 9,959,997 B2 | 5/2018 | Bailey |
| 9,984,590 B2 | 5/2018 | Stevens |
| 9,986,313 B2 | 5/2018 | Schwarzkopf |
| 9,992,292 B2 | 6/2018 | Gunnarsson |
| 9,993,198 B2 | 6/2018 | Dugan |
| 10,001,789 B2 | 6/2018 | Hunka |
| 10,015,865 B2 | 7/2018 | Engelen |
| 10,019,690 B2 | 7/2018 | Oobayashi |
| 10,022,556 B1 | 7/2018 | Holbert |
| 10,024,699 B2 | 7/2018 | Rapetti Mogol |
| 10,030,833 B2 | 7/2018 | Adler |
| 10,031,973 B2 | 7/2018 | Dey |
| 10,039,169 B2 | 7/2018 | Chen |
| 10,042,336 B2 | 8/2018 | Cipollo |
| 10,047,971 B2 | 8/2018 | Nyamjav |
| 10,051,707 B2 | 8/2018 | Deixler |
| 10,052,061 B2 | 8/2018 | Raymann |
| 10,054,534 B1 | 8/2018 | Nourbakhsh |
| 10,057,963 B2 | 8/2018 | Mead |
| 10,060,787 B2 | 8/2018 | Balooch |
| 10,064,255 B2 | 8/2018 | Barroso |
| 10,068,297 B2 | 9/2018 | Hull Roskos |
| 10,072,866 B2 | 9/2018 | Bazar |
| 10,075,757 B2 | 9/2018 | Ugan |
| 10,078,865 B2 | 9/2018 | Joshi |
| 10,088,577 B2 | 10/2018 | Klein |
| 10,091,017 B2 | 10/2018 | Landow |
| 10,091,303 B1 | 10/2018 | Ledvina |
| 10,092,772 B1 | 10/2018 | Makesh |
| 10,129,367 B2 | 11/2018 | Yan |
| 10,139,118 B2 | 11/2018 | Law |
| 10,154,574 B2 | 12/2018 | Yeh |
| 10,178,972 B2 | 1/2019 | Raymann |
| 10,203,267 B2 | 2/2019 | D'Orlando |
| 10,230,538 B2 | 3/2019 | Killian |
| 10,234,162 B2 | 3/2019 | Lu |
| 10,242,757 B2 | 3/2019 | Baughman |
| 10,244,606 B2 | 3/2019 | Wingren |
| 10,265,011 B2 | 4/2019 | Garnavi |
| 10,271,400 B2 | 4/2019 | Parker |
| 10,304,249 B2 | 5/2019 | Cronin |
| 10,420,912 B2 | 9/2019 | Lütz |
| 10,527,490 B2 | 1/2020 | Dumont |
| 10,561,376 B1 | 2/2020 | Kahn |
| 10,602,599 B2 | 3/2020 | Wouhaybi |
| 10,709,899 B1 | 7/2020 | Maa |
| 10,775,068 B2 | 9/2020 | Lee |
| 10,845,829 B2 | 11/2020 | Pillai |
| 10,917,259 B1 | 2/2021 | Chein |
| 10,948,348 B2 | 3/2021 | Rountree |
| 10,972,360 B2 | 4/2021 | Cahill |
| 10,976,065 B2 | 4/2021 | Kohn |
| 10,980,096 B2 | 4/2021 | Summers |
| 11,078,899 B2 | 8/2021 | Mou |
| 11,137,163 B2 | 10/2021 | Nasis |
| 11,141,688 B2 | 10/2021 | Hur |
| 11,187,419 B2 | 11/2021 | Aleti |
| 2002/0072322 A1 | 6/2002 | Sharp |
| 2002/0072859 A1 | 6/2002 | Kajimoto |
| 2002/0096121 A1 | 7/2002 | Ingman |
| 2002/0119281 A1 | 8/2002 | Higgins |
| 2002/0128864 A1 | 9/2002 | Maus |
| 2002/0163529 A1 | 11/2002 | Evanicky |
| 2002/0187082 A1 | 12/2002 | Wu |
| 2002/0192624 A1 | 12/2002 | Darby |
| 2003/0100837 A1 | 5/2003 | Lys |
| 2003/0133292 A1 | 7/2003 | Mueller |
| 2003/0199244 A1 | 10/2003 | Siddaramanna |
| 2003/0209140 A1 | 11/2003 | Kutt |
| 2003/0209501 A1 | 11/2003 | Leung |
| 2004/0002792 A1 | 1/2004 | Hoffknecht |
| 2004/0052076 A1 | 3/2004 | Mueller |
| 2004/0060677 A1 | 4/2004 | Huang |
| 2004/0065098 A1 | 4/2004 | Choi |
| 2004/0105264 A1 | 6/2004 | Spero |
| 2004/0111036 A1 | 6/2004 | Nissila |

(56) References Cited

U.S. PATENT DOCUMENTS

| | | |
|---|---|---|
| 2004/0131199 A1* | 7/2004 | Moeller .............. H04M 11/027 381/73.1 |
| 2004/0152995 A1 | 8/2004 | Cox |
| 2004/0160199 A1 | 8/2004 | Morgan |
| 2004/0176666 A1 | 9/2004 | Chait |
| 2004/0178751 A1 | 9/2004 | Mueller |
| 2004/0212321 A1 | 10/2004 | Lys |
| 2004/0222307 A1 | 11/2004 | DeLuca |
| 2004/0245351 A1 | 12/2004 | Orfield |
| 2004/0264193 A1 | 12/2004 | Okumura |
| 2004/0267385 A1 | 12/2004 | Lingemann |
| 2005/0004942 A1 | 1/2005 | Madsen |
| 2005/0053904 A1 | 3/2005 | Shephard |
| 2005/0057158 A1 | 3/2005 | Chang |
| 2005/0110416 A1 | 5/2005 | Veskovic |
| 2005/0125275 A1 | 6/2005 | Wright |
| 2005/0142524 A1 | 6/2005 | Simon |
| 2005/0151489 A1 | 7/2005 | Lys |
| 2005/0177957 A1 | 8/2005 | Long |
| 2005/0191505 A1 | 9/2005 | Akarsu |
| 2005/0200578 A1 | 9/2005 | Lee |
| 2005/0213353 A1 | 9/2005 | Lys |
| 2005/0214533 A1 | 9/2005 | Shimosaki |
| 2005/0218870 A1 | 10/2005 | Lys |
| 2005/0225976 A1 | 10/2005 | Zampini |
| 2005/0231133 A1 | 10/2005 | Lys |
| 2005/0236998 A1 | 10/2005 | Mueller |
| 2005/0253533 A1 | 11/2005 | Lys |
| 2005/0281531 A1 | 12/2005 | Unmehopa |
| 2006/0000257 A1 | 1/2006 | Samadpour |
| 2006/0002110 A1 | 1/2006 | Dowling |
| 2006/0017928 A1 | 1/2006 | Crowther |
| 2006/0018118 A1 | 1/2006 | Lee |
| 2006/0018428 A1 | 1/2006 | Li |
| 2006/0026972 A1 | 2/2006 | Masui |
| 2006/0074340 A1 | 4/2006 | Murata |
| 2006/0092520 A1 | 5/2006 | Buchsbaum |
| 2006/0103728 A1 | 5/2006 | Ishigami |
| 2006/0106437 A1 | 5/2006 | Czeisler |
| 2006/0111944 A1 | 5/2006 | Sirmans, Jr. |
| 2006/0154596 A1 | 7/2006 | Meneely, Jr. |
| 2006/0162552 A1 | 7/2006 | Yost |
| 2006/0172579 A1 | 8/2006 | Murphy |
| 2006/0173580 A1 | 8/2006 | Desrochers |
| 2006/0184283 A1 | 8/2006 | Lee |
| 2006/0207730 A1 | 9/2006 | Berman |
| 2006/0246149 A1 | 11/2006 | Buchholz |
| 2006/0252014 A1 | 11/2006 | Simon |
| 2007/0001617 A1 | 1/2007 | Pogodayev |
| 2007/0019815 A1 | 1/2007 | Asada |
| 2007/0024210 A1 | 2/2007 | Zwanenburg |
| 2007/0053527 A1* | 3/2007 | Barbieri .............. H04M 1/60 381/104 |
| 2007/0084937 A1 | 4/2007 | Ahmed |
| 2007/0112598 A1 | 5/2007 | Heckerman |
| 2007/0115665 A1 | 5/2007 | Mueller |
| 2007/0162858 A1 | 7/2007 | Hurley |
| 2007/0166676 A1 | 7/2007 | Bird |
| 2007/0198226 A1 | 8/2007 | Lee |
| 2007/0240437 A1 | 10/2007 | Yonezawa |
| 2007/0276270 A1 | 11/2007 | Tran |
| 2007/0288247 A1 | 12/2007 | Mackay |
| 2008/0031832 A1 | 2/2008 | Wakefield |
| 2008/0103561 A1 | 5/2008 | Moscovici |
| 2008/0116780 A1 | 5/2008 | Kupper |
| 2008/0129174 A1 | 6/2008 | Schafer |
| 2008/0146892 A1 | 6/2008 | LeBoeuf |
| 2008/0182506 A1 | 7/2008 | Jackson |
| 2008/0187894 A1 | 8/2008 | Cady |
| 2008/0224121 A1 | 9/2008 | Bose |
| 2008/0225021 A1 | 9/2008 | Hekstra |
| 2008/0246629 A1 | 10/2008 | Tsui |
| 2008/0277486 A1 | 11/2008 | Seem |
| 2008/0294012 A1 | 11/2008 | Kurtz |
| 2008/0297027 A1 | 12/2008 | Miller |
| 2009/0015403 A1 | 1/2009 | Kuris |
| 2009/0053989 A1 | 2/2009 | Lunde |
| 2009/0065596 A1 | 3/2009 | Seem |
| 2009/0068089 A1 | 3/2009 | Hussain |
| 2009/0104086 A1 | 4/2009 | Zax |
| 2009/0115597 A1 | 5/2009 | Giacalone |
| 2009/0126382 A1 | 5/2009 | Rubino |
| 2009/0128044 A1 | 5/2009 | Nevins |
| 2009/0169425 A1 | 7/2009 | Park |
| 2009/0177613 A1 | 7/2009 | Martinez |
| 2009/0223126 A1 | 9/2009 | Garner |
| 2009/0241496 A1 | 10/2009 | Pintault |
| 2009/0242485 A1 | 10/2009 | Cabados |
| 2009/0243517 A1 | 10/2009 | Verfuerth |
| 2009/0273470 A1 | 11/2009 | Sinkevicius |
| 2009/0278464 A1 | 11/2009 | Chung |
| 2009/0287064 A1 | 11/2009 | Dougherty, Jr. |
| 2009/0292180 A1 | 11/2009 | Mirow |
| 2009/0300673 A1 | 12/2009 | Bachet |
| 2009/0306798 A1* | 12/2009 | Moeller .............. H04K 3/825 700/94 |
| 2010/0021710 A1 | 1/2010 | Hunt |
| 2010/0084996 A1 | 4/2010 | Van De Sluis |
| 2010/0119461 A1 | 5/2010 | Bicard-Benhamou |
| 2010/0146855 A1 | 6/2010 | Ma |
| 2010/0169108 A1 | 7/2010 | Karkanias |
| 2010/0185064 A1 | 7/2010 | Bandic |
| 2010/0197495 A1 | 8/2010 | Filippini |
| 2010/0217099 A1 | 8/2010 | Leboeuf |
| 2010/0265803 A1 | 10/2010 | Lee |
| 2010/0277106 A1 | 11/2010 | Baaijens |
| 2010/0289643 A1 | 11/2010 | Trundle |
| 2010/0295244 A1 | 11/2010 | Stut |
| 2010/0298981 A1 | 11/2010 | Chamorro |
| 2010/0301776 A1 | 12/2010 | Feri |
| 2011/0010014 A1 | 1/2011 | Oexman |
| 2011/0066465 A1 | 3/2011 | Orfield |
| 2011/0084614 A1 | 4/2011 | Eisele |
| 2011/0178977 A1 | 7/2011 | Drees |
| 2011/0186644 A1 | 8/2011 | Yoshii |
| 2011/0190913 A1 | 8/2011 | Van De Sluis |
| 2011/0190945 A1 | 8/2011 | Yoshii |
| 2011/0237905 A1 | 9/2011 | Kutzik |
| 2011/0270446 A1 | 11/2011 | Scharf |
| 2011/0307112 A1 | 12/2011 | Barrilleaux |
| 2012/0003198 A1 | 1/2012 | Barker |
| 2012/0011033 A1 | 1/2012 | Salgia |
| 2012/0019386 A1 | 1/2012 | Doraiswami |
| 2012/0031984 A1 | 2/2012 | Feldmeier |
| 2012/0064818 A1 | 3/2012 | Kurelowech |
| 2012/0072032 A1 | 3/2012 | Powell |
| 2012/0139720 A1 | 6/2012 | Mazar |
| 2012/0158203 A1 | 6/2012 | Feldstein |
| 2012/0176041 A1 | 7/2012 | Birru |
| 2012/0190001 A1 | 7/2012 | Knight |
| 2012/0206726 A1 | 8/2012 | Pervez |
| 2012/0214143 A1 | 8/2012 | Severson |
| 2012/0235579 A1 | 9/2012 | Chemel |
| 2012/0241633 A1 | 9/2012 | Smith |
| 2012/0279120 A1 | 11/2012 | Prescott |
| 2012/0296156 A1 | 11/2012 | Auphan |
| 2012/0298599 A1 | 11/2012 | Sichello |
| 2013/0027637 A1 | 1/2013 | Hosoki |
| 2013/0035208 A1 | 2/2013 | Dalebout |
| 2013/0065098 A1 | 3/2013 | Ohkawa |
| 2013/0073093 A1 | 3/2013 | Songkakul |
| 2013/0081541 A1 | 4/2013 | Hasenoehrl |
| 2013/0090562 A1 | 4/2013 | Ryan |
| 2013/0102852 A1 | 4/2013 | Kozloski |
| 2013/0119891 A1 | 5/2013 | Herremans |
| 2013/0134962 A1 | 5/2013 | Kamel |
| 2013/0141235 A1 | 6/2013 | Utter, II |
| 2013/0144537 A1 | 6/2013 | Schalk |
| 2013/0208576 A1 | 8/2013 | Loree, IV |
| 2013/0229114 A1 | 9/2013 | Eisele |
| 2013/0262357 A1 | 10/2013 | Amarasingham |
| 2013/0276371 A1 | 10/2013 | Birru |
| 2013/0331727 A1 | 12/2013 | Zhang |

(56) References Cited

U.S. PATENT DOCUMENTS

| | | | |
|---|---|---|---|
| 2013/0339074 A1* | 12/2013 | Nagy | G06Q 10/0631 705/7.12 |
| 2013/0342111 A1 | 12/2013 | Mohan | |
| 2014/0039685 A1 | 2/2014 | Blount | |
| 2014/0046193 A1 | 2/2014 | Stack | |
| 2014/0052220 A1 | 2/2014 | Pedersen | |
| 2014/0058566 A1 | 2/2014 | Rains, Jr. | |
| 2014/0067130 A1 | 3/2014 | Pillai | |
| 2014/0089836 A1 | 3/2014 | Damani | |
| 2014/0093551 A1 | 4/2014 | Averett | |
| 2014/0099348 A1 | 4/2014 | Averett | |
| 2014/0107846 A1 | 4/2014 | Li | |
| 2014/0114889 A1 | 4/2014 | Dagum | |
| 2014/0125225 A1 | 5/2014 | Calame | |
| 2014/0142760 A1 | 5/2014 | Drees | |
| 2014/0155705 A1 | 6/2014 | Papadopoulos | |
| 2014/0168636 A1 | 6/2014 | Funamoto | |
| 2014/0222210 A1 | 8/2014 | Agarwal | |
| 2014/0222241 A1 | 8/2014 | Ols | |
| 2014/0243935 A1 | 8/2014 | Brainard | |
| 2014/0249447 A1 | 9/2014 | Sereno | |
| 2014/0249760 A1 | 9/2014 | Proud | |
| 2014/0266669 A1 | 9/2014 | Fadell | |
| 2014/0277757 A1 | 9/2014 | Wang | |
| 2014/0283450 A1 | 9/2014 | Darlington | |
| 2014/0298719 A1 | 10/2014 | Mackin | |
| 2014/0318011 A1 | 10/2014 | Järvinen | |
| 2014/0343380 A1 | 11/2014 | Carter | |
| 2014/0368643 A1* | 12/2014 | Siegel | G08B 13/19695 348/143 |
| 2014/0375230 A1 | 12/2014 | Liu | |
| 2015/0015152 A1 | 1/2015 | Aboulnaga | |
| 2015/0027879 A1 | 1/2015 | Myre | |
| 2015/0048742 A1 | 2/2015 | Wingren | |
| 2015/0052975 A1 | 2/2015 | Martin | |
| 2015/0063579 A1* | 3/2015 | Bao | H04M 9/082 381/66 |
| 2015/0066578 A1 | 3/2015 | Manocchia | |
| 2015/0088786 A1 | 3/2015 | Anandhakrishnan | |
| 2015/0102730 A1 | 4/2015 | Eisele | |
| 2015/0119731 A1 | 4/2015 | Yasumura | |
| 2015/0126806 A1 | 5/2015 | Barroso | |
| 2015/0134123 A1 | 5/2015 | Obinelo | |
| 2015/0154523 A1 | 6/2015 | Oobayashi | |
| 2015/0174361 A1 | 6/2015 | Baaijens | |
| 2015/0196232 A1 | 7/2015 | Mitsi | |
| 2015/0204551 A1 | 7/2015 | Nair | |
| 2015/0204561 A1 | 7/2015 | Sadwick | |
| 2015/0212057 A1 | 7/2015 | Darveau | |
| 2015/0221233 A1 | 8/2015 | Couriol | |
| 2015/0227870 A1 | 8/2015 | Noboa | |
| 2015/0234369 A1 | 8/2015 | Wen | |
| 2015/0289347 A1 | 10/2015 | Baaijens | |
| 2015/0309484 A1 | 10/2015 | Lyman | |
| 2015/0312696 A1 | 10/2015 | Ribbich | |
| 2015/0317592 A1 | 11/2015 | Oobayashi | |
| 2015/0338117 A1 | 11/2015 | Henneberger | |
| 2015/0365762 A1* | 12/2015 | Truon | H04R 3/04 381/71.1 |
| 2015/0382427 A1 | 12/2015 | Eisele | |
| 2016/0007905 A1 | 1/2016 | Milner | |
| 2016/0019813 A1 | 1/2016 | Mullen | |
| 2016/0095188 A1 | 3/2016 | Verberkt | |
| 2016/0125758 A1 | 5/2016 | Hong | |
| 2016/0139576 A1 | 5/2016 | Aiken | |
| 2016/0151603 A1 | 6/2016 | Shouldice | |
| 2016/0163302 A1 | 6/2016 | Klabunde | |
| 2016/0203700 A1 | 7/2016 | Bruhn | |
| 2016/0206898 A1 | 7/2016 | Brainard | |
| 2016/0213946 A1 | 7/2016 | Brainard | |
| 2016/0231014 A1 | 8/2016 | Ro | |
| 2016/0253802 A1 | 9/2016 | Venetianer | |
| 2016/0284172 A1 | 9/2016 | Weast | |
| 2016/0313245 A1 | 10/2016 | Sato | |
| 2016/0316543 A1 | 10/2016 | Liu | |
| 2016/0339203 A1 | 11/2016 | Krames | |
| 2016/0341436 A1 | 11/2016 | Parker | |
| 2016/0377305 A1 | 12/2016 | Kwa | |
| 2017/0023225 A1 | 1/2017 | Chen | |
| 2017/0023269 A1 | 1/2017 | Gevelber | |
| 2017/0038787 A1 | 2/2017 | Baker | |
| 2017/0050561 A1 | 2/2017 | Lickfelt | |
| 2017/0053068 A1 | 2/2017 | Pillai | |
| 2017/0065792 A1 | 3/2017 | Bonvallet | |
| 2017/0068782 A1 | 3/2017 | Pillai | |
| 2017/0080373 A1 | 3/2017 | Engelhard | |
| 2017/0099556 A1* | 4/2017 | Cierna | G10L 25/84 |
| 2017/0105666 A1 | 4/2017 | Lee | |
| 2017/0123440 A1 | 5/2017 | Mangsuli | |
| 2017/0136206 A1 | 5/2017 | Pillai | |
| 2017/0139386 A1 | 5/2017 | Pillai | |
| 2017/0162548 A1 | 6/2017 | Roth | |
| 2017/0181685 A1 | 6/2017 | Lee | |
| 2017/0188926 A1 | 7/2017 | Oobayashi | |
| 2017/0189640 A1 | 7/2017 | Sadwick | |
| 2017/0191695 A1 | 7/2017 | Bruhn | |
| 2017/0196510 A1 | 7/2017 | Ouwerkerk | |
| 2017/0200389 A1 | 7/2017 | Yigal | |
| 2017/0208021 A1 | 7/2017 | Ingram | |
| 2017/0232225 A1 | 8/2017 | Pedersen | |
| 2017/0238401 A1 | 8/2017 | Sadwick | |
| 2017/0259079 A1 | 9/2017 | Grajcar | |
| 2017/0299210 A1 | 10/2017 | Nyamjav | |
| 2017/0300647 A1 | 10/2017 | Goldberg | |
| 2017/0300651 A1 | 10/2017 | Strobridge | |
| 2017/0300655 A1 | 10/2017 | Lane | |
| 2017/0301255 A1 | 10/2017 | Lee | |
| 2017/0307243 A1 | 10/2017 | Burt | |
| 2017/0319816 A1 | 11/2017 | Sokol | |
| 2017/0321923 A1 | 11/2017 | Wiens-Kind | |
| 2017/0325310 A1 | 11/2017 | Chen | |
| 2017/0326380 A1 | 11/2017 | Moore-Ede | |
| 2017/0347907 A1 | 12/2017 | Le | |
| 2017/0348506 A1 | 12/2017 | Berman | |
| 2017/0350610 A1 | 12/2017 | Michielsen | |
| 2017/0356602 A1 | 12/2017 | Lin | |
| 2017/0356670 A1 | 12/2017 | Zhang | |
| 2017/0359697 A1 | 12/2017 | Bhatti | |
| 2017/0359879 A1 | 12/2017 | Eisele | |
| 2017/0363314 A1 | 12/2017 | Barber | |
| 2018/0011978 A1 | 1/2018 | Reeckmann | |
| 2018/0012242 A1 | 1/2018 | Phan | |
| 2018/0025125 A1 | 1/2018 | Crane | |
| 2018/0025126 A1 | 1/2018 | Barnard | |
| 2018/0042077 A1 | 2/2018 | Riley | |
| 2018/0043130 A1 | 2/2018 | Moore Ede | |
| 2018/0077767 A1 | 3/2018 | Soler | |
| 2018/0082261 A1 | 3/2018 | Hendriks | |
| 2018/0082393 A1 | 3/2018 | Ahrens | |
| 2018/0107962 A1 | 4/2018 | Lundin | |
| 2018/0108442 A1 | 4/2018 | Börve | |
| 2018/0119973 A1 | 5/2018 | Rothman | |
| 2018/0120161 A1 | 5/2018 | Qiu | |
| 2018/0120162 A1 | 5/2018 | Qiu | |
| 2018/0132037 A1* | 5/2018 | McGibney | H04S 7/305 |
| 2018/0149802 A1 | 5/2018 | Krames | |
| 2018/0154297 A1 | 6/2018 | Maletich | |
| 2018/0157864 A1 | 6/2018 | Tribble | |
| 2018/0160944 A1 | 6/2018 | Aubert | |
| 2018/0165588 A1 | 6/2018 | Saxena | |
| 2018/0166171 A1 | 6/2018 | Pulitzer | |
| 2018/0178063 A1 | 6/2018 | Silver | |
| 2018/0182472 A1 | 6/2018 | Preston | |
| 2018/0188701 A1 | 7/2018 | Billings | |
| 2018/0193589 A1 | 7/2018 | McLaughlin | |
| 2018/0196925 A1 | 7/2018 | Mukherjee | |
| 2018/0197625 A1 | 7/2018 | Lobach | |
| 2018/0197637 A1 | 7/2018 | Chowdhury | |
| 2018/0197638 A1 | 7/2018 | Blanshard | |
| 2018/0206783 A1 | 7/2018 | Yoon | |
| 2018/0207445 A1 | 7/2018 | Maxik | |
| 2018/0209683 A1 | 7/2018 | Cho | |
| 2018/0216843 A1 | 8/2018 | Zhou | |
| 2018/0218289 A1 | 8/2018 | Albrecht | |

(56) References Cited

U.S. PATENT DOCUMENTS

| | | |
|---|---|---|
| 2018/0226158 A1 | 8/2018 | Fish |
| 2018/0240274 A1 | 8/2018 | Cronin |
| 2018/0247029 A1 | 8/2018 | Fish |
| 2018/0250430 A1 | 9/2018 | Machovina |
| 2018/0264224 A1 | 9/2018 | Gronfier |
| 2018/0266718 A1 | 9/2018 | Gillette |
| 2018/0285934 A1 | 10/2018 | Baughman |
| 2018/0295696 A1 | 10/2018 | Li |
| 2018/0295704 A1 | 10/2018 | Haverlag |
| 2018/0308390 A1 | 10/2018 | Moser |
| 2018/0311464 A1 | 11/2018 | Krames |
| 2018/0318602 A1 | 11/2018 | Ciccarelli |
| 2018/0320919 A1 | 11/2018 | Tang |
| 2018/0322240 A1 | 11/2018 | Goyal |
| 2018/0322253 A1 | 11/2018 | Goyal |
| 2018/0322255 A1 | 11/2018 | Connell, II |
| 2018/0330626 A1 | 11/2018 | Donadio |
| 2018/0331845 A1 | 11/2018 | Warren |
| 2018/0336500 A1 | 11/2018 | Pinho |
| 2018/0336530 A1 | 11/2018 | Johnson |
| 2018/0339127 A1 | 11/2018 | Van Reen |
| 2018/0342327 A1 | 11/2018 | Madan |
| 2018/0349689 A1 | 12/2018 | Lee |
| 2018/0349945 A1 | 12/2018 | Jayaraman |
| 2018/0350455 A1 | 12/2018 | Rosen |
| 2018/0350456 A1 | 12/2018 | Kendrick |
| 2018/0351758 A1 | 12/2018 | Becker |
| 2018/0351761 A1 | 12/2018 | Li |
| 2018/0353073 A1 | 12/2018 | Boucher |
| 2018/0353108 A1 | 12/2018 | Prate |
| 2018/0358117 A1 | 12/2018 | Neagle |
| 2018/0358129 A1 | 12/2018 | Gorzelniak |
| 2018/0358130 A1 | 12/2018 | Schmidt |
| 2018/0369637 A1 | 12/2018 | Hoang |
| 2018/0373843 A1 | 12/2018 | Baughman |
| 2018/0374053 A1 | 12/2018 | Willamowski |
| 2018/0374572 A1 | 12/2018 | Ackerman |
| 2018/0374586 A1 | 12/2018 | Baughman |
| 2019/0001059 A1 | 1/2019 | Handler |
| 2019/0005844 A1 | 1/2019 | Dragicevic |
| 2019/0007424 A1 | 1/2019 | Ford |
| 2019/0007927 A1 | 1/2019 | Blahnik |
| 2019/0010603 A1 | 1/2019 | Boughton |
| 2019/0011146 A1 | 1/2019 | Seo |
| 2019/0013960 A1 | 1/2019 | Sadwick |
| 2019/0014643 A1 | 1/2019 | Gharabegian |
| 2019/0024926 A1 | 1/2019 | Kim |
| 2019/0028549 A1 | 1/2019 | Ledvina |
| 2019/0041080 A1 | 2/2019 | Higuchi |
| 2019/0046109 A1 | 2/2019 | Lewis |
| 2019/0056126 A1 | 2/2019 | Law |
| 2019/0057615 A1 | 2/2019 | Mullen |
| 2019/0075687 A1 | 3/2019 | Brunstetter |
| 2019/0091700 A1 | 3/2019 | Hilbig |
| 2019/0107267 A1 | 4/2019 | Luo |
| 2019/0193508 A1 | 6/2019 | Ganem |
| 2019/0209806 A1 | 7/2019 | Allen |
| 2019/0215184 A1 | 7/2019 | Emigh |
| 2019/0224445 A1 | 7/2019 | Fernandes |
| 2019/0268999 A1 | 8/2019 | Oobayashi |
| 2019/0281681 A1 | 9/2019 | De Bries |
| 2019/0297700 A1 | 9/2019 | Gal |
| 2019/0309975 A1 | 10/2019 | Salem |
| 2019/0320516 A1 | 10/2019 | Parker |
| 2019/0350066 A1 | 11/2019 | Herf |
| 2019/0366032 A1 | 12/2019 | Lockley |
| 2020/0011563 A1 | 1/2020 | Jeong |
| 2020/0101893 A1 | 4/2020 | Studeny |
| 2020/0103841 A1 | 4/2020 | Pillai |
| 2020/0182495 A1 | 6/2020 | Park |
| 2020/0224915 A1 | 7/2020 | Nourbakhsh |
| 2020/0229289 A1 | 7/2020 | Cahill |
| 2020/0298168 A1 | 9/2020 | Lee |
| 2020/0340700 A1 | 10/2020 | Park |
| 2021/0116144 A1 | 4/2021 | Morgan |
| 2021/0207833 A1 | 7/2021 | Dameno |
| 2021/0239339 A1 | 8/2021 | Morgan |
| 2021/0379524 A1 | 12/2021 | Prigge |

FOREIGN PATENT DOCUMENTS

| | | |
|---|---|---|
| CN | 1150882 | 5/1997 |
| CN | 1544222 | 11/2004 |
| CN | 1971268 | 5/2007 |
| CN | 101421558 | 4/2009 |
| CN | 201414191 Y | 2/2010 |
| CN | 101963607 | 2/2011 |
| CN | 101976063 | 2/2011 |
| CN | 102073935 | 5/2011 |
| CN | 102262710 | 11/2011 |
| CN | 202075431 | 12/2011 |
| CN | 102305451 | 1/2012 |
| CN | 202551821 | 11/2012 |
| CN | 103040443 A | 4/2013 |
| CN | 103197659 A | 7/2013 |
| CN | 103277870 | 9/2013 |
| CN | 203175090 U | 9/2013 |
| CN | 103531174 A | 1/2014 |
| CN | 103604198 A | 2/2014 |
| CN | 203454309 U | 2/2014 |
| CN | 204759076 | 11/2015 |
| EP | 0710804 | 5/1996 |
| EP | 1067825 | 1/2001 |
| EP | 1271442 | 1/2003 |
| EP | 1511218 | 3/2005 |
| EP | 1821582 | 8/2007 |
| EP | 2016879 | 1/2009 |
| EP | 2132960 | 12/2009 |
| EP | 2296448 | 3/2011 |
| EP | 2431541 | 3/2012 |
| EP | 2488912 | 8/2012 |
| EP | 3297218 | 10/2020 |
| JP | S60110520 A | 6/1985 |
| JP | H04341243 | 11/1992 |
| JP | H0552361 A | 3/1993 |
| JP | H0658593 | 3/1994 |
| JP | H0658593 A | 3/1994 |
| JP | H06159763 A | 6/1994 |
| JP | H06225858 A | 8/1994 |
| JP | H09303842 A | 11/1997 |
| JP | H10238089 A | 9/1998 |
| JP | 2000130828 | 5/2000 |
| JP | 2000294388 | 10/2000 |
| JP | 2001224078 | 8/2001 |
| JP | 2001286226 | 10/2001 |
| JP | 2001314882 | 11/2001 |
| JP | 2002042546 A | 2/2002 |
| JP | 2002059152 A | 2/2002 |
| JP | 2003042507 | 2/2003 |
| JP | 2003042509 | 2/2003 |
| JP | 2003083590 | 3/2003 |
| JP | 2003232559 | 8/2003 |
| JP | 2004005313 A | 1/2004 |
| JP | 2004053130 A | 2/2004 |
| JP | 2005040769 A | 2/2005 |
| JP | 2005177726 | 7/2005 |
| JP | 2005211319 | 8/2005 |
| JP | 2005235634 | 9/2005 |
| JP | 2006210045 | 8/2006 |
| JP | 2006522699 | 10/2006 |
| JP | 2006321721 | 11/2006 |
| JP | 2006348600 | 12/2006 |
| JP | 2007170761 | 7/2007 |
| JP | 2007184436 | 7/2007 |
| JP | 2008125541 | 6/2008 |
| JP | 2008157548 | 7/2008 |
| JP | 2008204640 | 9/2008 |
| JP | 2010119563 | 6/2010 |
| JP | 2010182661 | 8/2010 |
| JP | 2010239878 | 10/2010 |
| JP | 2011146137 | 7/2011 |
| JP | 2012001931 | 1/2012 |
| JP | 2012149839 A | 8/2012 |
| JP | 2013140523 A | 7/2013 |

(56) References Cited

FOREIGN PATENT DOCUMENTS

| | | |
|---|---|---|
| KR | 20000009824 A | 2/2000 |
| KR | 20010048235 | 6/2001 |
| KR | 20030074107 A | 9/2003 |
| KR | 20050003899 | 1/2005 |
| KR | 100771486 | 10/2007 |
| KR | 100804892 | 2/2008 |
| KR | 101102733 | 1/2012 |
| KR | 20120004243 | 1/2012 |
| KR | 101135926 | 4/2012 |
| KR | 20120039359 A | 4/2012 |
| KR | 20130108709 | 10/2013 |
| KR | 20130124184 | 11/2013 |
| WO | 0039964 | 7/2000 |
| WO | 2000058873 | 10/2000 |
| WO | 2004037301 | 5/2004 |
| WO | 2007026387 | 3/2007 |
| WO | 2008043396 | 4/2008 |
| WO | 2008051222 | 5/2008 |
| WO | 2008102308 | 8/2008 |
| WO | 2008120127 | 10/2008 |
| WO | 2008135093 | 11/2008 |
| WO | 2009030641 | 3/2009 |
| WO | 2009044330 | 4/2009 |
| WO | 2009044330 A1 | 4/2009 |
| WO | 2010046875 | 4/2010 |
| WO | 2010087386 | 8/2010 |
| WO | 2010115720 | 10/2010 |
| WO | 2011033377 | 3/2011 |
| WO | 2011046875 | 4/2011 |
| WO | 2012104773 | 8/2012 |
| WO | 2012151407 | 11/2012 |
| WO | 2013014337 | 1/2013 |
| WO | 2013049297 | 4/2013 |
| WO | 2013175348 | 11/2013 |
| WO | 2014013376 | 1/2014 |
| WO | 2014036133 | 3/2014 |
| WO | 2014071046 | 5/2014 |
| WO | 2015130786 | 9/2015 |
| WO | 2015200730 A1 | 12/2015 |
| WO | 2016019005 A1 | 2/2016 |
| WO | 2016115230 | 7/2016 |
| WO | 2016154320 | 9/2016 |
| WO | 2017008321 | 1/2017 |
| WO | 2018039433 | 3/2018 |
| WO | 2018157063 | 8/2018 |
| WO | 2019046580 | 3/2019 |
| WO | 2019151684 | 8/2019 |
| WO | 2019204779 | 10/2019 |
| WO | 2020014688 | 1/2020 |
| WO | 2020073723 | 4/2020 |
| WO | 2020075189 | 4/2020 |
| WO | 2020104878 | 5/2020 |
| WO | 2020146315 | 7/2020 |
| WO | 2020189819 | 9/2020 |
| WO | 2021011822 | 1/2021 |
| WO | 2021249653 | 12/2021 |
| WO | 2021252439 | 12/2021 |

OTHER PUBLICATIONS

"Active Design Guidelines: Promoting Physical Activity and Health in Design," New York City Departments of Design and Construction, 2010, 144 pgs.

"Adolescent Psychology Around the World", Edited by Jeffrey Jensen Arnett, Ph.D., Clark University, Worcester, MA, 2012, (30 pages).

"ANSI/ASA S12.60-2010/Part 1 American National Standard Acoustical Performance Criteria, Design Requirements, and Guidelines for Schools, Part 1: Permanent Schools", Acoustical Society of America, 2010, 44 pgs.

"Assembly: Civic Design Guidelines," Center for Active Design, 2018, 152 pgs.

"Cochrane Handbook for Systematic Reviews of Interventions", Cochrane Book Series, Edited by Julian PT Higgins and Sally Green, 2008, 17 pgs.

"Daylight Metrics: PIER Daylighting Plus Research Program", Public Interest Energy Research (PIER) Program Final Project Report, Feb. 2012, 387 pgs.

"Depression and Other Common Mental Disorders", Global Health Estimates, World Health Organization, 2017, 24 pgs.

"Depression: A Global CrisisWorld Mental Health Day, Oct. 10, 2012", World Federation for Mental Health, (2012), (32 pages).

"Ergonomics of the thermal environment—Analytical determination and interpretation of thermal comfort using calculation of the PMV and PPD indices and local thermal comfort criteria", International Standard, Third edition, Nov. 15, 2005, 11 pgs.

"Evidence-based methodologies for public health—How to assess the best available evidence when time is limited and there is lack of sound evidence", European Centre for Disease Prevention and Control, Stockholm: ECDC; 2011, 67 pgs.

"Global Burden of Disease Study 2015 provides GPS for global health 2030", www.thelancet.com, vol. 388, Oct. 8, 2016, pp. 1448-1449.

"Global status report on alcohol and health 2014", World Health Organization, 2014, 392 pgs.

"Global, regional, and national age-sex specific all-cause and cause-specific mortality for 240 causes of death, 1990-2013: a systematic analysis for the Global Burden of Disease Study 2013", www.thelancet.com, vol. 385, Jan. 10, 2015, pp. 117-171.

"Global, regional, and national life expectancy, all-cause mortality, and cause-specific mortality for 249 causes of death, 1980-2015: a systematic analysis for the Global Burden of Disease Study 2015", www.thelancet.com, vol. 388, Oct. 8, 2016, pp. 1459-1544.

"Haemoglobin concentrations for the diagnosis of anaemia and assessment of severity", Vitamin and Mineral Nutrition Information System. Geneva, World Health Organization, 2011, pp. 1-6.

"Hazard Prevention and Control in the Work Environment: Airborne Dust", Occupational and Environmental Health Series, Department of Protection of the Human Environment, World Health Organization, Geneva, Dec. 1999, 224 pgs.

"IARC Monographs on the Evaluation of Carcinogenic Risks to Humans vol. 90 Human papillomaviruses", World Health Organization International Agency for Research on Cancer, Lyon, France, 2007, 690 pgs.

"LEED Reference Guide for Building Design and Construction," U.S. Green Building Council, 2013, (67 pages).

"Light and Lighting—Basic terms and criteria for specifying lighting requirements", The National Standards Authority of Ireland. (2011), (7 pages).

"My Plate My Wins, Make half your grains whole grains", Center for Nutrition Policy and Promotion. United States Department of Agriculture, Oct. 2016, (1 page).

"Policy recommendations on protection from exposure to second-hand tobacco smoke," World Health Organization, 2007, pp. 1-50 (56 pages).

"Preventing Diarrhoea Through Better Water, Sanitation and Hygiene: Exposures and impacts in low- and middle-income countries," World Health Organization, 2014, pp. 1-33 (48 pages).

"Proceedings: vol. 1—Indoor Air Quality (IAQ), building related diseases and human response," Healthy Buildings, 2006 (361 pages).

"Progress on Drinking Water, Sanitation and Hygiene, 2017, Update and SDG Baselines", World Health Organization (WHO) and the United Nations Children's Fund (UNICEF), 2017, 116 pgs.

"Social determinants of mental health," World Health Organization and Calouste Gulbenkian Foundation, 2014, pp. 1-52 (54 pages).

"Sodium in Your Diet Use the Nutrition Facts Label and Reduce Your Intake", U.S. Food and Drug Administration. Mar. 2020, (4 pages).

"State Council Air Pollution Prevention and Control Action Plan, China Clean Air Updates", Clean Air Alliance of China, Issue II, 2013, English Translation, 20 pgs.

"WHO Framework Convention on Tobacco Control," World Health Organization 2003, updated reprint 2004, 2005, (44 pages).

Abrahamsson et al., "Impairment of Contrast Sensitivity Function (CSF) as a Measure of Disability Glare," Investigative Ophthalmology & Visual Science, 1986, vol. 27, pp. 1131-1136.

(56) References Cited

OTHER PUBLICATIONS

Abt et al., "Characterization of Indoor Particle Sources: A Study Conducted in the Metropolitan Boston Area," Environmental Health Perspectives, 2000, vol. 108, No. 1, pp. 35-44.
Advances in Building Energy Research, 2007, vol. 1 (263 pages).
Ahmed, Tahmeed, et al.; "Global Burden of Maternal and Child Undernutrition and Micronutrient Deficiencies", Ann Nutr Metab 2012;61 (suppl 1):8-17.
Ahn, "Synthesis and Characterization of Nanostructured ZnO and SnOx for VOC Sensor Devices," 2011 (204 pages).
Ajzen, I. "Nature and operation of attitudes", Annual review of psychology vol. 52: 27-58 (2001).
Akacem et al., "Bedtime and evening light exposure influence circadian timing in preschoolage children: A field study," Neurobiology of Sleep and Circadian Rhythms, 2016, vol. 1, pp. 27-31.
Akacem et al., "Sensitivity of the circadian system to evening bright light in preschool-age children," Physiological Reports, 2018, vol. 6, No. 5, pp. 1-10.
Al Horr et al., "Occupant productivity and office indoor environment quality: A review of the literature," Building and Environment, 2016, vol. 105, pp. 369-389.
Alfano, Francesca Romana d'Ambrosio et al. "On the measurement of the mean radiant temperature and its influence on the indoor thermal environment assessment", Building and Environment 63: 79-88, (2013).
Allen, Michele L. et al., "Effective Parenting Interventions to Reduce Youth Substance Use: A Systematic Review," Pediatrics, 2016, vol. 138, No. 2 (19 pages).
Allergy Buyers Club, "Philips Wake Up Light Dawn Simulators Alarm Clocks," retrieved from http://www.allergybuyersclub.com/philips-wake-up-light-dawn-simulator-alarm-clocks.html, retrieved on Aug. 13, 2012, 2 pages.
Alonso-Coello, Pablo, et al.; "Grade Evidence to Decision (EtD) frameworks: a systematic and transparent approach to making well informed healthcare choices. 1: Introduction"; BMJ 2016; 353:i2016, http://dx.doi.org/10.1136/bmj.i2016, 10 pgs.
Amaral et al., "An Overview of Particulate Matter Measurement Instruments," Atmosphere, 2015, vol. 6, pp. 1327-1345.
Amendment, filed Jan. 25, 2018, for U.S. Appl. No. 15/421,046, Eisele et al., "LED Lighting System," 6 pages.
American Diabetes Association, "Standards of Medical Care in Diabetes—2017 Abridged for Primary Care Providers," Clinical Diabetes, 2017, vol. 35, No. 1, pp. 5-26 (22 pages).
American Society of Heating, Refrigerating and Air-Conditioning Engineers (ASHRAE), "Indoor Air Quality Guide, Best Practices for Design, Construction and Commissioning", ASHRAE Philadelphia Chapter, May 14, 2009, http://ashraephilly.org/images/downloads/Presentation_Archives/0509.pdf, Accessed Nov. 27, 2017 (19 pages).
American Society of Heating, Refrigerating and Air-Conditioning Engineers et al., "Indoor Air Quality Guide: Best Practices for Design, Construction and Commissioning," 2009 (198 pages).
American Society of Heating, Refrigerating and Air-Conditioning Engineers, "Indoor Air Quality Guide: Best Practices for Design, Construction and Commissioning," 2009 (19 pages).
American Society of Heating, Refrigerating and Air-Conditioning Engineers, Inc., ASHRAE Standard 55-2010: Thermal Environmental Conditions for Human Occupancy (44 pages).
American Ultraviolet, "Handheld Germicidal Fixtures," retrieved from http://americanultraviolet.com/germicidal_solutions/commercial_products/handheld . . . , retrieved on Aug. 13, 2012, 1 page.
American Ultraviolet, "In Room Germicidal Solutions," HVAC MRS (0810/2.5M), retrieved from http://www.americanultraviolet.com, 2 pages.
Anderson et al., "Clearing the Air: A Review of the Effects of Particulate Matter Air Pollution on Human Health," Journal of Medical Toxicology, 2012, vol. 8, pp. 166-175.
Apaydin, Erica A. et al., "A systematic review of St. John's wort for major depressive disorder," Systematic Reviews, 2016, vol. 5, No. 148 (25 pages).
Aries et al., "Daylight and health: A review of the evidence and consequences for the built environment," Lighting Research & Technology, 2015, vol. 47, pp. 6-27.
Aries et al., "Windows, view, and office characteristics predict physical and psychological discomfort," Journal of Environmental Psychology, 2010, vol. 30, pp. 533-541.
Aries, "Human lighting demands: healthy lighting in an office environment," thesis, 2005 (159 pages).
Arnett, Jeffrey J. "The neglected 95%: why American psychology needs to become less American." The American psychologist vol. 63,7 : 602-14, (2008).
Arrington et al., "Voluntary Task Switching: Chasing the Elusive Homunculus," Journal of Experimental Psychology: Learning, Memory, and Cognition, 2005, vol. 31, No. 4, pp. 683-702.
Arundel et al., "Indirect Health Effects of Relative Humidity in Indoor Environments," Environmental Health Perspectives, 1986, vol. 65, pp. 351-361.
Arundel, Anthongy V., et al.; "Indirect Health Effects of Relative Humidity in Indoor Environments", Environmental Health Perspectives vol. 65, pp. 351-361, 1986.
Astolfi et al., "Subjective and objective assessment of acoustical and overall environmental quality in secondary school classrooms," The Journal of the Acoustical Society of America, 2008, vol. 123, No. 1, pp. 163-173.
Astolfi, Arianna, and Franco Pellerey. "Subjective and objective assessment of acoustical and overall environmental quality in secondary school classrooms." The Journal of the Acoustical Society of America vol. 123,1: 163-73, (2008).
Atmaca et al., "Effects of radiant temperature on thermal comfort," Building and Environment, 2007, vol. 42, pp. 3210-3220.
Atmaca et al., "Predicting the effect of relative humidity on skin temperature and skin wettedness," Journal of Thermal Biology, 2006, vol. 31, pp. 442-452.
Atmaca, Ibrahim, et al.; "Effects of radiant temperature on thermal comfort", Building and Environment 42 (2007) 3210-3220.
Australian Examination report No. 1, dated Dec. 13, 2017, for Australian Application No. 2017200995, 6 pages.
Australian Patent Examination Report, dated Sep. 14, 2016, for Australian Application No. 2013308871, 5 pages.
Averett et al., "Titanium Dioxide Photocatalytic Compositions and Uses Thereof," U.S. Appl. No. 61/482,393, filed May 4, 2011, 26 pages.
Babyak, Richard J., "Ready to roll," Appliance Manufacturer, 2000, vol. 48, No. 9, pp. 40-42.
Bakker et al., "User satisfaction and interaction with automated dynamic facades: a pilot study," Building and Environment, 2014, vol. 78, pp. 44-52.
Bandura, A. "Self-efficacy", In V. S. Ramachaudran (Ed.), Encyclopedia of human behavior (vol. 4, pp. 71-81) (1994). New York: Academic Press. (Reprinted in H. Friedman [Ed.], Encyclopedia of mental health. San Diego: Academic Press, (1998).
Barclay, Laurie, J., et al.; "Healing the Wounds of Organizational Injustice: Examining the Benefits of Expressive Writing", Journal of Applied Psychology 2009, vol. 94, No. 2, 511-523.
Beauchemin et al., "Sunny hospital rooms expedite recovery from severe and refractory depressions," Journal of Affective Disorders, 1996, vol. 40, pp. 49-51.
Beaven et al., "A Comparison of Blue Light and Caffeine Effects on Cognitive Function and Alertness in Humans," PLoS One, 2013, vol. 8, No. 10 (7 pages).
Bekö et al., Ventilation rates in the bedrooms of 500 Danish children, Building and Environment, 2010, vol. 45, pp. 2289-2295.
Bell et al., "The Exposure-Response Curve for Ozone and Risk of Mortality and the Adequacy of Current Ozone Regulations," Environmental Health Perspectives, 2006, vol. 114, No. 4, pp. 532-536.
Bellicha, Alice et al., "A multistage controlled intervention to increase stair climbing at work: effectiveness and process evaluation," International Journal of Behavioral Nutrition and Physical Activity, 2016, vol. 13, No. 47, pp. 1-9 (9 pages).
Benedetti, "Morning sunlight reduces length of hospitalization in bipolar depression," Journal of Affective Disorders, 2001, vol. 62, pp. 221-223.

(56) References Cited

OTHER PUBLICATIONS

Berman et al., "The Cognitive Benefits of Interacting With Nature," Psychological Science, 2008, vol. 19, No. 12, pp. 1207-1212.

Berto, "Exposure to restorative environments helps restore attentional capacity," Journal of Environmental Psychology, 2005, vol. 25, pp. 249-259.

Berto, "The Role of Nature in Coping with Psycho-Physiological Stress: A Literature Review on Restorativeness," Behavioral Sciences, 2014, vol. 4, pp. 394-409.

Besner et al., "The Stroop effect and the myth of automaticity," Psychonomic Bulletin & Review, 1997, vol. 4, No. 2, pp. 221-225.

Bhutta, Zulfiqar A. et al., "Evidence-based interventions for improvement of maternal and child nutrition: what can be done and at what cost?," The Lancet, 2013, vol. 382, pp. 452-447.

Bidonde, J. et al., "Aerobic exercise training for adults with fibromyalgia (Review)," Cochrane Database of Systematic Reviews, 2017, Issue 6 (130 pages).

Bierman et al., "Characterizing Daylight Photosensor System Performance to Help Overcome Market Barriers," Journal of the Illuminating Engineering Society, 2000, vol. 29, No. 1, pp. 101-115.

Bohn, Hendrik et al., "SIRENA—Service Infrastructure for Real-time Embedded Networked Devices: A service oriented framework for different domains," 2006 (7 pages).

Borisuit et al., "Effects of realistic office daylighting and electric lighting conditions on visual comfort, alertness and mood," Lighting Research and Technology, 2015, vol. 47, pp. 192-209.

Bornehag, C. G., et al.; "Dampness in Buildings and Health: Nordic Interdisciplinary Review of the Scientific Evidence on Associations between Exposure to "Dampness" in Buildings and Health Effects (NORDDAMP)", Indoor Air 2001; 11: 72-86.

Boubekri et al., "Impact of Windows and Daylight Exposure on Overall Health and Sleep Quality of Office Workers: A Case-Control Pilot Study," Journal of Clinical Sleep Medicine, 2014, vol. 10, No. 6, pp. 603-611.

Boubekri et al., "The Impact of Optimized Daylight and Views on the Sleep Duration and Cognitive Performance of Office Workers," International Journal of Environmental Research and Public Health, 2020, vol. 17, No. 3219, pp. 1-16.

Boubekri et al., "Windows and Environmental Satisfaction: A Survey Study of an Office Building," Indoor Environment, 1993, vol. 2, pp. 164-172.

Bourcier, Johann et al., "A Dynamic-SOA Home Control Gateway," 2006 (9 pages).

Bradley, J. S., et al.; "Describing Levels of Speech Privacy in Open-Plan Offices", NRC Publications Archive, National Research Council of Canada, Sep. 12, 2003, 29 pgs.

Brager, Gail S., et al., "Thermal adaptation in the built environment: a literature review," Energy and Buildings, 1998, vol. 27, pp. 83-96 (15 pages).

Braniš et al., "The effect of outdoor air and indoor human activity on mass concentrations of PM10, PM2.5, and PM1 in a classroom," Environmental Research, 2005, vol. 99, pp. 143-149.

Brook et al., "Particulate Matter Air Pollution and Cardiovascular Disease: An Update to the Scientific Statement From the American Heart Association," Circulation: Journal of the American Heart Association, 2010, vol. 121, pp. 2331-2378.

Brookstone, "Tranquil Moments® Advanced Sleep Sounds," 2012, retrieved from http://www.brookstone.com/tranquil-moments-advanced-sleep-sound . . . , retrieved on Apr. 28, 2014, 3 pages.

Brown et al., "Interventions to Reduce Harm from Smoking with Families in Infancy and Early Childhood: A Systematic Review," International Journal of Environmental Research and Public Health, 2015, vol. 12, pp. 3091-3119 (29 pages).

Brown et al., "Recommendations for healthy daytime, evening, and night-time indoor light exposure," Preprints, 2020 (21 pages).

Brown, Nicola et al., "Interventions to Reduce Harm from Smoking with Families in Infancy and Early Childhood: A Systematic Review ," International Journal of Environmental Research and Public Health, 2015, vol. 12, pp. 3091-3119, (29 pages).

Buchanan et al., "Air filter materials, outdoor ozone and building-related symptoms in the BASE study," Indoor Air, 2008, vol. 18, pp. 144-155.

Burge et al., "Sick Building Syndrome: A Study of 4373 Office Workers," Annals of Occupational Hygiene, 1987, vol. 31, No. 4A, pp. 493-504.

Bussières, André E., et al., "The Treatment of Neck Pain-Associated Disorders and Whiplash-Associated Disorders: A Clinical Practice Guideline," Journal of Manipulative and Physiological Therapeutics, 2016, vol. 39, No. 8, pp. 523-564.e27 (69 pages).

Butler et al., "Effects Of Setting On Window Preferences And Factors Associated With Those Preferences," Environment and Behavior, 1989, vol. 21, No. 1, pp. 17-31.

Byrne, Daniel W. et al., "Seven-Year Trends in Employee Health Habits From a Comprehensive Workplace Health Promotion Program at Vanderbilt University," Journal of Occupational and Environmental Medicine, Dec. 2011, vol. 53, No. 12, pp. 1372-1381 (10 pages).

Cairncross, Sandy, et al., "Water, sanitation and hygiene for the prevention of diarrhoea," International Journal of Epidemiology, 2010, vol. 39, pp. i193-i205 (14 pages).

California Energy Commission, 2013 Building Energy Efficiency Standards for Residential and Nonresidential Buildings, CEC 400 2012 004-CMF-REV2 (268 pages).

Campanella et al., "Well Living Lab: A New Tool for Measuring the Human Experience in the Built Environment," Conscious Cities Journal No. 2, Conscious Cities Anthology 2017: Bridging Neuroscience, Architecture and Technology, 2017 (5 pages).

Canadian Office Action, dated Jul. 18, 2017, for Canadian Application No. 2,946,367, 3 pages.

Canadian Office Action, dated Jul. 25, 2017, for Canadian Application No. 2,940,766, 6 pages.

Cao, Chunmei et al., "Effect of Active Workstation on Energy Expenditure and Job Performance: A Systematic Review and Meta-analysis," Journal of Physical Activity and Health, 2016, vol. 13, No. 5, pp. 562-571.

Carlucci, Salvatore et al., "A review of indices for assessing visual comfort with a view to their use in optimization processes to support building integrated design," Renewable and Sustainable Energy Reviews, 2015, vol. 47, pp. 1016-1033.

Carr et al., "Interventions for tobacco cessation in the dental setting (Review)," Cochrane Database of Systematic Reviews, 2012, Issue 6, pp. 1-38 (40 pages).

Carrer et al., "Assessment through Environmental and Biological Measurements of Total Daily Exposure to Volatile Organic Compounds of Office Workers in Milan, Italy," Indoor Air, 2000, vol. 10, pp. 258-268.

Cavanaugh, William J. et al. "Speech Privacy in Buildings." Journal of the Acoustical Society of America 34: 475-492, (1962).

Center for Disease Control and Prevention, "Steps to Wellness: A Guide to Implementing the 2008 Physical Activity Guidelines for Americans in the Workplace" U.S. Department of Health Services, 2012, (120 pages).

Centers for Disease Control and Prevention, "Strategies to Prevent Obesity and Other Chronic Diseases: The CDC Guide to Strategies to Increase the Consumption of Fruits and Vegetables.," U.S. Department of Health and Human Services, 2011, pp. 1-60 (68 pages).

Centers for Disease Control and Prevention, "Summary Health Statistics for U.S. Adults: National Health Interview Survey, 2012", Vital and Health Statistics Report, Series 10, No. 260, Feb. 2014, 171 pp., Retrieved from https://www.cdc.gov/nchs/data/series/sr_10/sr10_260.pdf.

Chellappa et al., "Can light make US bright? Effects of light on cognition and sleep," Progress in Brain Research, 2011, vol. 190, 119-133.

Chellappa et al., "Non-Visual Effects of Light on Melatonin, Alertness and Cognitive Performance: Can Blue-Enriched Light Keep Us Alert?," PLoS One, 2011, vol. 6, No. 1 (11 pages).

Chellappa et al., "Sex differences in light sensitivity impact on brightness perception, vigilant attention and sleep in humans," Scientific Reports, 2017, vol. 7, No. 14215, pp. 1-9.

(56) References Cited

OTHER PUBLICATIONS

Chellappa, "Individual differences in light sensitivity affect sleep and circadian rhythms," Sleep, 2021, vol. 44, No. 2, pp. 1-10.

Chen et al., "The Effect of Blue-Enriched Lighting on Medical Error Rate in a University Hospital ICU," The Joint Commission Journal on Quality and Patient Safety, 2021, vol. 47, No. 3, pp. 165-175.

Chen, Chun-Yuan, "A MOM-based Home Automation Platform in Heterogeneous Environments," A Thesis Submitted to Institute of Computer Science and Engineering College of Computer Science National Chiao Tung University, 2006 (93 pages).

Chinese Office Action, dated May 5, 2016, for Chinese Application No. 201380051774.0, 10 pages.

Cho et al., "Effects of artificial light at night on human health: A literature review of observational and experimental studies applied to exposure assessment," Chronobiology International: The Journal of Biological and Medical Rhythm Research, 2015, pp. 1-17.

Choi et al., "Impacts of indoor daylight environments on patient average length of stay (ALOS) in a healthcare facility," Building and Environment, 2012, vol. 50, pp. 65-75.

Chou, "A Practical Guide to Hazardous Gas Monitors" Occupational Hazards, 2000, vol. 62, No. 9, pp. 61-66.

Christoffersen et al., "Windows and Daylight—A post-occupancy evaluation of Danish offices," 2000 (9 pages).

Chun et al., "Thermal diary: Connecting temperature history to indoor comfort," Building and Environment, 2008, vol. 43, pp. 877-885.

Clasen et al., "Interventions to improve water quality for preventing diarrhoea (Review)," Cochrane Database of Systematic Reviews, 2015, Issue 10, pp. 1-175 (178 pages).

Clements-Croome, "Work performance, productivity and indoor air," Scandinavian Journal of Work Environment & Health, 2008, pp. 69-78.

Communication pursuant to Article 94(3) EPC issued in EP Application No. 20191237.5 dated Jun. 14, 2021 (13 pages).

Communication pursuant to Article 94(3) EPC, dated Mar. 15, 2018, for European Application No. 15 754 628.4-1222, 9 pages.

Communication pursuant to Article 94(3) EPC, dated Nov. 23, 2016, for European Application No. 13833105.3, 8 pages.

Communication pursuant to Rule 164(1) EPC, dated Mar. 30, 2016, for European Application No. 13833105.3-1853 / 2891019, 9 pages.

Corbijn Van Willenswaard, Kyrsten et al., "Music interventions to reduce stress and anxiety in pregnancy: a systematic review and meta-analysis," BMC Psychiatry, 2017, vol. 17, No. 271, pp. 1-9 (9 pages).

Corrected Notice of Allowance, dated Jun. 26, 2017, for U.S. Appl. No. 14/012,444, Pillai et al, "Systems, Methods and Articles for Enhancing Wellness Associated With Habitable Environments," 2 pages.

Corrected Notice of Allowance, dated Jun. 6, 2017, for U.S. Appl. No. 14/012,444, Pillai et al, "Systems, Methods and Articles for Enhancing Wellness Associated With Habitable Environments," 2 pages.

Coury, Helenice J.C.G. et al., "Evaluation of the effectiveness of workplace exercise in controlling neck, shoulder and low back pain: a systematic review," Brazilian Journal of Physical Therapy, 2009, vo. 13, No. 6, pp. 461-479.

D. A. McIntyre, "Response to Atmospheric Humidity at Comfortable Air Temperature: A Comparison of Three Experiments", The Annals of Occupational Hygiene, vol. 21, Issue 2, Aug. 1978, pp. 177-190.

D'Ambrosio Alfano et al., "On the measurement of the mean radiant temperature and its influence on the indoor thermal environment assessment," Building and Environment, 2013, vol. 63, pp. 79-88.

Dalager et al., "Implementing intelligent physical exercise training at the workplace: health effects among office workers—a randomized controlled trial," European Journal of Applied Physiology, 2016, vol. 116, pp. 1433-1442 (10 pages).

Dalal, Reeshad S., "Job Attitudes: Cognition and Affect," Handbook of Psychology, Second Edition, 2013, pp. 341-366 (26 pages).

Darvesh, Nazia, et al., "Water, sanitation and hygiene interventions for acute childhood diarrhea: a systematic review to provide estimates for the Lives Saved Tool," BMC Public Health, 2017, vol. 17(Suppl 4), Article 776, pp. 101-111 (11 pages).

De Dear et al., "Developing an Adaptive Model of Thermal Comfort and Preference," ASHRAE Transactions, 1998, vol. 104, part 1 (19 pages).

Delos, "Delos and MGM Grand Las Vegas Introduce First-Ever Stay Well Rooms, Sep. 20, 2012, retrieved from http://delosliving.com/staywell/delos-mgm-grand-las-vegas-introduce-first-ever-stay-well- . . . " retrieved on May 14, 2014, 4 pages.

Delos, "Delos Announces First-Ever Well™ Certified Office At CBRE Headquarters In Los Angeles, Nov. 19, 2013, retrieved from http://delosliving.com/press-release/delos-the-pioneer-of-wellness-real-estate-announces-fi . . . ," retrieved on May 14, 2014, 4 pages.

Delos, "MGM Grand and Delos Complete Expansion Of Stay Well Experience And Introduce New Stay Well Lounge, Feb. 26, 2014, retrieved from http://delosliving.com/press-release/mgm-grand-and-delos-complete-expansion-of-stay-we . . . ," retrieved on May 14, 2014, 4 pages.

Delos, "World's First Well® Certified Restaurants Introduced by Delos And LYFE Kitchen, Dec. 4, 2013, retrieved from http://delosliving.com/press-release/worlds-first-well-certified-restaurants-introduced-by-d . . . " retrieved on May 14, 2014, 4 pages.

Delos, "World's First Wellness-Infused Student Housing Model In Philadelphia For St. Joseph's University Introduced By Delos and Cross Properties, Nov. 25, 2013, retrieved from http://delosliving.com/press-release/delos-the-pioneer-of-wellness-real-estate-and-cross-pr . . . ," retrieved on May 14, 2014, 4 pages.

Delos, "Introducing Wellness Real Estate—Can Your Home Actually Improve Your Health?," May 1, 2012, retrieved from http://delosliving.com/press-release/can-your-home-actually-improve-your-health/, retrieved on May 14, 2014, 3 pages.

Destaillats et al., "Indoor pollutants emitted by office equipment: A review of reported data and information needs," Atmospheric Environment, 2008, vol. 42, pp. 1371-1388.

Diamond, "Executive Functions," Annual Review of Psychology, 2013, vol. 64, pp. 135-168.

Dijk et al., "Light, Sleep, and Circadian Rhythms: Together Again," PLoS Biology, 2009, vol. 7, No. 6, pp. 1-4.

Dingle et al., "Formaldehyde Levels and the Factors Affecting These Levels in Homes in Perth, Western Australia," Indoor Built Environment, 2002, vol. 11, pp. 111-116.

Domanico et al., "Documenting the NICU design dilemma: comparative patient progress in open-ward and single family room units," Journal of Perinatology, 2011, vol. 31, pp. 281-288.

Dong et al., "A review of smart building sensing system for better indoor environment control," Energy and Buildings, 2019, vol. 199, pp. 29-46.

Dounis et al., "Design of a fuzzy system for living space thermal-comfort regulation," Applied Energy, 2001, vol. 69, pp. 119-144.

Duckitt, Kirsten et al., "Menorrhagia," BMJ Clinical Evidence, 2012, pp. 1-69 (69 pages).

Dueñas, Juan C. et al., "An End-to-End Service Provisioning Scenario for the Residential Environment," IEEE Communications Magazine, 2005, pp. 94-100.

Dussault et al., "Office buildings with electrochromic windows: A sensitivity analysis of design parameters on energy performance, and thermal and visual comfort," Energy and Building, 2017, vol. 153, pp. 50-62.

Ebbert et al., "Interventions for smokeless tobacco use cessation (Review)," Cochrane Database of Systematic Reviews, 2015, No. 10 (56 pages).

Edgerton, V. R., et al.; "Elevation of Hemoglobin and Work Tolerance in Iron-Deficient Subjects", J. Nutr. Sci. Vitaminol., 27, 77-86, 1981.

Eisele et al, "LED Lighting System," Notice of Allowance, dated Apr. 21, 2015, for U.S. Appl. No. 14/486,753, 9 pages.

Eisele et al, "LED Lighting System," Notice of Allowance, dated Mar. 14, 2016, for U.S. Appl. No. 14/805,243, 6 pages.

Eisele et al, "LED Lighting System," Notice of Allowance, dated May 13, 2014, for U.S. Appl. No. 13/863,589, 6 pages.

(56) References Cited

OTHER PUBLICATIONS

Eisele et al, "LED Lighting System," Office Action dated Oct. 22, 2015, for U.S. Appl. No. 14/805,243, 14 pages.
Eisele et al, "LED Lighting System," Office Action, dated Feb. 4, 2015, for U.S. Appl. No. 14/486,753, 7 pages.
Eisele et al, "LED Lighting System," Office Action, dated Jul. 26, 2012, for U.S. Appl. No. 12/900,158, 13 pages.
Eisele et al, "LED Lighting System," Office Action, dated Jun. 5, 2013, for U.S. Appl. No. 13/863,589, 5 pages.
Eisele et al, "LED Lighting System," Office Action, dated Nov. 1, 2013, for U.S. Appl. No. 13/863,589, 6 pages.
Eisele et al, "LED Lighting System," Office Action, dated Oct. 22, 2015, for U.S. Appl. No. 14/805,243, 18 pages.
Eisele et al, "LED Lighting System," Preliminary Amendment, filed Dec. 30, 2014, for U.S. Appl. No. 14/486,753.
Eisele et al, "LED Lighting System," Preliminary Amendment, filed Sep. 15, 2015, for U.S. Appl. No. 14/805,243, 9 pages.
Eisele et al, "LED Lighting System," Preliminary Amendment, filed Sep. 8, 2016, for U.S. Appl. No. 15/187,317, 9 pages.
Eisele et al, "LED Lighting System," Response, filed Jan. 27, 2014, for U.S. Appl. No. 13/863,589, 3 pages.
Eisele et al, "LED Lighting System," Response, filed Jan. 5, 2016, for U.S. Appl. No. 14/805,243, 3 pages.
Eisele et al, "LED Lighting System," Response, filed Mar. 6, 2015, for U.S. Appl. No. 14/486,753, 3 pages.
Eisele et al, "LED Lighting System," Response, filed Sep. 4, 2013, for U.S. Appl. No. 13/863,589, 3 pages.
Eisele et al., "LED Lighting System," Amendment, filed Oct. 24, 2012, for U.S. Appl. No. 12/900,158, 12 pages.
Eisele et al., "LED Lighting System," Second Preliminary Amendment filed Dec. 30, 2014, for U.S. Appl. No. 14/486,753, 9 pages.
Eisele et al., "LED Lighting System," U.S. Appl. No. 61/249,858, filed Oct. 8, 2009, 58 pages.
Eisele et al., "LED Lighting System," Notice of Allowance dated Jan. 9, 2013, for U.S. Appl. No. 12/900,158, 9 pages.
Engvall et al., "Sick building syndrome in relation to building dampness in multi-family residential buildings in Stockholm," International Archives of Occupational and Environmental Health, 2001, vol. 74, pp. 270-278.
Epstein et al., "Thermal Comfort and the Heat Stress Indices," Industrial Health, 2006, vol. 44, pp. 388-398.
European Agency for Safety and Health at Work, et al., "Work-related musculoskeletal disorders: back to work report," Luxembourg: Office for Official Publications of the European Communities, 2007. pp. 3-100 (100 pages).
European Search Report for EP Application No. 15160578.9, dated Aug. 11, 2015, 8 pages.
Evans, G W, and D Johnson. "Stress and open-office noise." The Journal of applied psychology vol. 85,5: 779-83, (2000).
Examination Report issued in AU Application No. 2016202287 dated May 8, 2020, 4 pgs.
Examiner's Report issued in CA Application No. 2,940,766 dated Jan. 11, 2019, 5 pgs.
Exelmans et al., "Bedtime mobile phone use and sleep in adults," Social Science & Medicine, 2016, vol. 148, pp. 93-101.
Extended European Search Report and Lack of Unity of Invention Sheet B, dated Jul. 28, 2016, for European Application No. 13833105. 3, 17 pages.
Extended European Search Report issued in EP Application No. 17844397.4 dated Jun. 17, 2020 (8 pages).
Extended European Search report issued in EP Application No. 20152815.5 dated Aug. 4, 2020, 13 pgs.
Extended European Search Report issued in EP Application No. 20191237.5 dated Sep. 21, 2020, 14 pgs.
Extended European Search Report, dated Feb. 1, 2018, for European Application No. 17167920.2-1213, 10 pages.
Extended European Search Report, dated Jul. 12, 2017, for European Application No. 15754628.4-1958, 11 pages.
Extended European Search Report, dated May 28, 2018, for European Application No. 16737803.3-1222/3245631, 7 pages.
Extended European Search Report, dated Nov. 5, 2014, for European Application No. 12779504.5-1352, 6 pages.
Fabrictech International, "PureCare™ Antibacterial Silver," retrieved from http://www.fabrictech.com/shop/purecaresilver.html, retrieved on Aug. 13, 2012, 1 page.
Fabrictech International, "Total Health & Wellness Protection Package—Save 25%," retrieved from http://www.fabrictech.com/shop/custom-package/total-healthawellness-protection.html, retrieved on Aug. 13, 2012, 3 pages.
Fanger, P. O.; "Assessment of man's thermal comfort in practice", British Journal of Industrial Medicine, 1973, 30, 313-324.
Fanger, P.O., "Introduction of the olf and the decipol units to quantify air pollution perceived by humans indoors and outdoors", Building Serv. Eng. Res. Technol. 9(4), 1988, pp. 155-157 (3 pages).
Fanger, PO; "Olf and decipol: New units for perceived air quality," Building Serv. Eng. Res. Technol. 9(4) 155-157 (1988), (3 pages).
Fanger, PO; "Local Discomfort to the Human Body Caused by Non-Uniform Thermal Environments", Annals of Occupational Hygiene 20: 285-291 (1977).
Farzaneh et al., "Controlling automobile thermal comfort using optimized fuzzy controller," Applied Thermal Engineering, 2008, vol. 28, pp. 1906-1917.
Felleman et al., "Distributed Hierarchical Processing in the Primate Cerebral Cortex," Cerebral Corte, 1991, vol. 1, No. 1, pp. 1-47.
Ferguson MA et al., "Hearing aids for mild to moderate hearing loss in adults (Review)," Cochrane Database of Systematic Reviews, 2017, Issue 9, pp. 1-46 (48 pages).
Fewtrell, Lorna, et al., "Water, sanitation, and hygiene interventions to reduce diarrhoea in less developed countries: a systematic review and meta-analysis," The Lancet Infect Diseases, 2005, vol. 5, pp. 42-52 (11 pages).
Figueiro et al., "Daylight and Productivity—A Field Study," Panel 8. Human and Social Dimensions of Energy Use: Understanding Markets and Demand, 2002 (10 pages).
Finnegan et al., "Work Attitudes in Windowed vs. Windowless Environments," The Journal of Social Psychology, 1981, vol. 115, pp. 291-292.
First Examination Report issued in IN Application No. 201617032677 dated Jul. 30, 2020, 10 pgs.
Fisk et al., "Age-Related Impairment in Executive Functioning: Updating, Inhibition, Shifting, and Access," Journal of Clinical and Experimental Neuropsychology, 2004, vol. 26, No. 7, pp. 874-890.
Fisk, "Estimates Of Potential Nationwide Productivity And Health Benefits From Better Indoor Environments: An Update," Indoor Air Quality Handbook, 1999 (38 pages).
Fisk, William J. et al., "Estimates Of Potential Nationwide Productivity And Health Benefits From Better Indoor Environments: An Update," 1999 (38 pages).
Fisk, William, "How IEQ Affects Health, Productivity," ASHRAE Journal, 2002, vol. 44, No. 5, pp. 56-60 (4 pages).
Fitzgerald, Sarah, et al.; "A cost-analysis of complex workplace nutrition education and environmental dietary modification interventions", BMC Public Health (2017) 17:49, 10 pgs.
Földváry et al., "Effect of energy renovation on indoor air quality in multifamily residential buildings in Slovakia," Building and Environment, 2017, vol. 122, pp. 363-372.
Fonken et al., "Dim Light at Night Disrupts Molecular Circadian Rhythms and Affects Metabolism," Journal of Biological Rhythms, Author Manuscript, 2013, vol. 28, No. 4 (15 pages).
Food Service Guidelines Federal Workgroup, "Food Service Guidelines for Federal Facilities," 2017, U.S. Department of Health and Human Services, Washington, DC (30 pages).
Fossum et al., "The Association Between Use of Electronic Media in Bed Before Going to Sleep and Insomnia Symptoms, Daytime Sleepiness, Morningness, and Chronotype," Behavioral Sleep Medicine, 2014, vol. 12, pp. 343-357.
Foster et al., "Shortened complex span tasks can reliably measure working memory capacity," Memory & Cognition, 2015, vol. 43, pp. 226-236.
Foster, "Fundamentals of circadian entrainment by light," Lighting Research & Technology, 2021, vol. 53, pp. 377-393.

(56) References Cited

OTHER PUBLICATIONS

Fox, Marilyn L., et al.; "Effects of Stressful Job Demands and Control on Physiological and Attitudinal Outcomes in a Hospital Setting", The Academy of Management Journal, Apr., 1993, vol. 36, No. 2 (Apr., 1993), pp. 289-318.

Frazer K et al., "Impact of institutional smoking bans on reducing harms and secondhand smoke exposure (Review)," Cochrane Database of Systematic Reviews, 2016, Issue 5, pp. 1-85 (87 pages).

Frazer, K et al., "Legislative smoking bans for reducing harms from secondhand smoke exposure, smoking prevalence and tobacco consumption (Review)," Cochrane Database of Systematic Reviews, 2016, Issue 2, pp. 1-192 (194 pages).

Frontczak et al., "Literature survey on how different factors influence human comfort in indoor environments," Building and Environment, 2011, vol. 46, pp. 922-937.

Frontczak, Monika et al., "Literature survey on how different factors influence human comfort in indoor environments," Building and Environment, vol. 46, 2011, pp. 922-937 (16 pages).

Galasiu et al., "Occupant preferences and satisfaction with the luminous environment and control systems in daylit offices: a literature review," Energy and Buildings, 2006, vol. 38, pp. 728-742.

Garn, Joshua V., et al., "The impact of sanitation interventions on latrine coverage and latrine use: A systematic review and meta-analysis," International Journal of Hygiene and Environmental Health, 2017, vol. 220, pp. 329-340 (12 pages).

GBD 2013 Risk Factors Collaborators, "Global, regional, and national comparative risk assessment of 79 behavioural, environmental and occupational, and metabolic risks or clusters of risks in 188 countries, 1990-2013: a systematic analysis for the Global Burden of Disease Study 2013," The Lancet, 2015, vol. 386, pp. 2287-2323.

GBD 2015 Tobacco Collaborators. "Smoking prevalence and attributable disease burden in 195 countries and territories, 1990-2015: a systematic analysis from the Global Burden of Disease Study 2015." Lancet (London, England) vol. 389,10082: 1885-1906, (2017).

GBD 2016 Risk Factors Collaborators, "Global, regional, and national comparative risk assessment of 84 behavioural, environmental and occupational, and metabolic risks or clusters of risks, 1990-2016: a systematic analysis for the Global Burden of Disease Study 2016," The Lancet, 2017, vol. 390, pp. 1345-1422 (78 pages).

Geaney, F., et al., "The effectiveness of workplace dietary modification interventions: A systematic review," Preventive Medicine, 2013, vol. 57, pp. 438-447, 10 pages.

General Services Administrations (GSA), "Sound Matters: How to Achieve Acoustic Comfort in the Contemporary Office", Jan. 2012, 42 pp., Retrieved from https://www.wbdg.org/FFC/GSA/gsa_soundmatters.pdf.

Global, regional, and national disability-adjusted life-years (DALYs) for 315 diseases and injuries and healthy life expectancy (HALE), 1990-2015: a systematic analysis for the Global Burden of Disease Study 2015, www.thelancet.com, vol. 388, Oct. 8, 2016, pp. 1603-1658.

Glorig, A., "The problem of noise in industry", American Journal of Public Health and the Nation's Health, 51(9), 1961, pp. 1338-1346, 9 pp.

Goodman, "Measurement and specification of lighting: A look at the future," Lighting Research and Technology, 2009, vol. 41, pp. 229-243.

Goodman, "Green Wall Frame," Amendment After Allowance, filed May 11, 2016, for U.S. Appl. No. 29/528,147, 8 pages.

Goodman, "Green Wall Frame," Notice of Allowance, dated Feb. 11, 2016, for U.S. Appl. No. 29/528,147, 11 pages.

Goodnough, L.T. et al., "Detection, evaluation, and management of preoperative anaemia in the elective orthopaedic surgical patient: NATA guidelines," British Journal of Anaesthesia, 2011, vol. 106, No. 1, pp. 13-22.

Grant et al., "Daytime Exposure to Short Wavelength-Enriched Light Improves Cognitive Performance in Sleep-Restricted College-Aged Adults," Frontier in Neurology, 2021, vol. 12, pp. 1-10.

Graves, Lee E.F. et al., "Evaluation of sit-stand workstations in an office setting: a randomised controlled trial," BMC Public Health, 2015, vol. 15, No. 1145 (14 pages).

Greenwald, Anthony G et al. "Understanding and using the Implicit Association Test: III. Meta-analysis of predictive validity." Journal of personality and social psychology vol. 97,1: 17-41, (2009), (25 pages).

Grønli et al., "Reading from an iPad or from a book in bed: the impact on human sleep. A randomized controlled crossover trial," Sleep Medicine, 2016, vol. 21, pp. 86-92.

GSky Plant Systems, Inc., "Smart Wall Cabinet," 2012, retrieved from http://gsky.com/green-walls/smartwall/, retrieved on Apr. 29, 2015, 3 pages.

Gueymard, "Turbidity Determination from Broadband Irradiance Measurements: A Detailed Multicoefficient Approach," Journal of Applied Meteorology, 1998, vol. 37, pp. 414-435.

Guirao, "Average Optical Performance of the Human Eye as a Function of Age in a Normal Population," Investigative Ophthalmology & Visual Science, 1999, vol. 40, No. 1, pp. 203-213.

Gunnar, Megan, and Karina Quevedo. "The neurobiology of stress and development." Annual review of psychology vol. 58: 145-73, (2007), (33 pages).

Guyatt et al., "Grade: an emerging consensus on rating quality of evidence and strength of recommendations," BMJ, Apr. 26, 2008, vol. 336, pp. 924-926 (3 pages).

Hafner et al., Why sleep matters—the economic costs of insufficient sleep: A cross-country comparative analysis, 2016 (101 pages).

Haider, B.A. et al., "Anaemia, prenatal iron use, and risk of adverse pregnancy outcomes: systematic review and meta-analysis," BMJ, 2013, pp. 1-19.

Haider, BA et al., "Multiple-micronutrient supplementation for women during pregnancy (Review)," Cochrane Database of Systematic Reviews, 2015, Issue 11, pp. 1-100 (103 pages).

Hajdukiewicz, Magdalena et al., "Calibrated CFD simulation to evaluate thermal comfort in a highly-glazed naturally ventilated room," Building and Environment, 2013, vol. 70, pp. 73-89.

Hajdukiewicz, Magdalena et al., "Formal calibration methodology for CFD models of naturally ventilated indoor environments," Building and Environment, 2012, vol. 59 (28 pages).

Hannibal et al., "Melanopsin Is Expressed in PACAP-Containing Retinal Ganglion Cells of the Human Retinohypothalamic Tract," Investigative Ophthalmology & Visual Science, 2004, vol. 45, No. 11, pp. 4202-4209.

Haq et al., "A review on lighting control technologies in commercial buildings, their performance and affecting factors," Renewable and Sustainable Energy Reviews, 2014, vol. 33, pp. 268-279.

Hasan et al., "Sensitivity study for the PMV thermal comfort model and the use of wearable devices biometric data for metabolic rate estimation," Building and Environment, 2016, vol. 110, pp. 173-183.

Hasan, Mohammad H., et al. "Sensitivity study for the PMV thermal comfort model and the use of wearable devices biometric data for metabolic rate estimation," Building and Environment, 2016, vol. 110, pp. 173-183 (11 pages).

Hastings, R., "Accommodating Seasonal Affective Disorder", https://www.shrm.org/resourcesandtools/hr-topics/employeerelations/pages/accommodatingsad.aspx. Dec. 21, 2009, Accessed Oct. 27, 2017 (3 pages).

Heijnen, Marieke et al., "Shared Sanitation versus Individual Household Latrines: A Systematic Review of Health Outcomes," PLoS ONE, 2014, vol. 9, Issue 4, pp. 1-9 (9 pages).

Hellman, R. P. et al., "Monaural Loudness Function at 1000 cps and Interaural Summation", Journal of Acoustical Society of America 35(6), 1963, pp. 856-865, 11 pp., https://doi.org/10.1121/1.1918619.

Henrich, J., Heine, S. & Norenzayan, A. "Most people are not Weird", Nature 466, 29 (2010), (1 page).

Hensen, "Literature Review on Thermal Comfort in Transient Conditions," Building and Environment, 1990, vol. 25, No. 4, pp. 309-316.

(56) References Cited

OTHER PUBLICATIONS

Hertenstein, Matthew J et al. "The communication of emotion via touch." Emotion (Washington, D.C.) vol. 9,4: 566-73, (2009), (8 pages).
Higuchi et al., "Influence of eye colors of Caucasians and Asians on suppression of melatonin secretion by light," American Journal of Physiology: Regulatory, Integrative and Comparative Physiology, 2007, vol. 292, pp. R2352-R2356.
Hiscocks, "Measuring Light," 2008 (9 pages).
Hiscocks, "Measuring Luminance with a Digital Camera: Case History," 2013 (10 pages).
Hoffman, Steven J, and Charlie Tan. "Overview of systematic reviews on the health-related effects of government tobacco control policies", BMC public health vol. 15 744. Aug. 5, 2015, (11 pages).
Hoisington et al., "Ten questions concerning the built environment and mental health, Building and Environment," 2019, vol. 155, pp. 58-69.
Horne et al., "A Self-Assessment Questionnaire to Determine Morningness-Eveningness in Human Circadian Rhythms," International Journal of Chronobiology, 1976, vol. 4, pp. 97-110.
Hossain, Muttaquina et al., "Evidence-based approaches to childhood stunting in low and middle income countries: a systematic review," Archives of Disease in Childhood, 2017, vol. 102, pp. 903-909.
Hou, Can et al., "Do Mobile Phone Applications Improve Glycemic Control (HbA1c) in the Self-management of Diabetes? A Systematic Review, Meta-analysis, and Grade of 14 Randomized Trials," Diabetes Care, 2016, vol. 39, pp. 2089-2095.
Howieson et al., "Building tight—ventilating right? How are new air tightness standards affecting indoor air quality in dwellings?" Journal of Building Services Engineering Research & Technology, 2014, vol. 35, No. 5, pp. 475-487.
Hu, Yi-meng et al., "Effects of probiotics supplement in patients with type 2 diabetes mellitus: A meta-analysis of randomized trials", Medicina Clínica (English Edition), vol. 148, Issue 8, Apr. 21, 2017, pp. 362-370 (6 pages).
Huang et al., "A study about the demand for air movement in warm environment," Building and Environment, 2013, vol. 61, pp. 27-33.
Huizenga et al., "Air Quality and Thermal Comfort in Office Buildings: Results of a Large Indoor Environmental Quality Survey," Proceedings of Healthy Buildings, 2006, vol. 3, pp. 393-397.
Huizenga, C. et al., "Air Quality and Thermal Comfort in Office Buildings: Results of a Large Indoor Environmental Quality Survey," Proceeding of Healthy Buildings, 2006, vol. 3 (6 pages).
Humphreys, "Quantifying occupant comfort: are combined indices of the indoor environment practicable?" Building Research & Information, 2005, vol. 33, No. 4, pp. 317-325.
Humphreys, Michael A., "Quantifying occupant comfort: are combined indices of the indoor environment practicable?", Building Research & Information, 33:4, 317-325, (2005), (10 pages).
Huo, Jun Sheng et al., "Effect of NaFeEDTA-Fortified Soy Sauce on Anemia Prevalence in China: A Systematic Review and Meta-analysis of Randomized Controlled Trials," Biomedical and Environmental Science, 2015, vol. 28, No. 11, pp. 788-798.
Hutchinson, et al. "Improving nutrition and physical activity in the workplace: a meta-analysis of intervention studies," Health Promotion International, 2012, vol. 27, No. 2, pp. 238-249 (12 pages).
Hysing et al., "Sleep and use of electronic devices in adolescence: results from a large population-based study," BMJ Open, 2015, vol. 5, pp. 1-7.
International Commission on Illumination, Technical Report: Guide on the Limitation of the Effects of Obtrusive Light From outdoor Lighting Installations, 2003 (46 pages).
International Electrotechnical Commission, International Standard, "Electroacoustics—Sound level meters—Part 1: Specifications", Edition 2.0, Sep. 2013, 16 pp.
International Organization for Standardization, "Ergonomics of the thermal environment—Instruments for measuring physical quantities," BS EN ISO 7726, 2nd Edition, 2001 (62 pages).
International Organization for Standardization, "Ergonomics of the thermal environment—Analytical determination and interpretation of thermal comfort using calculation of the PMV and PPD indices and local thermal comfort criteria," ISO 7730, 3rd Edition, 2005 (11 pages).
International Organization for Standardization, "Normal equal-loudness-level-contours", Acoustics, ISO 2nd Edition, 226:2003, 1 p.
International Organization for Standardization, "Acoustics—Measurement of room acoustics parameters—Part 1: Performance Spaces", ISO First Edition, 3382-1, Jun. 15, 2009, 11 pp.
International Search Report and the Written Opinion of the International Searching Authority, dated Jun. 8, 2015, for International Application No. PCT/US2015/017528, 20 pages.
International Search Report and Written Opinion for PCT/US2022/020903, dated Jul. 12, 2022 (17 pages).
International Search Report and Written Opinion of the International Searching Authority, dated Aug. 29, 2016, for International Application No. PCT/US2016/034416, 22 pages.
International Search Report for International Application No. PCT/US2019/050339, dated Nov. 27, 2019 (2 pages).
International Search Report for PCT/JUS2020/019697, dated Jul. 14, 2020 (4 pages).
International Search Report for PCT/US2017/048382, dated Jan. 4, 2018 (4 pages).
International Search Report for PCT/US2018/048853, dated Nov. 21, 2018 (2 pages).
International Search Report issued in International Application No. PCT/US2019/50416, dated Nov. 27, 2019, 1 p.
International Search Report, dated Apr. 28, 2016, for International Application No. PCT/US2016/013215, 5 pages.
International Search Report, dated Dec. 26, 2013, for International Application No. PCT/US2013/057070, 4 pages.
International Search Report, dated Feb. 4, 2011, for International Application No. PCT/US2010/051791, 2 pages.
International Well Building Institute, "The Well Building Standard: Version 1.0," 2015 (220 pages).
Ishihara et al., "Metabolic responses to polychromatic LED and OLED light at night," Scientific Reports, 2021, vol. 11, pp. 1-11.
Jammes, François et al., "Service-Oriented Device Communications Using the Devices Profile for Web Services," 2005 (8 pages).
Jamrozik et al., "A novel methodology to realistically monitor office occupant reactions and environmental conditions using a living lab," Building and Environment, 2018, vol. 130, pp. 190-199.
Japanese Office Action dated Apr. 25, 2017 for JP Application No. 2015-529995, with English summary, 14 pages.
Jenkins et al., "A practical approach to glare assessment for train cabs," Applied Ergonomics, 2015, vol. 47, pp. 170-180.
Jensen, KL, et al.; "Acoustical Quality In Office Workstations, As Assessed By Occupant Surveys", Proceedings: Indoor Air (2002) UC Berkeley Indoor Environmental Quality (IEQ), Sep. 4, 2005, 6 pgs.
Jernigan, "Light studies focus on circadian rhythms," BioPhotonics, Jul. 2009, retrieved from http://www.photonics.com/Article.aspx?PID=I&VID=43&IID=396&AID=38995, retrieved on Nov. 3, 2014, 2 pages.
Jernigan, R., "Light Studies Focus on Circadian Rhythms," Photonics Showcase, Nov. 2009, p. 12.
Job Accommodation Network, "Accommodation and Compliance Series: Employees with Hearing Loss," available at https://askjan.org/media/Hearing.html, accessed Oct. 31, 2017 (25 pages).
Jones, "Chapter 4—Acoustical Treatment for Indoor Areas," in Handbook for Sound Engineers, Ballou (ed.), Burlington, MA, Focal Press, 2008, 65-94.
Jonsson, Ulf et al., "Psychological Treatment of Depression in People Aged 65 Years and Over: A Systematic Review of Efficacy, Safety, and Cost Effectiveness," PLoS ONE, 2016, vol. 11, No. 8, pp. 1-20 (20 pages).
Joshi et al., "The importance of temperature and thermoregulation for optimal human sleep," Energy and Buildings, 2016, vol. 131, pp. 153-157.
Kahn-Marshall, Jennifer L. et al., "Making Healthy Behaviors the Easy Choice for Employees: A Review of the Literature on Envi-

(56) References Cited

OTHER PUBLICATIONS ronmental and Policy Changes in Worksite Health Promotion," Health Education & Behavior, 2012, vol. 39, No. 6, pp. 752-776, (25 pages).
Kakde, S. et al., "A systematic review on the social context of smokeless tobacco use in the South Asian population: Implications for public health," Public Health, 2012, vol. 126, No. 8, pp. 635-645.
Kaplan et al., "Directed Attention as a Common Resource for Executive Functioning and Self-Regulation," Perspectives on Psychological Science, 2010, vol. 5, No. 1, pp. 43-57.
Kaplan, "The Restorative Benefits of Nature: Toward an Integrative Framework," Journal of Environmental Psychology, 1995, vol. 15, pp. 169-182.
Kaplan, Seth, et al. "Measurement of Emotions." Research Methods in Occupational Health Psychology: Measurement, Design, and Data Analysis, 1st ed., Routledge, New York, New York, 2012, pp. 61-75.
Karjalainen et al., "User problems with individual temperature control in offices," Building and Environment, 2007, vol. 42, pp. 2880-2887.
Karjalainen, "Thermal comfort and gender: a literature review," Indoor Air, 2012, vol. 22, pp. 96-109.
Kastner, Wolfgang et al., "Communication Systems for Building Automation and Control," Proceedings of the IEEE, 2005, vol. 93, No. 6, pp. 1178-1203.
Kennedy et al., "Smoke-Free Policies in U.S. Prisons and Jails: A Review of the Literature," (Author Manuscript) Nicotine & Tobacco Research , 2015, vol. 17, No. 6 (14 pages).
Khunti, Kamlesh et al., "Association Between Adherence to Pharmacotherapy and Outcomes in Type 2 Diabetes: A Meta-analysis," Diabetes Care, 2017, vol. 40, pp. 1588-1596.
Kim, J. et al., "Workspace satisfaction: The privacy-communication trade-off in open-plan offices", Journal of Environmental Psychology 36, (2013), pp. 18-26, 9 pp.
Kinney, "Climate Change, Air Quality, and Human Health," American Journal of Preventive Medicine, 2008, vol. 35, No. 5, pp. 459-467.
Klein, Laura et al., "Coordinating occupant behavior for building energy and comfort management using multi-agent systems," Automation In Construction, vol. 22, Mar. 2012, pp. 525-536.
Klepeis et al., "The National Human Activity Pattern Survey (NHAPS): a resource for assessing exposure to environmental pollutants," Journal of Exposure Analysis and Environmental Epidemiology, 2001, vol. 11, No. 3, pp. 231-252.
Knai, Cécile C. et al., "Are the Public Health Responsibility Deal alcohol pledges likely to improve public health? An evidence synthesis," Addiction, 2015, vol. 110, No. 8 (29 pages).
Knudsen et al., "Sensory and chemical characterization of VOC emissions from building products: impact of concentration and air velocity," Atmospheric Environment, 1999, vol. 33, pp. 1217-1230.
Kong et al., "The impact of interior design on visual discomfort reduction: A field study integrating lighting environments with POE survey," Building and Environment, 2018, vol. 138, pp. 135-148.
Konstantzos et al., "The effect of lighting environment on task performance in buildings—A review," Energy & Buildings, 2020, vol. 226, pp. 1-14.
Kool et al., "Decision Making and the Avoidance of Cognitive Demand," Journal of Experimental Psychology: General, 2010, vol. 139, No. 4, pp. 665-682.
Korotcenkov et al., "In2O3- and SnO2-Based Thin Film Ozone Sensors: Fundamentals," Journal of Sensors, 2016, vol. 2016 (32 pages).
Kota, Sandeep et al., "Historical Survey of Daylighting Calculations Methods and Their Use in Energy Performance Simulations," Proceedings of the Ninth International Conference for Enhanced Building Operations, Nov. 17-19, 2009, Austin, Texas (9 pages).
LaCaille et al., "Go!: results from a quasi-experimental obesity prevention trial with hospital employees," BMC Public Health, 2016, vol. 17, No. 171, pp. 1-16 (16 pages).
Lai et al., "An evaluation model for indoor environmental quality (IEQ) acceptance in residential buildings," Energy and Buildings, 2009, vol. 41, pp. 930-936.
Lai et al., "Perceived Importance of the Quality of the Indoor Environment in Commercial Buildings," Indoor and Built Environment, 2007, vol. 16, No. 4, pp. 311-321.
Lai et al., "Perception of importance and performance of the indoor environmental quality of high-rise residential buildings," Building and Environment, 2009, vol. 44, pp. 352-360.
Lai et al., "An evaluation model for indoor environmental quality (IEQ) acceptance in residential buildings," 2009, vol. 41, pp. 930-9636.
Lai, A.C.K, et al.; "An evaluation model for indoor environmental quality (IEQ) acceptance in residential buildings", Energy and Buildings 41 (2009) 930-936.
Lai, H. K., and Yik, F. W. H., "Perception of importance and performance of the indoor environmental quality of high-rise residential buildings", Building and Environment, 44(2), 352-360 (2009).
Lai, Joseph H. K. and Francis W.H. Yik. "Perceived Importance of the Quality of the Indoor Environment in Commercial Buildings." Indoor and Built Environment 16: 311-321, (2007).
Lal, Avtar, et al., "The Effect of Physical Exercise After a Concussion: A Systematic Review and Meta-analysis," The American Journal of Sports Medicine, 2018, vol. 43, Issue 3, pp. 743-752 (10 pages).
Lan et al., "Ten questions concerning thermal environment and sleep quality," Building and Environment, 2016, vol. 99, pp. 252-259.
Land, "Using Vitamin C To Neutralize Chlorine in Water Systems," Recreation Management Tech Tips, Apr. 2005, retrieved from http://www.fs.fed.us/t-d/pubs/html/05231301/05231301.html, retrieved on Mar. 1, 2016, 6 pages.
Landrigan, Phillip J., "Air pollution and health," The Lancet Public Health, 2017, vol. 2, No. 1, pp. e4-e5.
Larson, Nicole et al., "A Review of Environmental Influences on Food Choices," Annals of Behavioral Medicine : A Publication of the Society of Behavioral Medicine, 2009, vol. 38 Suppl 1, pp. S56-73.
Lassi et al., "Impact of education and provision of complementary feeding on growth and morbidity in children less than 2 years of age in developing countries: a systematic review," BMC Public Health, 2013, vol. 13, pp. 1-10 (10 pages).
Leather et al., "Windows in the Workplace: Sunlight, View, and Occupational Stress," Environment and Behavior, 1998, vol. 30, No. 6, pp. 739-762.
Leavitt, Keith, et al.; "Asking about well-being gets you half an answer: Intra-individual processes of implicit and explicit job attitudes", Journal of Organizational Behavior, J. Organiz. Behav. 32, 672-687 (2011).
Leder et al., "Effects of office environment on employee satisfaction: a new analysis," Building Research and Information, 2015 (22 pages).
Lee, Courtney, et al., "The effectiveness of acupuncture research across components of the trauma spectrum response (tsr): a systematic review of reviews," Systematic Reviews, 2012, vol. 1, Article 46, pp. 1-18 (18 pages).
Leech et al., "It's about time: A comparison of Canadian and American time-activity patterns," Journal of Exposure Analysis and Environmental Epidemiology, 2002, vol. 12, No. 6, pp. 427-432.
Leidinger et al., "Selective detection of hazardous VOCs for indoor air quality applications using a virtual gas sensor array," Journal of Sensors and Sensor Systems, 2014, vol. 3, pp. 253-263.
Levy et al., "Ozone Exposure and Mortality: An Empiric Bayes Metaregression Analysis," Epidemiology, 2005, vol. 16, No. 4, pp. 458-468.
Lewtas, "Air pollution combustion emissions: Characterization of causative agents and mechanisms associated with cancer, reproductive, and cardiovascular effects," Reviews in Mutation Research, 2007, vol. 636, pp. 95-133.
Li et al., "Health promotion interventions and policies addressing excessive alcohol use: A systematic review of national and global

(56) References Cited

OTHER PUBLICATIONS evidence as a guide to health-care reform in China," HHS Public Access, Author Manuscript, 2015, vol. 110, No. 1, pp. 1-18 (18 pages).
Li, Danny H. W., et al.; "A simplified procedure for determining indoor daylight illuminance using daylight coefficient concept", Building and Environment 41 (2006) 578-589.
Licht.wissen 19: Impact of Light on Human Beings, licht.de, Mar. 2014 (56 pages).
Licina et al., "Concentrations and Sources of Airborne Particles in a Neonatal Intensive Care Unit," PLOS One, 2016 (17 pages).
Licina et al., "Emission rates and the personal cloud effect associated with particle release from the perihuman environment," Indoor Air, 2017, vol. 27, pp. 791-802.
Liu et al., "Human thermal adaptive behaviour in naturally ventilated offices for different outdoor air temperatures: A case study in Changsha China," Building and Environment, 2012, vol. 50, pp. 76-89.
Liu et al., "A Survey on Gas Sensing Technology," Sensors, 2012, vol. 12, pp. 9635-9665.
Löndahl et al., "A set-up for field studies of respiratory tract deposition of fine and ultrafine particles in humans," Journal of Aerosol Science, 2006, vol. 37, pp. 1152-1163.
Luedtke, Kerstin et al., "Efficacy of interventions used by physiotherapists for patients with headache and migraine—Systematic review and meta-analysis," Cephalalgia, 2015 (20 pages).
Luke, "Evaluating significance in linear mixed-effects models in R," Behavior Research Methods, 2017, vol. 49, pp. 1494-1502.
Luttmann, Alwin et al., "Preventing Musculoskeletal Disorders in the Workplace," World Health Organization, Protecting Workers' Health Series No. 5, 2003 (40 pages).
MacArthur, Georgie J. et al., "Peer-led interventions to prevent tobacco, alcohol and/or drug use among young people aged 11-21 years: a systematic review and meta-analysis," 2016, Addiction, vol. 111, pp. 391-407 (17 pages).
Macary et al., "Systems, Methods and Articles for Monitoring and Enhancing Human Wellness," U.S. Appl. No. 15/543,114, filed Jul. 12, 2017, 113 pages.
Maes, Lea et al., "Effectiveness of workplace interventions in Europe promoting healthy eating: a systematic review," European Journal of Public Health, 2012, vol. 22, No. 5, pp. 677-683.
Mahyuddin et al., "The spatial distribution of carbon dioxide in rooms with particular application to classrooms," Indoor and Built Environment, 2014, vol. 23, No. 3, pp. 433-448.
Majidi, F. et al., "Study of Noise Map and its Features in an Indoor Work Environment through GIS-Based Software", Journal of Human, Environment and Health Promotion, 2016; 1(3), pp. 138-142, 6 pp.
Mardaljevic, J., et al.; "Daylighting Metrics: Is There A Relation Between Useful Daylight Illuminance And Daylight Glare Probability?", First Building Simulation and Optimization Conference Loughborough, UK, Sep. 10-11, 2012, 189-196.
Marinelli et al., "Hours of Television Viewing and Sleep Duration in Children: A Multicenter Birth Cohort Study," JAMA Pediatrics, 2014, vol. 168, No. 5, pp. 458-464.
Markus, "The Function of Windows—A Reappraisal," Building Science, 1967, vol. 2, pp. 97-121.
Massey et al., "Emission and Formation of Fine Particles from Hardcopy Devices: the Cause of Indoor Air Pollution," Monitoring, Control and Effects of Air Pollution, 2001, pp. 121-134.
MBI Products Company, "Room Acoustics", 1992, 2 pp., Retrieved from http://mbiproducts.com/static/mbi_1/media/misc/RoomAcoustics.pdf.
McCullough et al., "Determining temperature ratings for children's cold weather clothing," Applied Ergonomics, 2009, vol. 40, pp. 870-877.
McIntyre, "Response to Atmospheric Humidity at Comfortable Air Temperature: A Comparison of Three Experiments," Annals of Occupational Hygiene, 1978, vol. 21, pp. 177-190.
McKay, Alisa J. et al.,, "Strategies for Tobacco Control in India: A Systematic Review," PLOS One, 2015, vol. 4. pp. 1-34 (34 pages).
Meerbeek et al., "Impact of blinds usage on energy consumption: automatic versus manual control," conference paper, 2014 (17 pages).
Meister et al., "Low-Level Visual Processing: The Retina," Chapter 26, Principles of Neural Science, 2014, pp. 577-601.
Mendell et al., "Improving the Health of Workers in Indoor Environments: Priority Research Needs for a National Occupational Research Agenda," American Journal of Public Health, 2002, vol. 92, No. 9, pp. 1430-1440.
Mendell, et al. "Improving the Health of Workers in Indoor Environments: Priority Research Needs for a National Occupational Research Agenda," American Journal of Public Health, 2002, vol. 92, No. 9, pp. 1430-1440 (11 pages).
Merz, Victoire et al., "Brief interventions to prevent recurrence and alcohol-related problems in young adults admitted to the emergency ward following an alcohol-related event: a systematic review," Journal of Epidemiology and Community Health, 2015, vol. 69, No. 9, pp. 912-917.
Messer, Alan et al., "InterPlay: A Middleware for Seamless Device Integration and Task Orchestration in a Networked Home," Proceedings of the Fourth Annual IEEE International Conference on Pervasive Computing and Communications, 2006 (10 pages).
Miedema, H. et al., "Annoyance from transportation noise: Relationships with Exposure Metrics DNL and DENL and Their Confidence Intervals", Environmental Health Perspectives, 109(4), Apr. 2001, pp. 409-416, 8 pp., https://doi.org/10.1289/ehp.01109409.
Mingkhwan, A. et al., "Dynamic service composition in home appliance networks," Multimedia Tools and Applications, 2006, vol. 29, pp. 257-284.
Minichiello, Alexa et al., "Effective strategies to reduce commercial tobacco use in Indigenous communities globally: A systematic review," BMC Public Health, 2016, vol. 16, No. 21 (25 pages).
Mitchell, Lana J. et al., "Effectiveness of dietetic consultations in primary health care: A systematic review of randomized controlled trials," Journal of the Academy of Nutrition and Dietetics, 2017 (41 pages).
Miyake et al., "The Unity and Diversity of Executive Functions and Their Contributions to Complex "Frontal Lobe" Tasks: A Latent Variable Analysis," Cognitive Psychology, 2000, vol. 41, pp. 49-100.
Mold Inspection California, "Killing Mold With Ozone & Thermal Heat," retrieved from http://moldinspectioncalifornia.com/kill_mold_with_ozone.html, 3 pages.
Monson, Eva et al., "Effects of Enactment of Legislative (Public) Smoking Bans on Voluntary Home Smoking Restrictions: A Review," Nicotine & Tobacco Research, 2017, vol. 19, No. 2, pp. 141-148.
Moore-Ede et al., "Circadian Potency Spectrum with Extended Exposure to Polychromatic White LED Light under Workplace Conditions," Journal of Biological Rhythms, 2020, vol. 35, No. 4, pp. 405-415.
Moore-Ede et al., "LEDs must spectrally balance illumination, circadian health, productivity, and energy efficiency," LEDs Magazine, available at least as early as Aug. 2021 at https://www.ledsmagazine.com/lighting-health-wellbeing/article/14199941/ideal-led-lighting-must-balance-multiple-objectives-magazine (14 pages).
Moya-Albiol, Luis et al. "Job satisfaction and cortisol awakening response in teachers scoring high and low on burnout." The Spanish journal of psychology vol. 13,2: 629-36, (2010).
Muzet, A., "Environmental noise, sleep and health", Sleep Medicine Reviews (2007) 11, pp. 135-142, 8 pp., https://doi.org/10.1016/j.smrv.2006.09.001.
Myhren, Jonn Are et al., "Flow patterns and thermal comfort in a room with panel, floor and wall heating," Energy and Buildings, 2008, vol. 40, 524-536.
Nabil et al., "Useful daylight illuminances: A replacement for daylight factors," Energy and Buildings, 2006, vol. 38, pp. 905-913.
Nabil, A. and Mardaljevic, John, "Useful daylight illuminance: A new paradigm for assessing daylight in buildings", Lighting Research & Technology—Lighting Res Technol. 37. 41-59, (2005).
Nabil, Azza and John Mardaljevic. "Useful daylight illuminances: A replacement for daylight factors." Energy and Buildings 38: 905-913, (2006).

(56) References Cited

OTHER PUBLICATIONS

Nair, Natasha K. et al., "A Systematic Review of Digital and Computer-Based Alcohol Intervention Programs in Primary Care," Current Drug Abuse Reviews, 2015, vol. 8, No. 2, pp. 1-8.

National Center for Chronic Disease Prevention and Health Promotion, Division for Heart Disease and Stroke Prevention, "Under Pressure: Strategies for Sodium Reduction in Worksites ," Centers for Disease Control and Prevention, 2012, pp. 1-9 (12 pages).

National Center for Health Statistics (CDC), National Health Interview Survey (Adult Physical Activity Information; Glossary), https://www.cdc.gov/nchs/nhis/physical_activity/pa_glossary.htm, 2017 (2 pages).

National Lighting Product Information Program, "Photosensors: Dimming and Switching Systems for Daylight Harvesting," Specifier Reports, 2007, vol. 11, No. 1 (54 pages).

NaturVention, "Science," URL=https://www.naturvention.com/technology-and-science/science/, download date Apr. 5, 2016, 4 pages.

NaturVention, "Technology," URL=https://www.naturvention.com/technology-and-science/, download date Apr. 5, 2016, 6 pages.

Ne'eman et al., "Office Worker Response to Lighting and Daylighting Issues in Workspace Environments: A Pilot Survey," Energy and Buildings, 1984, vol. 6, pp. 159-171.

Newsham, "Clothing as a thermal comfort moderator and the effect on energy consumption," Energy and Buildings, 1997, vol. 26, pp. 283-291.

Newsham, Guy R.; "Clothing as a thermal comfort moderator and the effect on energy consumption", Energy and Buildings 26 (1997) 283-291.

Ni Mhurchu, Cliona et al., "Effects of worksite health promotion interventions on employee diets: a systematic review," BMC Public Health, 2010, vol. 10, No. 62, (7 pages).

Nicol et al., "A critique of European Standard EN 15251: strengths, weaknesses and lessons for future standards," Building Research & Information, 2011, vol. 39, No. 2, pp. 183-193.

Nie et al., "The effects of dynamic daylight☐ like light on the rhythm, cognition, and mood of irregular shift workers in closed environment," Scientific Reports, 2021, vol. 11, No. 13059, pp. 1-11.

Nieuwenhuijsen, K. et al., "Interventions to improve return to work in depressed people (Review)," The Cochrane Library, 2014, Issue 12, pp. 1-140 (143 pages).

Ning, Mao et al., "Experimental and numerical studies on the performance evaluation of a bed-based task/ambient air conditioning (TAC) system," Applied Sciences, 2014, vol. 136, pp. 956-967.

Novoselac et al., "A critical review on the performance and design of combined cooled ceiling and displacement ventilation systems," Energy and Buildings, 2002, vol. 34, pp. 497-509.

O'Brien et al., "Manually-operated window shade patterns in office buildings: A critical review," Building and Environment, 2013, vol. 60, pp. 319-338.

Oberg, Mattias et al. "Worldwide burden of disease from exposure to second-hand smoke: a retrospective analysis of data from 192 countries." Lancet (London, England) vol. 377,9760: 139-46, (2011).

Obiltschnig, Günter, "Automatic Configuration and Service Discovery for Networked Smart Devices," Electronica Embedded Conference Munich, 2006 (8 pages).

Office Action issued in CN Application No. 201580021358.5 dated Feb. 2, 2019, 40 pgs.

Office Action issued in CN Application No. 201680009629.X dated Jul. 23, 2020, 3 pgs.

Office Action issued in MX Application No. MX/a/2016/011107, 7 pgs.

Office Action, dated May 21, 2018, for U.S. Appl. No. 15/121,953, Pillai et al., "Systems and Articles for Enhancing Wellness Associated With Habitable Environments," 38 pages.

Office Action, dated May 31, 2018, for U.S. Appl. No. 15/421,046, Eisele et al., "LED Lighting System," 9 pages.

Office Action, dated Oct. 27, 2017, for U.S. Appl. No. 15/421,046, Eisele et al., "LED Lighting System," 8 pages.

Ormandy et al., "Health and thermal comfort: From WHO guidance to housing strategies," Energy Policy, 2012, vol. 49, pp. 116-121 (6 pages).

Osilla, Karen Chan, et al., "Systematic review of the Impact of Worksite Wellness Programs," The American Journal of Managed Care, 2012, vol. 18, No. 2, pp. e68-e81, (14 pages).

OxiTitan, "Light Powered Protection," retrieved from http://www.oxititan.com, retrieved on Aug. 13, 2012, 2 pages.

Oxizidis, S., et al.; "Typical Weather Years and the Effect of Urban Microclimate on the Energy Behaviour of Buildings and HVAC Systems", Advances in Building Energy Research, 2007, vol. 1, 26 pages.

Pachón, Helena et al., "Evidence of the effectiveness of flour fortification programs on iron status and anemia: a systematic review," Nutrition Reviews, 2015, vol. 73, No. 11, pp. 780-795.

Painter et al., "Practical application of a sensor overlay system for building monitoring and commissioning," Energy and Buildings, 2012, vol. 48, pp. 29-39.

Panda et al., "Coordinated Transcription of Key Pathways in the Mouse by the Circadian Clock," Cell, 2002, vol. 109, pp. 307-320.

Park et al., "Variations of formaldehyde and VOC levels during 3 years in new and older homes," Indoor Air, 2006, vol. 16, pp. 129-135.

Park, "Are Humans Good Sensors? Using Occupants as Sensors for Indoor Environmental Quality Assessment and for Developing Thresholds that Matter," thesis, 2015 (274 pages).

Pasricha, Sant-Ryan et al., "Effect of daily iron supplementation on health in children aged 4-23 months: a systematic review and meta-analysis of randomised controlled trials," The Lancet Global Health, 2013, vol. 1, pp. e77-e86.

Passey, Megan E. et al., "Smoke-free homes: what are the barriers, motivators and enablers? A qualitative systematic review and thematic synthesis," BMJ Open, 2016, vol. 6, pp. 1-16 (16 pages).

Pasut, Wilmer et al., "Energy-efficient comfort with a heated/cooled chair: Results from human subject tests," Building and Environment, 2015, vol. 84, pp. 10-21.

Pattakos, Alex, et al.; "Discovering Meaning Through the Lens of Work", Journal of Constructivist Psychology, 30:1, 42-49 (2017), (9 pages).

Peña-Rosas et al. "Intermittent oral iron supplementation during pregnancy (Review)," Cochrane Database of Systematic Reviews, 2015, Issue 10, pp. 1-186 (193 pages).

Pennebaker, James W. "Writing about Emotional Experiences as a Therapeutic Process." Psychological Science 8, No. 3: 162-66, (1997).

Pennebaker, James W., et al.; "Accelarating the Coping Process", Journal of Personality and Social Psychology, 1990, vol. 58, No. 3, 528-537.

Perez et al., "All-Weather Model For Sky Luminance Distribution—Preliminary Configuration and Validation," Solar Energy, 1993, vol. 50, No. 3, pp. 235-245.

Persily, "Evaluating Building IAQ and Ventilation with Indoor Carbon Dioxide," ASHRAE Transactions, 1997, vol. 103 (12 pages).

Pervez et al., "Photonic Crystal Spectrometer," U.S. Appl. No. 61/278,773, filed Oct. 12, 2009, 78 pages.

Pervez et al., "Photonic Crystal Spectrometer," U.S. Appl. No. 61/349,570, filed May 28, 2010, 52 pages.

Peuhkuri et al., "Diet promotes sleep duration and quality," Nutrition Research, 2012, vol. 32, pp. 309-319.

Phillips et al., "High sensitivity and interindividual variability in the response of the human circadian system to evening light," Proceedings of the National Academy of Sciences of the United States of America, 2019, vol. 116, No. 24, pp. 12019-12024.

Phipps-Nelson et al., "Daytime Exposure to Bright Light, as Compared to Dim Light, Decreases Sleepiness and Improves Psychomotor Vigilance Performance," Sleep, 2003, vol. 26, No. 6, pp. 695-700.

Piccolo et al., "Effect of switchable glazing on discomfort glare from windows," Building and Environment, 2009, vol. 44, pp. 1171-1180.

Pillai et al., "Systems, Methods and Articles for Enhancing Wellness Associated With Habitable Environments," Amendment, filed Jul. 21, 2016, for U.S. Appl. No. 14/012,444, 25 pages.

(56) References Cited

OTHER PUBLICATIONS

Pillai et al., "Systems, Methods and Articles for Enhancing Wellness Associated With Habitable Environments," Office Action, dated Mar. 22, 2016, for U.S. Appl. No. 14/012,444, 29 pages.
Pillai et al., "Systems, Methods and Articles for Enhancing Wellness Associated With Habitable Environments," Preliminary Amendment, filed Mar. 25, 2015, for U.S. Appl. No. 14/012,444, 149 pages.
Pillai et al., "Systems, Methods and Articles for Enhancing Wellness Associated With Habitable Environments," U.S. Appl. No. 15/409,233, filed Jan. 18, 2017, 84 pages.
Pillai et al., "Systems, Methods and Articles for Enhancing Wellness Associated With Habitable Environments," U.S. Appl. No. 15/421,022, filed Jan. 31, 2017, 84 pages.
Plotnikoff, Ronald et al., "Effectiveness of Interventions Targeting Health Behaviors in University and College Staff: A Systematic Review," American Journal of Health Promotion, 2015, vol. 29, No. 5 (20 pages).
Potter et al., "Circadian Rhythm and Sleep Disruption: Causes, Metabolic Consequences, and Countermeasures," Endocrine Reviews, 2016, vol. 37, No. 6, pp. 584-608.
Preliminary Amendment, filed Jul. 12, 2017, for U.S. Appl. No. 15/543,114, Macary et al., "Systems, Methods and Articles for Monitoring and Enhancing Human Wellness," 10 pages.
Preto et al., "Lighting in the Workplace: Recommended Illuminance (lux) at Workplace Environs," Advances in Design for Inclusion, 2019, pp. 180-191.
Provencio et al., "A Novel Human Opsin in the Inner Retina," The Journal of Neuroscience, 2000, vol. 20, No. 2, pp. 600-605.
Prudhon, Claudine et al., "WHO, UNICEF, and SCN Informal Consultation on Community-Based Management of Severe Malnutrition in Children," SCN Nutrition Policy Paper No. 21, Food and Nutrition Bulletin, 2006, vol. 27, No. 3 (supplement), The United Nations University, pp. s3-s108 (108 pages).
Pruessner, Jens C., et al.; "Burnout, Perceived Stress, and Cortisol Responses to Awakening", Psychosomatic Medicine 61:197-204 (1999).
Rabbie, Harold M., "Distributed Processing Using Local Operating Networks," Assembly Automation, 1992, vol. 12, No. 1 (7 pages).
Rea, "Window Blind Occlusion: a Pilot Study," Building and Environment, 1984, vol. 19, No. 2, pp. 133-137.
Reinhart et al., "Monitoring manual control of electric lighting and blinds," Lighting Research & Technology, 2003, vol. 35, No. 3, pp. 243-260.
Revel et al., "Integration of real-time metabolic rate measurement in a low-cost tool for the thermal comfort monitoring in AAL environments," Ambient Assisted Living , 2015 (11 pages).
Roberge et al., Operational Amplifiers: Theory and Practice, Second Edition, 2007 (104 pages).
Rocha, Maria C. et al., "Stress among nurses: An examination of salivary cortisol levels on work and day off", Revista da Escola de Enfermagem da U S P. 47. 1187-1194 (2013).
Romm et al., Greening the Building and the Bottom Line: Increasing Productivity Through Energy-Efficient Design, 1994 (17 pages).
Rosen, Laura J. et al., "Effectiveness of Interventions to Reduce Tobacco Smoke Pollution in Homes: A Systematic Review and Meta-Analysis," International Journal of Environmental Research and Public Health, 2015, vol. 12, pp. 16043-16059.
Rubin et al., "Window Blinds as a Potential Energy Saver—A Case Study," National Bureau of Standards Building Science Series 112, 1978 (89 pages).
Safizadeh, M. Reza, et al.; "Evaluation of Radiant Ceiling Heating Systems for Renovated Buildings based on Thermal Comfort Criteria", Windsor Conference Rethinking comfort, Apr. 12-15, 2018, 16 pgs.
Saif, Umar, "Architectures for ubiquitous systems," University of Cambridge Computer Laboratory Technical Report No. 527, 2002 (271 pages).
Saini et al., "The Mammalian Circadian Timing System: Synchronization of Peripheral Clocks," Cold Spring Harbor Symposia on Quantitative Biology, 2011, vol. 76 (10 pages).

Salter, Charles M. etal.; "Case studies of a method for predicting speech privacy in the contemporary workplace", UC Berkeley Indoor Environmental Quality (IEQ), Center for the Build Environment, 2003, 48 pgs.
Salthammer et al. "Formaldehyde in the Indoor Environment," Chemical Reviews, 2010, vol. 110, No. 4, pp. 2536-2572.
Sandberg et al., "Experimental Methods in Ventilation," Advances in Building Energy Research, 2008, vol. 2, No. 1, pp. 159-210.
Sarigiannis et al., "Multi-objective optimization of air quality monitoring," Environmental Monitoring Assessment, 2008, vol. 136, pp. 87-99.
Satish et al., "Is $CO_2$ an Indoor Pollutant? Direct Effects of Low-to-Moderate $CO_2$ Concentrations on Human Decision-Making Performance," Environmental Health Perspectives, 2012, vol. 120, No. 12, pp. 1671-1677.
Sbar et al., "Electrochromic dynamic windows for office buildings," International Journal of Sustainable Built Environment, 2012, vol. 1, pp. 125-139.
Schellen et al., "Differences between young adults and elderly in thermal comfort, productivity, and thermal physiology in response to a moderate temperature drift and a steady-state condition," Indoor Air, 2010, vol. 20, pp. 273-283.
Schlegel, "The Relative Effects of Convection And Radiation Heat Transfer on the Thermal Sensations of Sedentary Subjects," 1968 (73 pages).
Schlegel, Jay C., "The Relative Effects Of Convection And Radiation Heat Transfer On The Thermal Sensations of Sedentary Objects", Kansas State University, (1968), (73 pages).
Schröer, S. et al., "Evidence-based lifestyle interventions in the workplace—an overview," Occupational Medicine, 2014, vol. 64, pp. 8-12.
Schweizer et al., "Indoor time-microenvironment-activity patterns in seven regions of Europe," Journal of Exposure Analysis and Environmental Epidemiology, 2007, vol. 17, No. 2, pp. 170-181.
Semenova et al., "Association of the melatonin circadian rhythms with clock 3111T/C gene polymorphism in Caucasian and Asian menopausal women with insomnia," Chronobiology International, 2018 (12 pages).
Seppänen et al., "Association of Ventilation Rates and $CO_2$ Concentrations with Health and Other Responses in Commercial and Institutional Buildings," Indoor Air, 1999, vol. 9, pp. 226-252.
Seppänen et al., "Summary of human responses to ventilation," Indoor Air, 2004, vol. 14, pp. 102-118.
Seppänen, O.A., et al., "Summary of human responses to ventilation," Indoor Air, 2004, vol. 14, Suppl. 7, pp. 102-118 (17 pages).
Shea, Beverley J., et al.; "Development of AMSTAR: a measurement tool to assess the methodological quality of systematic reviews", BMC Medical Research Methodology 2007, 7:10, 7 pgs.
Shearer, Jane et al., "Nutra-ergonomics: influence of nutrition on physical employment standards and the health of workers," Applied Physiology, Nutrition, and Metabolism, 2016, vol. 41, pp. S165-S174 (10 pages).
Siemens, "Demand-controlled ventilation: Control strategy and applications for energy-efficient operation," publicly available at least as early as May 21, 2018 (72 pages).
Smith-McLallen, Aaron et al., "Comparative Effectiveness of Two Walking Interventions on Participation, Step Counts, and Health," American Journal of Health Promotion, 2016 (9 pages).
Smith, Emma et al. "The global burden of other musculoskeletal disorders: estimates from the Global Burden of Disease 2010 study." Annals of the rheumatic diseases vol. 73,8: 1462-9, (2014).
Smith, GA et al., "Oral or parenteral iron supplementation to reduce deferral, iron deficiency and/or anaemia in blood donors (Review)," Cochrane Database of Systematic Reviews, 2014, Issue 7, pp. 1-120 (124 pages).
Song, "Could sperm quality be affected by a building environment? A literature review," Building and Environment, 2010, vol. 45, pp. 936-943.
Song, Gook-Sup; "Could sperm quality be affected by a building environment? A literature review", Building and Environment 45 (2010) 936-943.

(56) References Cited

OTHER PUBLICATIONS

Sorensen, Glorian, et al., "Worksite-based research and initiatives to increase fruit and vegetable consumption," Preventive Medicine, 2004, vol. 39, pp. S94-S100 (7 pages).
Sørensen, M. et al., "Road traffic noise and incident myocardial infarction: A prospective cohort study", PLoS ONE, www.plosone.org, Jun. 2012, 7(6), 7 pp. https://doi.org/10.1371/journal.pone.0039283.
Spinellis, "The information furnace: consolidated home control," Personal and Ubiquitous Computing, 2003, vol. 7, pp. 53-69.
Stansfeld, S. A. et al., "Noise pollution: Non-auditory effects on health", British Medical Bulletin 2003, vol. 68, pp. 243-257, 16 pp., https://doi.org/10.1093/bmb/ldg033.
Steger, Michael, et al. "Measuring meaningful work: The Work as Meaning Inventory (WAMI)", Journal of Career Assessment—J Career Assessment. 20. 322-337,(2012).
Storch et al., "Extensive and divergent circadian gene expression in liver and heart," Nature, 2002, vol. 417 (8 pages).
Stout, J., "Speech Privacy Standards", Cambridge Sound Management, Inc., 2015, 7 pp., Retrieved from http://cambridgesound.com/wp-content/uploads/2015/10/Speech-Privacy-Standards.pdf.
Strauss et al., "Influence of Heat and Humidity on the Airway Obstruction Induced by Exercise in Asthma," The Journal of Clinical Investigation, 1978, vol. 61, pp. 433-440.
Strauss, Richard. H., et al.; "Influence of Heat and Humidity on the Airway Obstruction Induced by Exercise in Asthma", The Journal of Clinical Investigation, vol. 61, Feb. 1978, 433-440.
Strøm-Tejsen et al., "The effects of bedroom air quality on sleep and next-day performance," Indoor Air, 2016, vol. 26, pp. 679-686.
Summons to attend oral proceedings issued in EP Application No. 15754628.4 on Sep. 10, 2018, 13 pgs.
Sunde et al., "Blue-Enriched White Light Improves Performance but Not Subjective Alertness and Circadian Adaptation During Three Consecutive Simulated Night Shifts," Frontiers in Psychology, 2020, vol. 11, No. 2172, pp. 1-16.
Suryadevara, N.K. et al., "Sensor data fusion to determine wellness of an elderly in intelligent home monitoring environment", Instrumentation and Measurement Technology Conference, Graz: IEEE, (2012), ISSN 1091-5281, pp. 947-952, XP032451677.
Sutter et al., "The use of shading systems in VDU task offices: A pilot study," Energy and Buildings, 2006, vol. 38, pp. 780-789.
Swaminathan et al., "Are Individual Differences in Sleep and Circadian Timing Amplified by Use of Artificial Light Sources?," Journal of Biological Rhythms, 2017, vol. 32, No. 2, pp. 165-176.
Szigeti et al., "Spatial and temporal variation of particulate matter characteristics within office buildings—The OFFICAIR study," Science of the Total Environment, 2017, vol. 587-588, pp. 59-67.
Tähkämö et al., "Systematic review of light exposure impact on human circadian rhythm," Chronobiology International: The Journal of Biological and Medical Rhythm Research, 2019, vol. 36, No. 2, pp. 151-170.
Tan, Ai May et al., "Efficacy of a workplace osteoporosis prevention intervention: a cluster randomized trial," BMC Public Health, 2016, vol. 16, No. 859 (14 pages).
Tansil, Kristin A. et al., "Alcohol Electronic Screening and Brief Intervention: A Community Guide Systematic Review," American Journal of Preventative Medicine Author Manuscript, 2016 (19 pages).
Taylor et al., "Impact of Booster Breaks and Computer Prompts on Physical Activity and Sedentary Behavior Among Desk-Based Workers: A Cluster-Randomized Controlled Trial," Preventing Chonic Disease Public Health Research, Practice, and Policy, Centers for Disease Control and Prevention, Nov. 2016, vol. 13, E155, pp. 1-15 (16 pages).
Te Kulve et al., "Early evening light mitigates sleep compromising physiological and alerting responses to subsequent late evening light," Scientific Reports, 2019, vol. 9, No. 16064, pp. 1-12.
Tebb et al., "Use of theory in computer-based interventions to reduce alcohol use among adolescents and young adults: a systematic review," BMC Public Health, 2016, vol. 16, No. 517, pp. 1-33.
Techau, David et al. "Buildings, Brains and Behaviour: Towards an affective neuroscience of architecture: The Hedonic Impact of Sustainable Work Environments on Occupant Well-being," World Health Design, 2016, pp. 24-37.
Tennessen et al., "Views to Nature: Effects on Attention," Journal of Environmental Psychology, 1995, vol. 15, pp. 77-85.
Third Examination Report issued in AU Application No. 2016202287 dated Feb. 15, 2021, 6 pgs.
Third Office Action issued in MX Application No. MX/a/2016/011107, 11 pgs.
Thompson, J. et al., "Effects of daily iron supplementation in 2- to 5-year-old children: systematic review and meta-analysis", Pediatrics. 2013; vol. 131, No. 4, pp. 739-753 (16 pages).
Tong, Van T. et al., "Clinical interventions to reduce secondhand smoke exposure among pregnant women: a systematic review," Tobacco Control, Author Manuscript, 2015 (17 pages).
Tracy, Jessica L., and Richard W. Robins, "Show Your Pride: Evidence for a Discrete Emotion Expression", Psychological Science 15, No. 3: 194-97, (2004).
Trust for America's Health, "A healthier America 2013: strategies to move from sick care to health care in the next four years", Issue Report, Jan. 2013, http://healthyamericans.org/assets/files/TFAH2013HealthierAmericaFnlRv.pdf, Accessed Nov. 30, 2017 (100 pages).
U.S. Green Building Council, "Daylight and views—daylight," 2009, 3 pgs., Available at https://www.usgbc.org/credits/schools/v2009/ieqc81.
Uğursal et al., "The effect of temperature, metabolic rate and dynamic localized airflow on thermal comfort," Applied Energy, 2013, vol. 111, pp. 64-73.
Uğursal, Ahmet, et al., "The effect of temperature, metabolic rate and dynamic localized airflow on thermal comfort," Applied Energy, 2013, vol. 111, pp. 64-73 (10 pages).
Ulrich, "View Through a Window May Influence Recovery from Surgery," Science, 1984, vol. 224, pp. 420-421.
Unsworth et al., "An automated version of the operation span task," Behavior Research Methods, 2005, vol. 37, No. 3, pp. 498-505.
US Department of Health and Human Services, 2008 Physical Activity Guidelines for Americans, Oct. 2008, available at https://health.gov/paguidelines/pdf/paguide.pdf (76 pages).
US Department of Justice Civil Rights Division, 2010 ADA Standards for Accessible Design, available at https://www.ada.gov/regs2010/2010ADAStandards/2010ADAStandards.pdf, accessed Oct. 31, 2017 (279 pages).
US Environmental Protection Agency, National Oceanic and Atmospheric Administration, National Park Service, et al., "Extremely high levels of PM2.5: steps to reduce your exposure", AirNow, https://airnow.gov/index.cfm?action=aqibasics.pmhilevels, Accessed Nov. 27, 2017 (4 pages).
Van Den Wymelenberg, "Patterns of occupant interaction with window blinds: A literature review," Energy and Buildings, 2012, vol. 51, pp. 165-176.
Van Der Scheer J.W., et al., "Effects of exercise on fitness and health of adults with spinal cord injury: A systematic review", Neurology, 2017 (34 pages).
Van Eerd, D. et al., "Effectiveness of workplace interventions in the prevention of upper extremity musculoskeletal disorders and symptoms: an update of the evidence," Occupational and Environmental Medicine, 2016, vol. 73, pp. 62-70.
Vandewalle et al., "Daytime Light Exposure Dynamically Enhances Brain Responses," Current Biology, 2006, vol. 16, pp. 1616-1621.
Vastamäki et al., "A behavioural model of temperature controller usage and energy saving," Personal and Ubiquitous Computing, 2005, vol. 9, pp. 250-259.
Veitch et al., "A model of satisfaction with open-plan office conditions: COPE field findings," Journal of Environmental Psychology, 2007, vol. 27, pp. 177-189.
Veitch et al., "Assessing Beliefs about Lighting Effects on Health, Performance, Mood, and Social Behavior," Environment and Behavior, 1996, vol. 28, No. 4, pp. 446-470.
Veitch et al., "Determinants of Lighting Quality II: Research and Recommendations," presented at the 104th Annual Convention of the American Psychological Association, 1996 (57 pages).

(56) References Cited

OTHER PUBLICATIONS

Verlarde et al., "Health effects of viewing landscapes—Landscape types in environmental psychology," Urban Forestry & Urban Greening, 2007, vol. 6, pp. 199-212.
Vining, R F et al. "Salivary cortisol: a better measure of adrenal cortical function than serum cortisol", Annals of clinical biochemistry vol. 20 (Pt 6): 329-35, (1983).
Viola et al., "Blue-enriched white light in the workplace improves self-reported alertness, performance and sleep quality," Scandinavian Journal of Work, Environment & Health, 2008, vol. 34, No. 4, pp. 294-306.
Vitashower Corp., "Products," retrieved from http://www.vitashowercorp.com/products.html, retrieved on May 13, 2014, 8 pages.
Vitashower Corporation, "Ascorbic Acid Reduction of Residual Active Chlorine in Potable Water Prior to Halocarboxylate Determination," from Urbansky et al., Journal of Environmental Monitoring 2(3):253-256, 2000, retrieved from http://www.vitashowercorp.com/research.html, retrieved on May 13, 2014, 2 pages.
Vitashower Corporation, "Frequently Asked Questions," 2003, retrieved from http://www.vitashowercorp.com/FAQs.html, retrieved on May 13, 2014, 3 pages.
Vitashower Corporation, "Vitamin C Shower Filter SF-2000," 2003, retrieved from http://www.vitashowercorp.com/products.html, retrieved on May 13, 2014, 8 pages.
Vitashower Corporation, "Welcome to Vitashower Corporation," 2003, retrieved from http://www.vitashowercorp.com/index.html, retrieved on May 13, 2014, 4 pages.
Wang, Jiandong et al. "Particulate matter pollution over China and the effects of control policies." The Science of the total environment vol. 584-585: 426-447, (2017).
Wargocki et al., "Ten questions concerning thermal and indoor air quality effects on the performance of office work and schoolwork," Building and Environment, 2017, vol. 112, pp. 359-366.
Wargocki et al., "The Effects of Outdoor Air Supply Rate in an Office on Perceived Air Quality, Sick Building Syndrome (SBS) Symptoms and Productivity," Indoor Air, 2000, vol. 10, pp. 222-236.
Watson et al., "Recommended Amount of Sleep for a Healthy Adult: A Joint Consensus Statement of the American Academy of Sleep Medicine and Sleep Research Society," Sleep, 2015, vol. 38, No. 6, pp. 843-844.
Weibel, Laurence et al. "Work-related stress in an emergency medical dispatch center." Annals of emergency medicine vol. 41,4: 500-506, (2003), (7 pages).
Wells et al., "Subjective Responses to the Lighting Installation in a Modern Office Building and their Design Implications," Building Science, 1965, vol. 1, pp. 57-68.
Weschler, "Ozone in Indoor Environments: Concentration and Chemistry," Indoor Air, 2000, vol. 10, pp. 269-288.
Weschler, "Ozone's Impact on Public Health: Contributions from Indoor Exposures to Ozone and Products of Ozone-Initiated Chemistry," Environmental Health Perspectives, 2006, vol. 114, No. 10, pp. 1489-1496.
West et al., "Blue light from light-emitting diodes elicits a dose-dependent suppression of melatonin in humans," Journal of Applied Physiology, 2011, vol. 110, pp. 619-626.
Wikipedia, "Home automation," Jan. 17, 2014, URL: https://en.wikipedia.org/w/index.php?title=Home_automation&oldid=591169195, retrieved on Sep. 2, 2020 (11 pages).
Wikipedia, "Thermostat," as archived on Jan. 24, 2014, URL=https://en.wikipedia.org/w/index.php?title=Thermostat&oldid=592239648, download date Jun. 30, 2017, 10 pages.
Williams et al., Next Generation Air Monitor (NGAM) VOC Sensor Evaluation Report, EPA/600/R-15/122, 2015 (71 pages).
Wisthaler et al., "Reactions of ozone with human skin lipids: Sources of carbonyls, dicarbonyls, and hydroxycarbonyls in indoor air," Proceedings of the National Academy of Sciences, 2010, vol. 107, No. 15, pp. 6568-6575.
Wolkoff, "Impact of Air Velocity, Temperature, Humidity, and Air on Long-Term VOC Emissions From Building Products," Atmospheric Environment, 1998, vol. 32, No. 14/15, pp. 2659-2668.
Won et al., "The State-of-the-Art in Sensor Technology for Demand-Controlled Ventilation, PERD S5-42: Final Report," IRC-RR-243, NRC Publications Archive, 2005 (89 pages).
Wong et al., "A multivariate-logistic model for acceptance of indoor environmental quality (IEQ) in offices," Building and Environment, 2008, vol. 48, pp. 1-6.
Wong et al., "A multivariate-logistic model for acceptance of indoor environmental quality (IEQ) in offices," 2007, Building and Environment, vol. 48, pp. 1-6.
Wong, L. T., et al.; "A multivariate-logistic model for acceptance of indoor environmental quality (IEQ) in offices", Building and Environment 43 (2008) 1-6.
World Health Organization, "Global Nutrition Targets 2025: Low Birth Weight policy Brief," 2014, Geneva (8 pages).
World Health Organization, "Guideline: Daily iron supplementation in adult women and adolescent girls," 2016, Geneva (34 pages).
World Health Organization, "Guideline: Daily iron supplementation in infants and children," 2016, Geneva (54 pages).
World Health Organization, "Nutrition Landscape Information System (NLiS) Country Profile Indicators: Interpretation Guide", 2019, 2nd ed., 134 pgs., https://apps.who.int/iris/handle/10665/332223. License: CC BY-NC-SA 3.0 IGO.
World Health Organization, "WHO Recommendations for the Prevention and Management of tobacco use and second-hand smoke exposure in pregnancy," 2013 (104 pages).
World Health Organization, "Nutritional Anaemias: Tools for Effective Prevention and Control", Geneva: World Health Organization; 2017, available online: http://apps.who.int/iris/bitstream/10665/66914/1/WHO_NHD_01.3.pdf (96 pages).
Written Opinion of the International Searching Authority, dated Apr. 28, 2016, for International Application No. PCT/US2016/013215, 16 pages.
Written Opinion of the International Searching Authority, dated Dec. 26, 2013, for International Application No. PCT/US2013/057070, 5 pages.
Xiong et al., "Potential indicators for the effect of temperature steps on human health and thermal comfort," Energy and Buildings, 2016, vol. 113, pp. 87-98.
Yadlapalli et al., "Circadian clock neurons constantly monitor environmental temperature to set sleep timing," Nature, 2018, vol. 555 (21 pages).
Yetish et al., "Natural sleep and its seasonal variations in three pre-industrial societies," Current Biology, Author Manuscript, 2015, vol. 25, No. 21 (19 pages).
Yu et al., "People who live in a cold climate: thermal adaptation differences based on availability of heating," Indoor Air, 2013, vol. 23, pp. 303-310.
Zakowski, Sandra G et al. "Written emotional disclosure buffers the effects of social constraints on distress among cancer patients." Health psychology : official journal of the Division of Health Psychology, American Psychological Association vol. 23,6: 555-63, (2004).
Zhai et al., "Human comfort and perceived air quality in warm and humid environments with ceiling fans," Building and Environment, 2015, vol. 90, pp. 178-185 (8 pages).
Zhai, Yongchao et al., "Comfort under personally controlled air movement in warm and humid environments," Building and Environment, 2013 (16 pages).
Zhai, Yongchao, et al., "Using air movement for comfort during moderate exercise," Building and Environment, 2015, vol. 24, pp. 344-352 (9 pages).
Zhang et al., "Study on TVOCs concentration distribution and evaluation of inhaled air quality under a re-circulated ventilation system," Building and Environment, 2007, vol. 42, pp. 1110-1118.
Zhang et al., "Thermal comfort in naturally ventilated buildings in hot-humid area of China," Building and Environment, 2010, vol. 45, pp. 2562-2570.
Zhang, Hui, "Human Thermal Sensation and Comfort in Transient and Non-Uniform Thermal Environments," Dissertation, 2003, University of California, Berkeley (436 pages).

(56) References Cited

OTHER PUBLICATIONS

Zhang, Yu F., et al., "The influence of heated or cooled seats on the acceptable ambient temperature range," Ergonomics, 2007, vol. 50, No. 4, pp. 586-600 (16 pages).

Zhao et al., "Effect of particle spatial distribution on particle deposition in ventilation rooms," Journal of Hazardous Materials, 2009, vol. 170, pp. 449-456.

Zhou et al., "Experimental study of the influence of anticipated control on human thermal sensation and thermal comfort," Indoor Air, 2014, vol. 24, pp. 171-177.

Zhu, Hongmei et al., "Is self-monitoring of blood glucose effective in improving glycaemic control in type 2 diabetes without insulin treatment: a meta-analysis of randomised controlled trials," BMJ Open, 2016, vol. 6, pp. 1-9 (9 pages).

Zhuang et al., "Haze insights and mitigation in China: an overview," Journal of Environmental Sciences, 2014, vol. 26, pp. 2-12 (11 pages).

Zinzi, "Office worker preferences of electrochromic windows: a pilot study," Building and Environment, 2006, vol. 41, pp. 1262-1273.

\* cited by examiner

Zoning by Potentials to Generate Noise

FIG. 5(a) One wall

FIG. 5(b) Two intersecting walls

FIG. 5(c) Three intersecting walls

SYSTEMS AND METHODS FOR ACOUSTIC MONITORING

CROSS-REFERENCE TO RELATED APPLICATIONS

This application is a U.S. national phase application filed under 35 U.S.C. § 371 of International Application No. PCT/US2020/024377, filed Mar. 24, 2020, designating the United States, which claims the benefit of U.S. Provisional Application No. 62/823,459, filed Mar. 25, 2019, all of which are incorporated herein by reference in their entirety.

TECHNICAL FIELD

This disclosure relates generally to assessing, monitoring, and improving various acoustic parameters in a habitable environment and/or spaces therein.

BACKGROUND

Most people spend significant amounts of time in habitable environments such as enclosed or partially enclosed indoor spaces associated with homes, apartments, condominium units, hotel suites or rooms, motel suites or rooms, spas, hospitals, offices, schools, work spaces and other public and private facilities. Sometimes these spaces are controlled, or even owned by, the principal occupants, such as homes, apartments or condominium units. Other times these enclosed spaces are controlled by others, for example a facility owner or operator who may own and/or operate a hotel, motel, spa, hospital, or office.

Significant time in these spaces exposes the occupant to a wide range of environmental factors, any of which may have either adverse or beneficial effects on the occupant's health, well-being or sense of well-being. For example, exposure to negative sounds or environmental noise may cause or otherwise contribute to hypertension, high stress levels, tinnitus, hearing loss, sleep disturbances, and other harmful effects which may diminish one's productivity and quality of life. Conversely, exposure to positive sounds such as, for example, sounds of nature, soothing music, etc., are believed to reduce anxiety, facilitate relaxation, and improve one's mood.

New approaches for monitoring and improving one or more acoustic parameters in in one or more spaces within habitable environments are desirable.

BRIEF SUMMARY

Generally speaking, pursuant to various embodiments, systems, apparatuses and methods are provided herein useful to improve acoustic parameters within a particular indoor or partially enclosed space or other habitable environments. Such spaces may include, for example, an office building, building office, open, partially open, or compartmentalized work or collaboration area, school, school room, apartment building, dormitory, single family home, multi-family dwelling or building, townhouse, theatre, train or bus station, library, public lounge, store or market, bakery, restaurant, tavern, pub, resort, bar, hostel, lodge, hotel, motel, inn, guest house, mall, art gallery, art studio, craft studio, ship, boat, gym, spa, fitness center, sports facility, gas station, airplane, airport, automobile, train, bus, kiosk, hospital, doctor's office, dentist's office, police station, fire station, lighthouse, bank, coffee shop, dry cleaner, department store, pharmacy, hardware store, drug store, grocery store, institution, music studio, recording studio, concert hall, radio station or studio, television station or studio, post office, church, mosque, synagogue, chapel, mobile home, barn, farm house, silo, residence, assisted living center, hospice, dwelling, laundromat, museum, hair salon, parking structure or facility, greenhouse, nursery, nail salon, barbershop, trailer, warehouse, storage facility, rest home, day care facility, laboratory, military facility, and any other place or facility where one or more people may congregate, live, work, meet, engage, spend time, etc. Within such spaces, there may be one or more sub-spaces or habitable environments that may be used for single or multiple purposes, such as home or other offices, kitchens, galleys, pantries, cooking areas, eating areas, home or office libraries or studies, conference rooms, dining rooms, bathrooms, toilets, powder rooms, play rooms, bedrooms, foyers, reception areas, file rooms, pods, pet rooms, storage rooms, junk rooms, carports, dens, basements, attics, garages, closets, classrooms, cabins, cabooses, train cars, bunk rooms, media rooms, baths, auditoriums, locker rooms, changing rooms, engine rooms, cockpits, work rooms, stairwells, exhibition rooms, platforms, elevators, walk ways, hallways, pools, stock rooms, exercise rooms, break rooms, snack rooms, living or family rooms, dressing rooms, slumber rooms, meeting rooms, conference rooms, offices, game rooms, porches, patios, seating areas, clean rooms, common rooms, lunch rooms, sky boxes, stages, prop rooms, make up rooms, safes, vaults, reception areas, check-in areas, compartments, drafting rooms, drawing rooms, computer or information technology rooms, waiting rooms, operating rooms, examination rooms, therapy rooms, emergency rooms, recovery rooms, machine rooms, equipment rooms, control rooms, laboratory rooms, monitoring rooms, and enclosed or partially enclosed areas, among others.

Occupants or other users, managers, or owners of such spaces or sub-spaces (i.e., zones) may want to control or influence the acoustic parameters within a given space or sub-space, which may be, or may be part, of a habitable environment or other habitable, usable or occupiable area.

In one illustrative approach, an apparatus for sheltering occupants may be described as comprising a built structure having an indoor or partially enclosed environment, a plurality of acoustic sensor arrays, and a central control circuit. The acoustic sensor arrays are configured to measure one or more acoustic parameters and are communicatively coupled to the central control circuit. The central control circuit is configured to delineate occupant zones based on an electronic floor plan; delineate acoustic zones within one or more of the occupant zones based on the electronic floor plan; and instruct installation of acoustic sensor arrays according to the following parameters: if acoustic sensor arrays available are less than a total of the delineated occupant zones, installation of the acoustic sensor arrays occurs based on occupant zones having a highest frequency of use, and if acoustic sensor arrays available are equal to or greater than a total of the delineated occupant zones, at least one acoustic sensor array is installed per occupant zone, and installation of acoustic sensor arrays in occupant zones with more than one delineated acoustic zone occurs based on an identified order of preference.

In some approaches, each acoustic zone may be identified as one of: deskbound/interactive; deskbound/concentrative; internally-mobile/interactive; internally-mobile/concentrative; externally-mobile/interactive; and externally-mobile/concentrative; and the identified order of preference comprises: deskbound/interactive first, deskbound/concentrative second, internally-mobile/interactive third, internally-mobile/concentrative fourth, externally-mobile/interactive fifth, and externally-mobile/concentrative sixth.

In some approaches, the apparatus for sheltering occupants may further include an acoustic control system and the control circuit may be further configured to instruct the acoustic control system to respond to readings from the acoustic sensor arrays in the occupant zones and/or acoustic zones. In some approaches, the acoustic control system may comprise at least one of a sound producing system and sound dampening system.

The apparatus for sheltering occupants may further include at least one electronic user device in communication with the control circuit and configured to receive instructions regarding installation location of one or more of the acoustic sensor arrays. In some approaches, the electronic user device may be configured to send installation configuration information or floor plan updates to the control circuit.

In some approaches, the control circuit instructs installation of acoustic sensor arrays in the occupant zones and/or acoustic zones according to the following further parameters: if a height of a ceiling in an occupant zone or acoustic zone is equal to or lower than about 2.7 m, an acoustic sensor array is mounted on a ceiling of the occupant zone or acoustic zone, and if a height of a ceiling in an occupant zone or acoustic zone is greater than about 2.7 m, an acoustic sensor array is suspended from a ceiling of the occupant zone or acoustic zone at a height of about 2.7 m. In some approaches, the acoustic sensor arrays may be installed in a center of the occupant zones and/or acoustic zones. In some approaches, the acoustic sensor arrays may be installed at least 1.5 m away from any HVAC ducts, inlets, outlets, and windows in the occupant zones and/or acoustic zones. In some approaches, acoustic sensor arrays may be installed at least about 0.6 m away from a reflective surface in the occupant zones and/or acoustic zones. In some approaches, acoustic sensor arrays may be installed at least about 1.2 m away from two intersecting reflective surfaces in the occupant zones and/or acoustic zones. In some approaches, acoustic sensor arrays may be installed at least about 2.4 m away from three intersecting reflective surfaces in the occupant zones and/or acoustic zones.

In some approaches, if the control circuit determines that an acoustic sensor array cannot be mounted on or suspended from a ceiling in the occupant zone or acoustic zone, the control circuit may instruct installation of the acoustic sensor array at a height of about 1.2 m in the occupant zone or acoustic zone. In some approaches, the acoustic sensor array may be installed in a center of the occupant zone or acoustic zone. In some approaches, the acoustic sensor array may be installed on a partition or in furniture in the occupant zone or acoustic zone. In some approaches, the acoustic sensor array may be installed in a workstation-mounted configuration in the occupant zone or acoustic zone.

In some approaches, the acoustic sensor array comprises an acoustic sensor that utilizes a frequency recording interval of about 1 second.

In another illustrative approach, a method for monitoring acoustic parameters in a habitable environment may be summarized as delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; and operating an acoustic control system according to readings from the acoustic sensors in the delineated occupant zones and/or acoustic zones.

In some approaches, each acoustic zone may be identified as one of: deskbound/interactive; deskbound/concentrative; internally-mobile/interactive; internally-mobile/concentrative; externally-mobile/interactive; and externally-mobile/concentrative; and the identified order of preference comprises: deskbound/interactive first, deskbound/concentrative second, internally-mobile/interactive third, internally-mobile/concentrative fourth, externally-mobile/interactive fifth, and externally-mobile/concentrative sixth.

In some approaches, a method for monitoring acoustic parameters in a habitable environment may further include installing the plurality of acoustic sensors in the occupant zones and/or acoustic zones according to the following further parameters: if a height of a ceiling in an occupant zone or acoustic zone is equal to or lower than about 2.7 m, at least one of the plurality of acoustic sensors is mounted on a ceiling of the occupant zone or acoustic zone, and if a height of a ceiling in an occupant zone or acoustic zone is greater than about 2.7 m, at least one of the plurality of acoustic sensors is suspended from a ceiling of the occupant zone or acoustic zone at a height of about 2.7 m. In some approaches, the plurality of acoustic sensors may be installed in a center of the occupant zones and/or acoustic zones. In some approaches, the plurality of acoustic sensors may be installed at least 1.5 m away from any HVAC ducts, inlets, outlets, and windows in the occupant zones and/or acoustic zones. In some approaches, the plurality of acoustic sensors may be installed at least about 0.6 m away from a reflective surface in the occupant zones and/or acoustic zones. In some approaches, the plurality of acoustic sensors may be installed at least about 1.2 m away from two intersecting reflective surfaces in the occupant zones and/or acoustic zones. In some approaches, the plurality of acoustic sensors may be installed at least about 2.4 m away from three intersecting reflective surfaces in the occupant zones and/or acoustic zones.

In some approaches, a method for monitoring acoustic parameters in a habitable environment may further include determining that at least one of the plurality of acoustic sensors cannot be mounted on or suspended from a ceiling in the occupant zone or acoustic zone, and installing the acoustic sensor at a height of about 1.2 m in the occupant zone or acoustic zone. In some approaches, the acoustic sensor may be installed in a center of the occupant zone or acoustic zone. In some approaches, the acoustic sensor may be installed on a partition or in furniture in the occupant zone or acoustic zone. In some approaches, the acoustic sensor may be installed in a workstation-mounted configuration in the occupant zone or acoustic zone.

In some approaches, the plurality of acoustic sensors may include an acoustic sensor that utilizes a frequency recording interval of about one second.

In another illustrative approach, a system for monitoring indoor environmental quality may be summarized as including a built structure having a plurality of environmentally-controllable zones, wherein the environmentally-controllable zones are delineated into one or more occupant zones and acoustic zones; an acoustic sensor array configured to measure acoustic parameters, wherein at least one sensor of the acoustic sensor array is installed in each of the occupant zones; an environmental control system associated with the built structure, the environmental control system configured to adjust at least one of lighting levels, ambient temperature levels, acoustic parameters, or air quality levels in at least a portion of the built structure; at least one electronic user device associated with a user; and a control circuit in communication with the acoustic sensor array, the electronic user device, and the built structure. The control circuit is configured to: detect a particular occupant having an occupant profile in an environment database; locate the particular occupant in a particular occupant zone; analyze acoustic sensor readings in the particular occupant zone; compare the acoustic sensor readings in the particular occupant zone with parameters of the occupant profile associated with the particular occupant; and upon detection that the acoustic sensor readings in the particular occupant zone are not within the parameters of the occupant profile, instruct the environmental control system to adjust the parameters pursuant to the occupant profile.

In some approaches, the control circuit may be configured to send a notification to the user via the electronic user device associated therewith regarding adjustments of the parameters pursuant to the occupant profile associated therewith. In some approaches, the control circuit may send a notification to the user via the electronic user device associated therewith upon detection that the user has not been exposed to positive sounds within a predetermined period of time.

In some approaches, the control circuit may be configured to detect multiple occupants within the occupant zones and evaluate an occupant ranking index for each of the lighting levels, ambient temperature levels, acoustic parameters, or air quality levels to determine which parameters from the occupant profile database to set for the particular occupant zone.

In some approaches, the acoustic sensor array may include a first sensor installed at a first height and a second sensor installed at a second height in the occupant zone and wherein the control circuit analyzes a height parameter of the occupant profile to determine whether to compare first sensor readings or second sensor readings to the parameters in the associated occupant profile.

In another illustrative approach, a method for monitoring acoustic parameters in a habitable environment includes receiving data from a plurality of acoustic sensors in a space, wherein the space includes a plurality of zones and wherein the plurality of acoustic sensors were positioned within the space in accordance to the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and operating an environmental system.

In another illustrative approach, a method for monitoring acoustic parameters in an indoor environment includes obtaining data from a plurality of acoustic sensors in a space, wherein the space includes a plurality of zones and wherein the plurality of acoustic sensors were previously positioned within the plurality of zones in accordance to the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone occurs based on an identified order of preference; operating an acoustic control system according to readings from the acoustic sensors in the delineated occupant zones and/or acoustic zones; and determining, based at least in part on the data, if one or more acoustic parameters within at least one of the plurality of zones needs to be adjusted.

In another illustrative approach, a method for monitoring acoustic parameters in a habitable environment includes obtaining data created by a plurality of acoustic sensors in a space, wherein the space includes a plurality of zones and wherein the plurality of acoustic sensors were previously positioned within the plurality of zones in accordance with the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and determining, based at least in part on the data, if one or more acoustic parameters within the space needs to be adjusted.

In another illustrative approach, a method for monitoring acoustic parameters in a habitable environment includes receiving data generated by a plurality of acoustic sensors in a plurality of zones, wherein the plurality of acoustic sensors were previously positioned within the plurality of zones in accordance to the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; determining whether one or more acoustic parameters within the built structure needs adjustment; and operating an environmental system to adjust the one or more acoustic parameters within the built structure.

In another illustrative approach, a method for monitoring acoustic parameters in a habitable environment includes obtaining data created by a plurality of acoustic sensors positioned within a plurality of zones wherein the plurality of acoustic sensors are positioned within the plurality of zones in accordance to the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and operating an environmental system.

In another illustrative approach, a method for monitoring acoustic parameters in a habitable environment includes determining if one or more acoustic parameters within at least one of a plurality of zones should be adjusted, wherein a plurality of acoustic sensors are positioned within the plurality of zones in accordance with the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and operating an environmental system.

In another illustrative approach, a method of monitoring indoor acoustic parameters includes determining if data generated by at least one acoustic sensor located in one of a plurality of zones indicates that one or more acoustic parameters within the one of the plurality of zones should be adjusted, wherein the at least one acoustic sensor is positioned within the one of the plurality of zones as a result of the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and operating an environmental system.

In another illustrative approach, a method of monitoring acoustic parameters in a habitable environment includes receiving an indicator of data generated by at least one acoustic sensor located in one of a plurality of zones that indicates that one or more acoustic parameters within the one of the plurality of zones should be adjusted, wherein the at least one acoustic sensor is positioned within the plurality of zones in accordance with the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and operating an environmental system.

In another illustrative approach, a method of monitoring acoustic parameters in a habitable environment includes receiving an indicator that one or more acoustic parameters within at least one of a plurality of zones should be adjusted, wherein the indicator is based on at least one reading made by at least one acoustic sensor positioned within the plurality of zones in accordance with the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and operating an environmental system.

In another illustrative approach, a method of monitoring acoustic parameters in a habitable environment includes receiving an indicator of data generated by at least one acoustic sensor positioned in one of a plurality of zones that indicates that one or more acoustic parameters within the one of the plurality of zones meets a requirement for acoustic parameter adjustment and wherein the at least one acoustic sensor has been positioned within the plurality of zones in accordance with the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and operating an environmental system.

In another illustrative approach, a method of monitoring acoustic parameters in a habitable environment includes determining that one or more acoustic parameters within one of a plurality of zones meets a threshold for acoustic parameter adjustment, wherein the threshold for acoustic parameter adjustment is based on at least one acoustic parameter measured by at least one acoustic sensor positioned in the one of the plurality of zones, and wherein the at least one acoustic sensor is positioned within the one of the plurality of zones in accordance with the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and sending a signal indicative of the need for acoustic parameter adjustment within the one of the plurality of zones.

In another illustrative approach, a method of monitoring acoustic parameters in a habitable environment includes monitoring a plurality of acoustic sensors, each of the plurality of acoustic sensors being located within at least one of a plurality of zones, wherein each of the plurality of acoustic sensors is located within at least one of the plurality of zones base on the following: delineating occupant zones in a built structure based on an electronic floor plan; delineating acoustic zones within one or more of the occupant zones based on the electronic floor plan; installing a plurality of acoustic sensors according to the following parameters: if the plurality of acoustic sensors available is less than a total of the delineated occupant zones, installing one of the plurality of acoustic sensors in occupant zones having a highest frequency of use, and if the plurality of acoustic sensors available is equal to or greater than a total of the delineated occupant zones, installing at least one of the plurality of acoustic sensors in each occupant zone, and installing one or more additional acoustic sensors in occupant zones with more than one delineated acoustic zone based on an identified order of preference; operating an acoustic control system according to readings from the acoustic sensors in the delineated occupant zones and/or acoustic zones; and determining, based on data generated by at least one of the plurality of acoustic sensors, that one or more acoustic parameters within at least one of the plurality of zones needs to be adjusted; and sending a signal indicative of the need for acoustic parameter adjustment within the one of the plurality of zones.

In another illustrative approach, an apparatus for sheltering occupants includes a built structure having an indoor environment; an acoustic sensor array configured to measure acoustic parameters; a central control circuit communicatively coupled to the acoustic sensor array, the central control circuit configured to: delineate occupant zones based on an electronic floor plan; delineate acoustic zones within one or more of the occupant zones based on the electronic floor plan; allocate acoustic sensor arrays according to the following parameters: if acoustic sensor arrays available are less than a total of the delineated occupant zones, installation of the acoustic sensor arrays occurs based on occupant zones having a highest frequency of use, and if acoustic sensor arrays available are equal to or greater than a total of the delineated occupant zones, at least one acoustic sensor array is installed per occupant zone, and installation of acoustic sensor arrays in occupant zones with more than one delineated acoustic zone occurs based on an identified order of preference; and instruct installation of the acoustic sensor arrays in the occupant zones and/or acoustic zones.

BRIEF DESCRIPTION OF THE DRAWINGS

Disclosed herein are embodiments of systems, apparatus, and methods pertaining to assessing, monitoring, and improving acoustic parameters in a habitable environment and/or spaces therein. In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
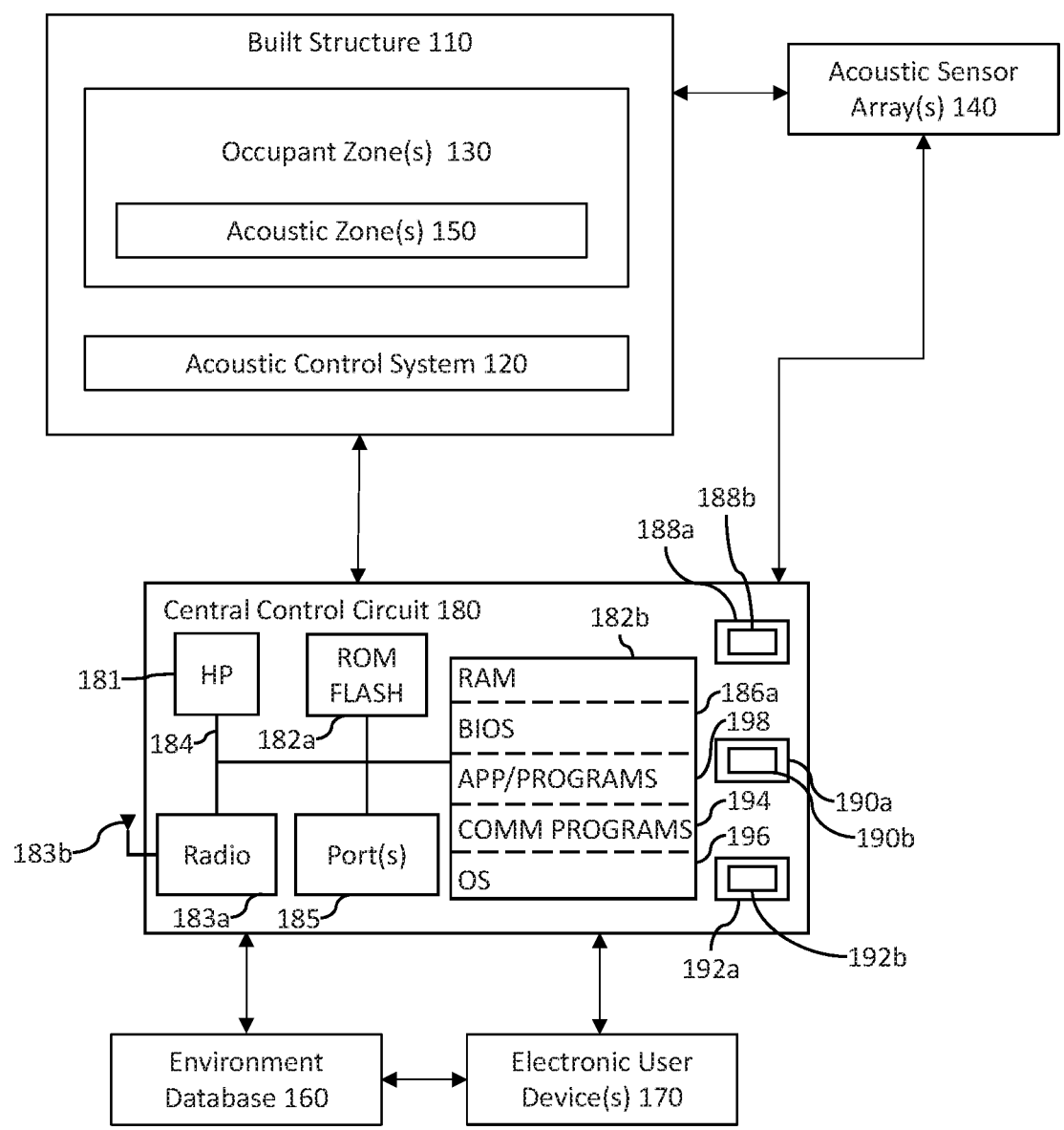
FIG. 1 is a block diagram of an acoustic monitoring system for improving acoustic parameters in a habitable environment in accordance with some embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with acoustic monitoring and control systems such as computing systems, as well as networks and other communications channels have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Occupants, managers, or owners of a habitable environment, such as an indoor space, may want to continuously or otherwise regularly monitor environmental quality parameters, including acoustic parameters, within the habitable environment. Continuously or regularly monitoring a habitable environment allows for the environment to be more precisely and accurately controlled.

The devices, systems, and methods described herein enable a user to monitor one or more acoustic parameters in an indoor space or other habitable environments. The habitable environment, for example, may be space (e.g., a room) within a built structure. By one approach, one or more acoustic sensor(s)/array(s) may be installed within a habitable environment to capture data on acoustic parameters regarding acoustic conditions within the habitable environment. A sensor array may include one or more sensors and may include sensors that measure or monitor different things or that otherwise have different capabilities. Data captured by one or more acoustic sensor arrays may inform building occupants, managers or owners of building performance with respect to one or more acoustic parameters and may also be utilized to improve the health and comfort of or one or more occupants of or visitors to one or more spaces within the building. Examples of acoustic parameters that may be monitored by one or more of the acoustic sensor arrays 140 of the acoustic monitoring system 100 include, but are not limited to, sound pressure level (SPL, dB), A-weighted sound pressure level (dBA), C-weighted sound pressure level (dBC), dose (%), statistical noise level ($L_n$), and day/night sound level ($L_{dn}$).

FIG. 1 illustrates a block diagram of an exemplary acoustic monitoring system 100 for monitoring one or more acoustic parameters in a habitable environment in accordance with some embodiments. A lack of adequate data on a habitable environment makes it difficult for occupants to understand and improve their indoor environmental conditions. Implementing an acoustic monitoring system provides occupants, managers, or owners of a built structure more information on their habitable environment such that the environment may be more precisely and accurately tailored to occupants. Installing or otherwise using a system that obtains accurate information on environment quality parameters improves the ability of an environmental control system to control the habitable environment and improve occupant health and comfort. For example, the acoustic monitoring system can provide information on the acoustic environment or one or more acoustic parameters in the built structure. Information on the acoustic environment or one or more acoustic parameters in the built structure may instruct or inform occupants, managers, or owners how to effectively control or adjust those parameters.

Furthermore, with a system installation that provides access to precise and accurate real-time data on one or more environmental quality parameters, occupants, managers, or owners of a built structure may reliably evaluate their environment and intervene to control environmental parameters as necessary or desired. Spatial and temporal variation of parameters related to environmental quality, especially acoustic parameters, may impact the quality of data collected by sensor arrays in an acoustic monitoring system. As such, sensor array placement impacts the performance of an acoustic monitoring system. Installing an acoustic monitoring system with optimal or near optimal sensor array placement ensures that the system operates more precisely and accurately. In order to enhance performance of the acoustic monitoring system 100, the delineation of zones within a habitable environment may help to determine improved or even optimal or near optimal sensor array placement.

In some approaches, the acoustic monitoring system 100 may be a standalone system for monitoring one or more acoustic parameters. In other approaches, the acoustic monitoring system 100 may form a part of, or otherwise incorporate, one or more existing acoustic/sound producing, monitoring, and/or remediation systems within a habitable environment. In some embodiments the acoustic monitoring system 100 may form part of a home wellness and/or a "smart home" system in the habitable environment, which may also include other systems or components that contribute to or improve a wellness or sense of wellness of an occupant of the habitable environment. For example, embodiments of the acoustic monitoring system described herein may be incorporated into systems for enhancing wellness in a habitable environment, an example of which is described in U.S. patent application Ser. No. 15/249,184, which published as US 2017/0053068 on Feb. 23, 2017 and is hereby incorporated by reference for all purposes. Also see U.S. Provisional Patent App. 61/783,718 titled "Systems and Methods for Air Remediation" filed on Dec. 21, 2018 and U.S. Provisional Patent App. 62/823,439 titled "Systems and Methods for Lighting Monitoring" filed on Mar. 25, 2019 which are incorporated herein by reference in their entireties.

Explanations of common acoustical-related nomenclature and terms of art are provided below in Table 1.

TABLE 1

| Term | Explanation |
| --- | --- |
| A-weighted sound level (dBA) | The most common single-number rating system for measuring the loudness of noise. It is obtained by applying the A-weighted frequency response curve to the measured sound. The response curve shows how humans are sensitive to different frequencies. |
| Decibel (dB) | A logarithmic unit (base ten) used to quantify the ratio of two like quantities proportional to power or energy. |
| Frequency | The number of cycles per second, measured in units of hertz (Hz). One hertz is equivalent to one complete oscillation per second. A frequency of 1000 Hz is equivalent to 1000 cycles per second. |
| Frequency weighting | The human ear is most adapted for mid-frequency sounds and is less sensitive to very low and very high frequencies. Frequency weighting is necessary to account for how the human ear perceives sound with varying sensitivity at different frequencies. |
| Response time | A unit of duration that indicates how often a sensor measures sound pressure level. 'Slow' mode measures sound d. pressure level every secon |
| Sound field | The region in a material medium in which sound waves are being propagated. |
| Sound intensity | The power carried by sound waves per unit area. |
| Sound level | The logarithmic ratio of the absolute sound pressure and a reference pressure. The reference pressure is the minimum pressure that a human can perceive. |

Noise and sound may affect occupants of a habitable environment in various positive and negative ways. Noise is generally measured in units of sound pressure levels called decibels (dB), which is logarithmic unit (base ten) used to quantify the ratio of two like quantities proportional to power or energy. Audible sound pressure is generally from 0 dB-140 dB. Sound level, or sound pressure level (Lp in dB), is the logarithmic ratio of the absolute sound pressure and a reference pressure. The reference pressure is the minimum pressure that a human can perceive.

When measuring sound or noise, frequency weightings may be used to approximate the ear's frequency response at different levels. For example, an A-weighting may be applied to sound measurements to account for the relative loudness perceived by the human ear, as the ear is less sensitive to low audio frequencies. The A-weighted sound level is the most common single-number rating system for measuring the loudness of noise. A-weighted measurements are expressed as dBA or dB(A).

In some circumstance, C-weighting may be used for high level measurements (e.g., 100 dB and above), as C-weighting generally correlates better with the human ear's response to high noise. C-weighted measurements are expressed as dBC or dB(C).

Other measures using sound level pressure are included below in Table 2.

TABLE 2

| Measure | Definition |
| --- | --- |
| Sound pressure level (SPL, dB) | Logarithmic ratio of the absolute sound pressure and a reference level |
| A-weighted sound pressure level (dBA or dB(A)) | Sound pressure level with A-weights |
| C-weighted sound pressure level (dBC or dB(C)) | Sound pressure level with C-weights |
| Dose (%) | Noise exposure expressed as a percentage (%) of permissible exposure for an 8-hour working day |
| Statistical noise level ($L_n$) | Noise level exceed for n % of the measurement time |
| Day/night sound level ($L_{dn}$) | Average noise level over a 24-hour period with penalty on night time noise levels |

The acoustic monitoring system 100 described herein may be associated with or be included in a built structure 110. The built structure 110 may include a space or other habitable/indoor environment with one or more environmentally-controllable zones. In some approaches, the environmentally-controllable zones may include occupant zones 130. By one approach, the boundaries of the occupant zones 130 may be physical or psychological partitions. Physical partitions may be defined by walls and/or partitions between spaces. For example, in some approaches, an occupant zone may take the form of a room in a habitable environment. Psychological partitions may be defined by the normal activities performed by occupants within the space. Psychological partitions, for example, may be defined based on different floorings, different furniture (e.g., desks, tables, couches, beds, chairs), different wall colors, decorations (e.g., artwork, biophilia, mirrors), materials, or surface textures, and/or different appliances (e.g., copy machines, refrigerators, stoves microwaves, printers, washers, dryers) within the built structure.

By one approach, the built structure 110 may be an enclosed space with an indoor environment where the primary light source is from artificial sources. For example, the built structure may be an office building with indoor office space.

Figure 2:
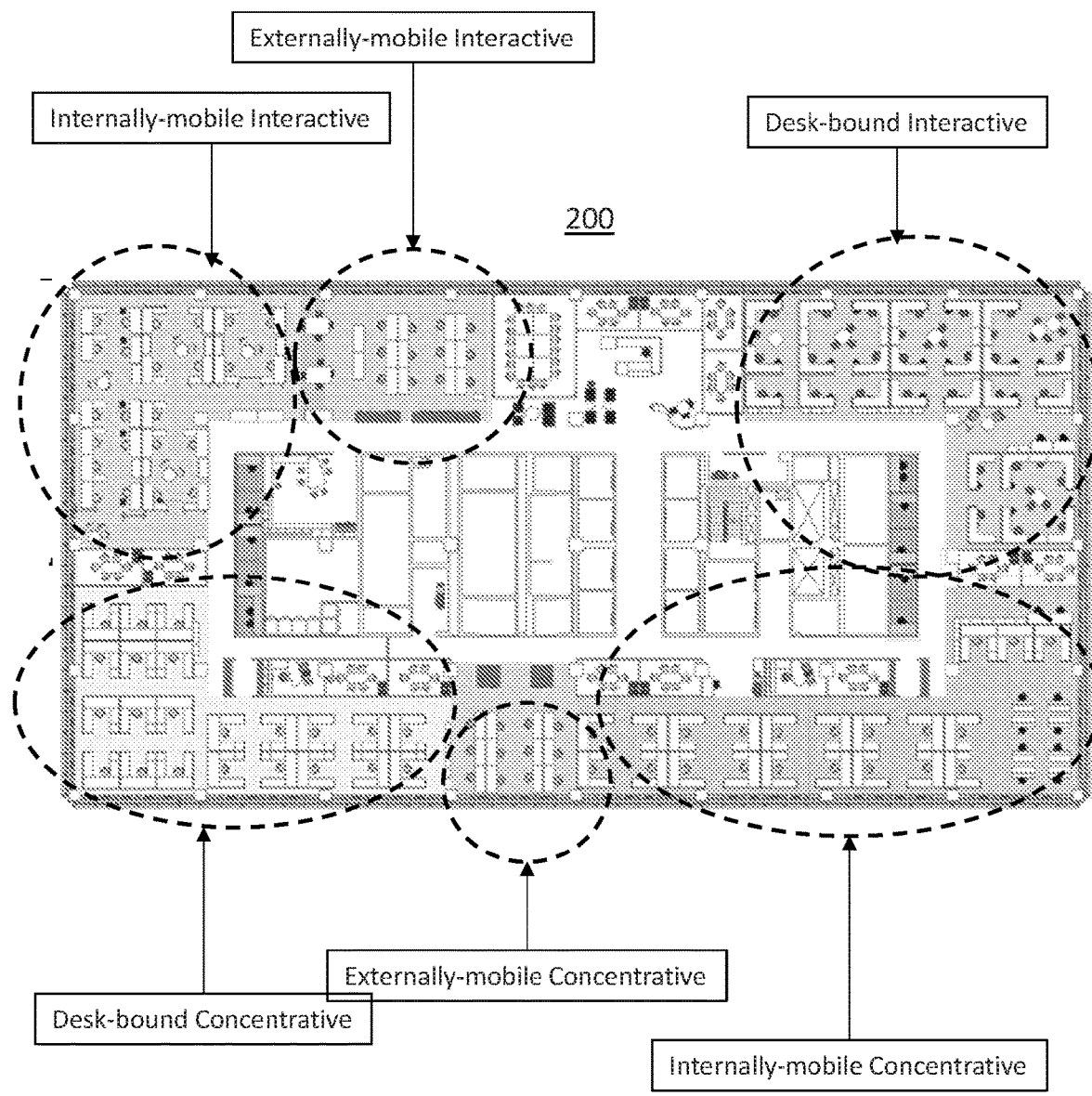
FIG. 2 is a diagram of exemplary acoustic zones in an occupant zone in a habitable environment in accordance with some embodiments.
Figure 3:
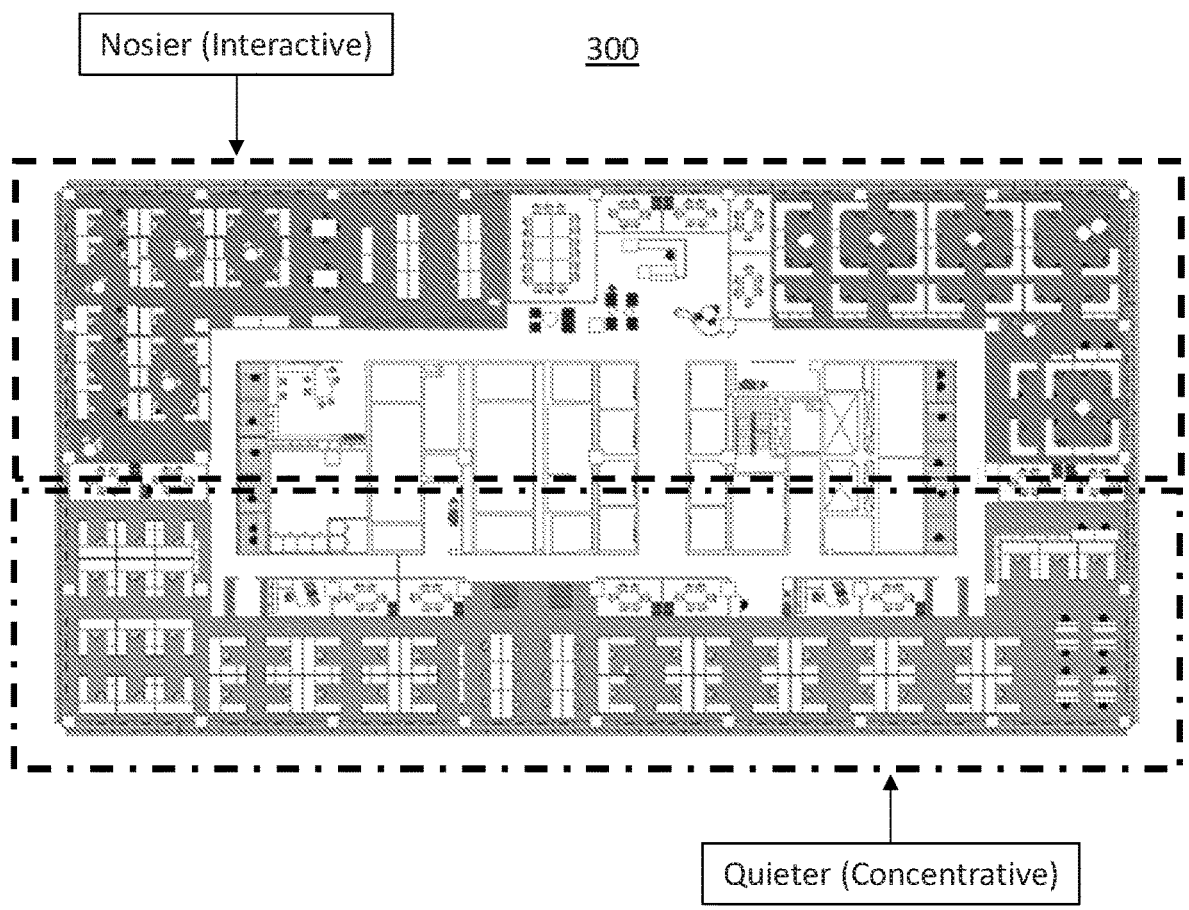
FIG. 3 is a diagram of exemplary acoustic zones in an occupant zone in a habitable environment in accordance with some embodiments.

By one approach, the occupant zones 130 may be further subdivided into acoustic zones 150 as shown in FIGS. 2 and 3. In one exemplary embodiment, as shown in FIG. 2, acoustic zones 150 may be determined, delineated, or otherwise identified based on occupant activities. In another exemplary embodiment, as shown in FIG. 3, acoustic zones 150 may be determined, delineated, or otherwise identified based on potential to generate noise.

The acoustic monitoring system 100 may further include an acoustic control system 120. Controlled or otherwise remediated sound and/or noise is an important aspect of achieving desirable environmental characteristics of the habitable environment. The acoustic control system 120 may be operated within the built structure 110 to adjust or otherwise remediate one or more various acoustic parameters within the various occupant zones and/or acoustic zones. By one approach, the acoustic control system may include one or both of a sound dampening system or subsystem and a sound producing system or subsystem, which may be operated alone or in tandem to remediate or otherwise control sound or noise in the built structure.

In some approaches, the acoustic control system 120 may include or otherwise be associated with a sound dampening system, which may be activated or employed by the acoustic control system 120 or by a user or occupant of the habitable environment to adjust one or more acoustic parameters in the habitable environment. Any suitable sound dampening system or components thereof may be employed to dampen or otherwise reduce or remediate sound, noise, or various acoustic parameters in the habitable environment. In some approaches, the acoustic control system 120 may include or otherwise be associated with a sound producing system, which may be activated or employed by the acoustic control system 120 or by a user or occupant of the habitable environment to adjust one or more acoustic parameters in the habitable environment. Any suitable sound producing system or components thereof may be employed to produce various sounds, music, etc. to promote positive well-being in the habitable environment.

As shown in FIG. 1, the acoustic monitoring system 100 generally also includes one or more acoustic sensor arrays 140 to measure one or more various acoustic parameters. The acoustic sensor array 140 may comprise one or more acoustic sensors configured to sense, detect, or otherwise measure acoustic parameters in the habitable space or one or more of the zones therein. Acoustic sensors used in the acoustic sensor array(s) described herein may include any suitable device capable of detecting and/or measuring one or more acoustic parameters and may include, for example, sound level meters, noise dosimeters, noise monitors, etc.

Exemplary, non-limiting performance criteria for the acoustic sensor arrays 140 are shown in Table 3.

TABLE 3

| Sound range (dB) | 30 to 130 dB | Basic accuracy | ±2 dB |
|---|---|---|---|
| Resolution | 0.1 dB | Measurement bandwidth | 31.5 to 8.0 kHz |
| Frequency weighting | A | Response time | Slow |
| Operating temperature | 0 to 40° C. (32 to 104° F.) | Operating relative humidity | 25 to 90% |

The American National Standards Institute classifies noise dosimeters and sound level meters as Class 1 and Class 2. While Class 1 may be considered more accurate than Class 2, for general monitoring a minimum of Class 2 sound pressure level meters and dosimeters are preferred. The acceptance limits for each frequency band are shown in Table 4.

TABLE 4

| Frequency (Hz) | Acceptance limits (dB) Performance class | |
|---|---|---|
| | 1 | 2 |
| 10 | +3.0; −∞ | +5.0; −∞ |
| 12.5 | +2.5; −∞ | +5.0; −∞ |
| 16 | +2.0; −4.0 | +5.0; −∞ |
| 20 | ±2.0 | ±3.0 |
| 25 | +2.0; −1.5 | ±3.0 |
| 31.5 | ±1.5 | ±3.0 |
| 40 | ±1.0 | ±2.0 |
| 50 | ±1.0 | ±2.0 |
| 63 | ±1.0 | ±2.0 |
| 80 | ±1.0 | ±2.0 |
| 100 | ±1.0 | ±1.5 |
| 125 | ±1.0 | ±1.5 |
| 160 | ±1.0 | ±1.5 |
| 200 | ±1.0 | ±1.5 |
| 250 | ±1.0 | ±1.5 |
| 315 | ±1.0 | ±1.5 |
| 400 | ±1.0 | ±1.5 |
| 500 | ±1.0 | ±1.5 |
| 630 | ±1.0 | ±1.5 |
| 800 | ±1.0 | ±1.5 |

TABLE 4-continued

| Frequency (Hz) | Acceptance limits (dB) Performance class | |
|---|---|---|
| | 1 | 2 |
| 1000 | ±0.7 | ±1.0 |
| 1250 | ±1.0 | ±1.5 |
| 1600 | ±1.0 | ±2.0 |
| 2000 | ±1.0 | ±2.0 |
| 2500 | ±1.0 | ±2.5 |
| 3150 | ±1.0 | ±2.5 |
| 4000 | ±1.0 | ±3.0 |
| 5000 | ±1.5 | ±3.5 |
| 6300 | +1.5; −2.0 | ±4.5 |
| 8000 | +1.5; −2.5 | ±5.0 |
| 10000 | +2.0; −3.0 | +5.0; −∞ |
| 12500 | +2.0; −5.0 | +5.0; −∞ |
| 16000 | +2.5; −16.0 | +5.0; −∞ |
| 20000 | +3.0; −∞ | +5.0; −∞ |

An acoustic sensor used in an acoustic sensor array 140 may be configured to measure one or more acoustic parameters at defined frequency recording intervals, for example, but not limited to, every set number of milliseconds, seconds, minutes, hours, etc. In some approaches the frequency recording interval may be based on the acoustic parameter(s) being measured. In some approaches, the frequency recording interval is about one second. In some approaches the acoustic sensor detection interval may be 0.5 minute, one minute, two minutes, three minutes, four minutes, five minutes, or other time interval. Alternatively to a defined detection, in some approaches an acoustic sensor may measure one or more light parameters only upon the occurrence of an event (e.g., the detection of an occupant of a space or zone, the detection of movement of an occupant within a space or zone or between two or more spaces or zones, a minimum change in temperature level, air quality, light level, or other environmental factor for a space or zone, a spike in energy use associated with a space or zone, etc.).

Examples of acoustic parameters that may be monitored by one or more of the acoustic sensor arrays 140 of the acoustic monitoring system 100 include, but are not limited to, sound pressure level (SPL, dB), A-weighted sound pressure level (dBA), C-weighted sound pressure level (dBC), dose (%), statistical noise level ($L_n$), and day/night sound level ($L_{dn}$). In some approaches, not all of the acoustic sensor arrays 140 may be capable of measuring or monitoring all of the same acoustic or other parameters.

Other acoustical parameters that may be useful include, for example, reverberation time (RT), noise criteria (NC), room criteria (RC), room noise criteria (RNC), and speech privacy (e.g., articulation index (AI), privacy index (PI), speech transmission index (STI), and speech intelligibility index (SII)).

In addition to acoustic sensor arrays 140, the acoustic monitoring system 100 may further include a central control circuit 180. The central control circuit 180 may take the form of a programmed computer or other processor-based system or device. For example, the central control circuit 180 may take the form of or incorporate a conventional mainframe computer, mini-computer, workstation computer, personal computer (desktop or laptop), or handheld computer.

The central control circuit 180 may include one or more processing units 181 (one illustrated), non-transitory system memories 182a-182b (collectively 182) and a system bus 184 that couples various system components including the system memory 182 to the processing unit(s) 181. The processing unit(s) 181 may be any logic processing unit, such as one or more central processing units (CPUs), digital signal processors (DSPs), application-specific integrated circuits (ASICs), field programmable gate arrays (FPGAs), programmable logic controllers (PLCs), etc. Non-limiting examples of commercially available computer systems include, but are not limited to, an 80×86, Pentium, or i7 series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation. The system bus 184 can employ any known bus structures or architectures, including a memory bus with memory controller, a peripheral bus, and a local bus. The system memory 182 includes non-transitory Flash or read-only memory ("ROM") 182*a* and non-transitory random-access memory ("RAM") 182*b*. A basic input/output system ("BIOS") 186*a*, which can form part of the ROM 182*a* or RAM 182*b*, contains basic routines that help transfer information between elements within the controller 180, such as during start-up.

The controller 180 may include a hard disk drive 188*a* for reading from and writing to a hard disk 188*b*, an optical disk drive 190*a* for reading from and writing to removable optical disks 190*b*, and/or a magnetic disk drive 192*a* for reading from and writing to magnetic disks 192*b*. The optical disk 190*b* can be a CD/DVD-ROM, while the magnetic disk 192*b* can be a magnetic floppy disk or diskette. The hard disk drive 188*a*, optical disk drive 190*a* and magnetic disk drive 192*a* may communicate with the processing unit 181 via the system bus 184. The hard disk drive 190*a*, optical disk drive 190*a* and magnetic disk drive 192*a* may include interfaces or controllers (not shown) coupled between such drives and the system bus 184, as is known by those skilled in the relevant art. The drives 188*a*, 190*a* and 192*a*, and their associated computer-readable storage media 188*b*, 190*b*, 192*b*, may provide non-volatile and non-transitory storage of computer readable instructions, data structures, program engines and other data for the acoustic monitoring system 100. Although controller 180 is illustrated employing a hard disk 188*a*, optical disk 190*a* and magnetic disk 192*a*, those skilled in the relevant art will appreciate that other types of computer- or processor-readable storage media that can store data accessible by a computer may be employed, such as magnetic cassettes, flash memory, digital video disks ("DVD"), Bernoulli cartridges, RAMs, ROMs, smart cards, etc. The hard disk 188*b* may, for example, store instructions and data for controlling the acoustic monitoring system 100, as well as other for components of a home wellness and/or home automation system, for example based on specific aspects or characteristics detected in one or more indoor spaces or zones therein in the habitable environment, inputs by an occupant or user of the habitable environment, or events expected or occurring in the habitable environment, to acoustic parameters in one more indoor spaces or zones therein to promote the wellness or wellbeing of the occupant(s). Further, the hard disk 188*b* may also, for example, store instructions and data for instructing the installation of acoustic sensor arrays within a built structure as part of the acoustic monitoring system 100.

Program engines can be stored in the system memory 182*b*, such as an operating system 196, one or more application programs 198, other programs or engines and program data. Application programs 198 may include instructions that cause the processor(s) 181 to automatically generate signals to control various of the other subsystems to achieve various environmental characteristics or scenes in the habitable environment, for example based on one or more aspects, characteristics or attributes of an occupant thereof. Application programs 198 may include instructions that cause the processor(s) 181 to automatically receive input and/or display output via various user operable input/output (I/O) devices such as, for example, panels installed in the habitable environment, handheld mobile devices, kiosks, and the like. Other program engines (not specifically shown) may include instructions for handling security such as password or other access protection and communications encryption. The system memory 181 may also include communications programs 194, for example, a server for permitting the central control circuit 180 to provide services and exchange data with the acoustic monitoring system 100 and, optionally, other subsystems or computer systems or devices via the Internet, corporate intranets, extranets, or other networks (e.g., LANs, WANs), as well as other server applications on server computing systems such as those discussed further herein. The server in the depicted embodiment may be markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers are commercially available such as those from Microsoft, Oracle, IBM and Apple.

While shown in FIG. 1 as being stored in the system memory 182*b*, the operating system 196, application programs 198, other programs/engines, program data and communications applications (e.g., server, browser) 194 can be stored on the hard disk 188*b* of the hard disk drive 188*a*, the optical disk 190*b* of the optical disk drive 190*a* and/or the magnetic disk 192*b* of the magnetic disk drive 192*a*. An operator can enter commands and information (e.g., configuration information, data or specifications) via various user operable input/output (I/O) devices, such as, for example, panels installed in the habitable environment, handheld mobile devices, kiosks, and the like, or through other input devices such as a dedicated touch screen or keyboard and/or a pointing device such as a mouse and/or via a graphical user interface. Other input devices can include a microphone, joystick, game pad, tablet, scanner, touch pad, etc. These and other input devices may be connected to one or more of the processing units 181 through an interface such as a serial port interface 185 that couples to the system bus 184, although other interfaces such as a parallel port, a game port or a wireless interface or a universal serial bus ("USB") can be used. A monitor or other display device may be coupled to the system bus 184 via a video interface, such as a video adapter (not shown). The central control circuit can include other output devices, such as speakers, printers, etc. Alternatively, or in addition, these and other input devices may be connected directly to the acoustic control system 120, allowing a user to directly communicate with and/or control the acoustic control system 120.

The central control circuit 180 can operate in a networked environment using logical connections to one or more remote computers and/or devices as described above with reference to FIG. 1. For example, the central control circuit 180 can operate in a networked environment using logical connections to one or more other subsystems, one or more server computer systems, associated non-transitory data storage device, or electronic user devices. The server computer system and associated non-transitory data storage device may, for example, be controlled and operated by a facility (e.g., hotel, spa, apartment building, condominium building, hospital, school, shared office) in which the habitable environment is located. Communications may be via wired and/or wireless network architectures, for instance, wired and wireless enterprise-wide computer networks, intranets, extranets, and the Internet. Thus, the central control circuit 180 may include wireless communications components, for example one or more transceivers or radios 183*a* and associated antenna(s) 183*b* for wireless (e.g., radio or microwave frequency communications, collected referred to herein as RF communications). Other embodiments may include other types of communication networks including telecommunications networks, cellular networks, paging networks, and other mobile networks.

The acoustic monitoring system may also include one or more electronic user devices 170. The electronic user device 170 may be, for example, a smartphone, tablet, a laptop, a mobile phone, a personal digital assistant, a smartwatch, or other wearable computer or smart devices, personal computer devices, or mobile data network connected devices. In some approaches, the electronic user device 170 may be associated with an occupant of the built structure or with a person who inspects or performs maintenance on the built structure (e.g., in the environment database 160).

Further, the acoustic monitoring system may also include or have access to an environment database 160. The environment database 160 may be stored, for example on a server, located locally or in the cloud. The environment database 160 may include a profile associated with an occupant of the built structure 110. The profile may include, for example, acoustic parameter data associated with an occupant of the built structure. In addition to acoustic parameter data, the profile may further include some or all of, for example, temperature parameter data, lighting parameter data, and/or environmental air quality data associated with an occupant. The environment database 160 may further include the acoustic parameter data collected or obtained by the acoustic sensor arrays 140 installed within the built structure. In the environment database 160, acoustic parameter data collected by the acoustic sensor arrays may be associated with particular zones or spaces within the built structure.

In the acoustic monitoring system 100, the central control circuit 180 may be communicatively coupled to the acoustic sensor arrays 140, the acoustic control system 120 of the built structure 110, the electronic user device(s) 170, and the environment database 160.

In operation, the central control circuit 180 may be configured to delineate the boundaries of occupant zones within the built structure 110. The acoustic monitoring system 100 may be configured to divide the built structure 110 into various occupant zones based on electronic floor plans and drawings within the environment database 160. In addition, the central control circuit 180 may be configured to divide the built structure 100 into various occupant zones 130 based on images or photos of the built structure 110 captured by the electronic user device 170 and uploaded to the environment database 160. In some approaches, each occupant zone 130 may take the form of a single room. In other approaches, at least one occupant zone 130 may take the form of a single room. The central control circuit 180 may also be configured to delineate boundaries of one or more acoustic zones 150 within one or more of the occupant zones based 130 on electronic floor plans and drawings within the environment database 160 and/or based on images or photos of the built structure 110 captured by the electronic user device 170 and uploaded to the environment database 160. Zoning of the habitable environment within the built structure 110 may be utilized to facilitate improved or even optimal or near optimal acoustic sensor placement within the built structure.

Further, in operation, the acoustic monitoring system 100 may instruct the installation of acoustic sensor arrays 140 within the built structure 110 based, in part, on the division of occupant zones 130 and/or acoustic zones 150. Generally, acoustic sensor installation may be prioritized as follows:

1. One sensor array per one occupant zone
2. One sensor per one acoustic zone in an occupant zone.

Figure 10:
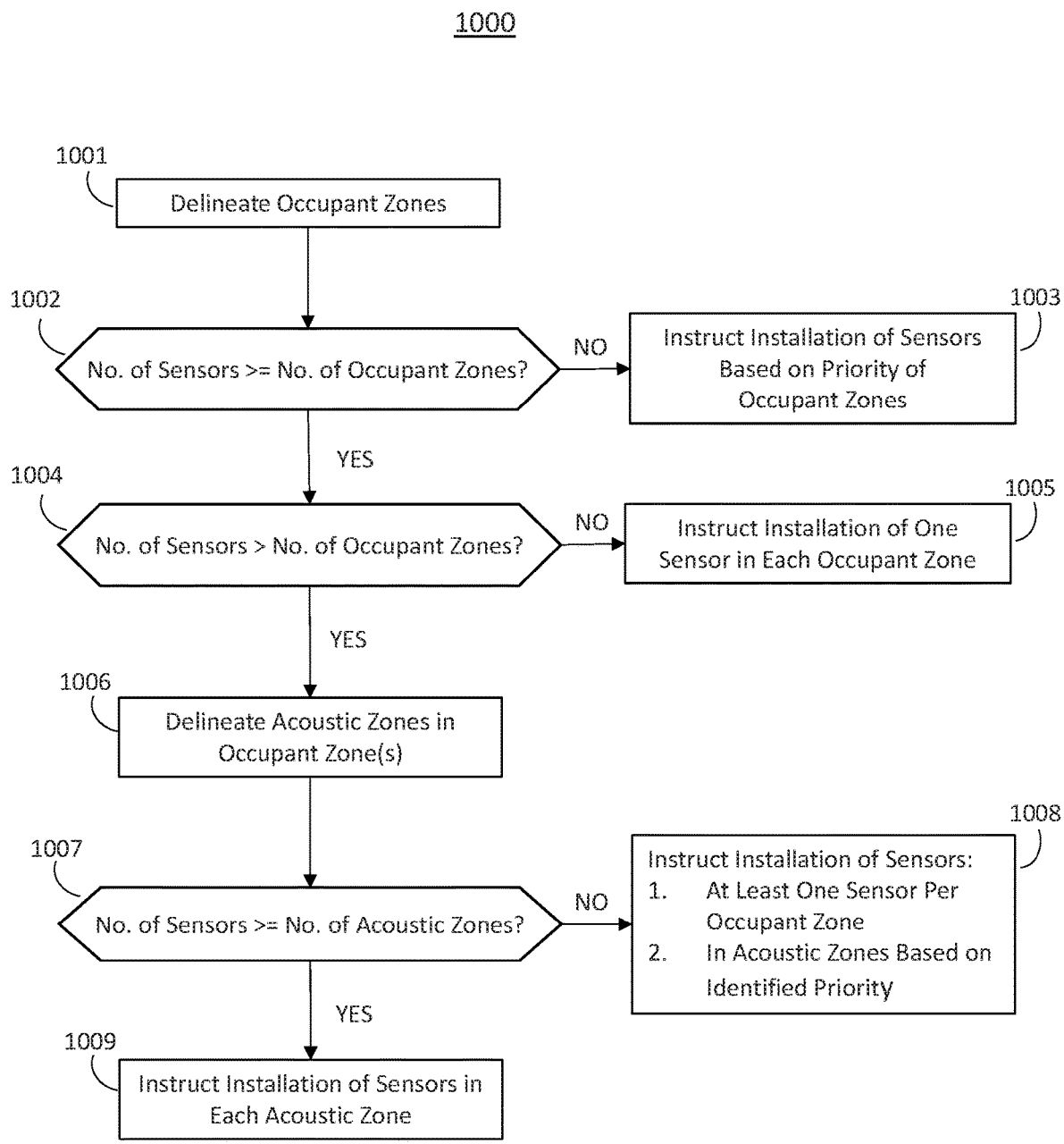
FIG. 10 is a flow diagram of a method for monitoring acoustic parameters in accordance with some embodiments.

By one approach, the central control circuit 180 may instruct the installation or operation of one or more acoustic sensor arrays 140 in accordance with the exemplary method detailed in FIG. 10. Prioritization of acoustic sensor installation is discussed in greater detail below.

Additionally, electronic user device(s) 170 may be configured to receive one or more instructions regarding the allocation of or the installation location of one or more acoustic sensor arrays 140 within the built structure. For example, an electronic user device associated with an individual who performs maintenance on the built structure may receive a prioritized list of installation locations for acoustic sensor arrays in the built structure. For example, in some approaches, if the plurality of acoustic sensor arrays available is less than a total of the delineated occupant zones, the system instructs installation of acoustic sensor arrays in occupant zones having a highest frequency of use. If the plurality of acoustic sensor arrays available is equal to or greater than a total of the delineated occupant zones, the system may instruct the installation or operation of at least one acoustic sensor array in each occupant zone, and one or more additional acoustic sensor arrays in occupant zones with more than one delineated acoustic zone based on an identified order of preference.

After one or more acoustic sensor arrays 140 have been installed, the acoustic monitoring system 100 may detect or otherwise monitor one or more acoustic parameters within the built structure 110 via the installed acoustic sensor arrays 140. Measured acoustic parameters may be compared to values within the environment database 160 to determine whether one or more acoustic parameters require adjustment. If an acoustic parameter requires adjustment, the central control circuit 180 may send a signal to the acoustic control system 120 to make an adjustment. For example, the acoustic control system 120 may activate or otherwise employ a noise dampening system or component to dampen and reduce the propagation of sound throughout the zone. In another example, the acoustic control system may activate or otherwise employ a sound producing system or component to produce pleasing or relaxing sounds.

During operation, the control circuit 180 may send notifications to the user of the electronic user device upon detection of particular measurements or readings by the acoustic sensor arrays 140. For example, the control circuit 180 may send a user of an electronic user device a notification that the user has not been exposed to positive sounds within a predetermined period of time. In another example, the control circuit may send a user of an electronic device a notification that a particular acoustic parameter as measured by an acoustic sensor array in a particular zone within the built structure is outside a preselected range or has been outside a preselected range for a predetermined period of time.

In some embodiments, the acoustic monitoring system may further include one or more occupancy sensors to detect or sense whether the built structure is occupied. The occupancy sensors may be communicatively coupled to the central control circuit to provide signals indicative of whether the built structure is occupied. In response, the acoustic monitoring system may begin monitoring and/or adjusting one or more acoustic parameters. For example, it may be preferred to only collect data from the acoustic sensor arrays when the built structure is occupied.

In some approaches, the acoustic monitoring system 100 may include or otherwise be coupled to an environmental control system associated with the built structure 110, the environmental control system configured to adjust at least one of lighting levels, ambient temperature levels, acoustic parameters, or air quality levels in at least a portion of the built structure 110.

In some approaches, the environment database 160 may store occupant profiles associated with particular occupants within the built structure. In one embodiment, the control circuit 180 detects a particular occupant within an occupant zone 130 and/or acoustic zone 150, the occupant having an occupant profile in the environment database 160. By another approach, the control circuit 180 may be configured to detect multiple occupants within the occupant zones 130 and/or acoustic zones 150 and in some configurations may identify the particular occupant. The control circuit 180 then locates the particular occupant in an occupant zone 130 and/or acoustic zone 150 within the built structure and analyzes sensor array readings in that zone. Next, the control circuit 180 compares sensor readings with the acoustic parameters stored in the occupant profile.

Upon detection that the sensor readings in the particular occupant zone 130 and/or acoustic zone 150 are not within the parameters of the occupant profile, the control circuit 180 instructs the environmental control system to adjust the parameters pursuant to the occupant profile. Upon detecting that sensor readings in a particular occupant zone 130 and/or acoustic zone 150 are not within the parameters of the occupant profile, the control circuit 180 may also send a notification to a user via an electronic user device regarding the reading and adjustment of parameters pursuant to the occupant profile. In some approaches, the acoustic sensor array may include a first sensor installed at a first height and a second sensor installed at a second height in the occupant zone and/or acoustic zone and the control circuit 180 analyzes a height parameter of the occupant profile to determine whether to compare first sensor readings or second sensor readings to the parameters in the associated occupant profile.

In some approaches, the control circuit 180 may be configured to evaluate an occupant ranking index for each of the lighting levels, ambient temperature levels, acoustic parameters, or air quality levels to determine which parameters from the occupant profile database to set for the particular occupant zone.

In some embodiments, the environment database 160 also may include information related to one or more occupants such as, for example, allergies or other health conditions that occupants may have, schedule of occupancy by hour, day, week, etc. for one or more zones, preferred air temperatures, etc.

When monitoring the acoustic environment, the placement of acoustic sensors is an important consideration. For example, for effective monitoring, sensor placement must take into consideration the distribution and activity patterns of the occupants in the environment. In addition, criteria on acoustical zoning, spatial and temporal monitoring requirements, and data storage and reporting are also significant.

As discussed above, within the built structure 110, one or more occupant zones 130 may be further sub-divided into acoustic zones based on, for example, work activity, potential to generate noise, occupancy, size of the zone, or any other relevant factor(s).

Those skilled in the art appreciate that a primary source of noise within an office environment is often occupant-generated sound, such as from human speech and telephone conversations. Therefore, in some approaches, acoustic zones may be identified or otherwise delineated based on, for example, typical office work patterns.

The US General Services Administration (GSA) describes six work patterns typically observed in offices across the United States; these patterns are summarized below in Table 5 and illustrated in FIG. 2.

TABLE 5

|  | Interactive | Concentrative |
| --- | --- | --- |
| Desk-bound | >75% time at their own desk<br>>50% desk time communicating with others | >75% time at their own desk<br>>50% desk time working individually |
| Internally-Mobile | <75% time at their own desk<br><25% outside the office<br>>50% desk time communicating with others | <75% time at their own desk<br><25% outside the office<br>>50% desk time working individually |
| Externally-Mobile | >25% outside the office<br>>50% desk time communicating with others | >25% outside the office<br>>50% desk time working individually |

Desk-bound, Interactive: People are Desk-bound and Interactive if they spend over 75% of their workday at their own desk, and over 50% of the time at their desk talking to someone face-to-face or on the phone. Supervisors, program managers, receptionists, call center staff, and help desk employees often have the desk-bound, interactive work pattern.

Desk-bound, Concentrative: People are Desk-bound and Concentrative if they spend over 75% of their workday at their own desk, and spend over 50% of the time at their desk focused on solo work instead of talking to others. Accountants, budget analysts, paralegals, programmers, data entry staff, and some researchers often have the desk-bound, concentrative work pattern.

Internally-Mobile, Interactive: People are Internally-Mobile and Interactive if they spend less than 25% of their workday outside the office, less than 75% of their workday at their own desk, and over 50% of the time at their desk talking to someone face-to-face or on the phone. Project managers, client managers, designers, and some engineers often have the internally-mobile, interactive work pattern.

Internally-Mobile, Concentrative: People are Internally-Mobile and Concentrative if they spend less than 25% of their workday outside, less than 75% of their workday at their own desk, and over 50% of the time at their desk focused on solo work instead of talking to others. CFOs, comptrollers, some engineers, and many scientists often have the internally-mobile, concentrative work pattern.

Externally-Mobile, Interactive: People are Externally-Mobile and Interactive if they spend over 25% of their workday outside the office, and over 50% of the time at their desk talking to someone face-to-face or on the phone. Executive managers, sales and marketing staff, and management consultants often have the externally-mobile, interactive work pattern.

Externally-Mobile, Concentrative: People are Externally-Mobile and Concentrative if they spend over 25% of their workday outside the office, and over 50% of the time at their desk focused on solo work instead of talking to others. Auditors, field inspectors, and some attorneys often have the externally-mobile, concentrative work pattern.

FIG. 2 illustrates hypothetical layout of an office environment 200 subdivided into six acoustic zones based on the six work patterns described above. It should be understood that the hypothetical layout illustrated in FIG. 2 is for exemplary purposes. Not all rooms or occupant zones will necessarily be subdivided into all six work-pattern acoustic zones described.

In other approaches, acoustic zones may be identified or otherwise delineated based on, for example, potentials to generate noise, as illustrated in FIG. 3. For example, as shown in FIG. 3, areas of an office environment 300 having shared work spaces, which generally have a high potential to generate noise, may be delineated or otherwise identified as a noisier (interactive) acoustic zone. Conversely, areas of the office environment 300 having primarily individual work spaces, which generally have a low potential to generate noise, may be delineated or otherwise identified as a quieter (concentrative) acoustic zone.

The criteria for prioritization of sensor placement is also important in continuous monitoring, especially when the number of sensors is limited.

In general, acoustic sensor installation should be prioritized as follows:
1. One sensor array per one occupant zone
2. One sensor per one acoustic zone in an occupant zone.

A sound field usually changes substantially through a wall, since walls are effective barriers for acoustics. Accordingly, at least one sensor should be installed in each occupant zone surrounded by walls (i.e., a room). If the number of sensors is less than the number of occupant zones, the sensors should first be installed in locations more frequently used by the occupants.

Because a sound field can be noticeably different among different areas of an occupant zone, separate monitoring for each area (i.e., each acoustic zone) is important to effectively understand how sound changes in space. If there is more than one acoustic zone in an occupant zone, additional sensors should be installed in each acoustic zone. If the number of sensors is less than the number of acoustic zones, sensors should be installed based on an identified order of preference.

Criteria for determining the priority of acoustic zones may include the current, expected, intended, or predicted number of occupants in occupant zones, frequency of use, and the similarity of occupant zones with respect to size, boundaries, and position. In some approaches, priority of acoustic zones may be based on typical office work patterns. For example, in some approaches, the identified order of preference may be in accordance with the following order with reference to the six work patterns typically observed in offices across the United States described by the US General Services Administration (GSA) and summarized above in Table 5:

$1^{st}$ - Deskbound/Interactive
$2^{nd}$ - Deskbound/Concentrative
$3^{rd}$ - Internally-Mobile/Interactive
$4^{th}$ - Internally-Mobile/Concentrative
$5^{th}$ - Externally-Mobile/Interactive
$6^{th}$ - Externally-Mobile/Concentrative This order of preference is based upon consideration of the duration in which occupants stay in an acoustic zone (mobility) and the expected noise level by activity type (interactive/concentrative). While one could consider installing sensors first at meeting places such as conference rooms, the lunch room, or a cafeteria which could be expected to get noisier than workstations, these areas are generally noisy for only a short period of time (e.g., about an hour) during business hours when occupants gather. However, it is more important to consider the overall, long term noise exposure. For example, if one occupant spends seven hours in an open office with 60 dBA and an hour in a lunch room with 85 dBA, it may be preferable to monitor the open office.

Optimal or near optimal acoustic sensor placement within a habitable environment is important to enhance the performance of systems that monitor acoustic parameters. Optimal acoustic sensor placement may be dictated by the spatial variations and temporal variations of sound within a built structure. Choosing optimal or near optimal installation within a built structure is important for delivering reliable data and constructive feedback for occupants. The placement of sensor arrays within a built structure may affect the readings of sensor arrays and, therefore, may impact the quality of the data collected by sensor arrays.

When measuring acoustic parameters, it may be desirable to place a sound level meter's microphone at a sitting height of about 1.2 meters (about 4 ft) to approximate the sound levels experienced by humans when sitting in a work or home environment. However, in a dynamic office environment, it is often not practical to place sensors on the floor or on a desk. Therefore, it is preferable that a sensor's microphone be placed on the ceiling. Although this method results in the microphone likely being positioned higher than sitting or standing height, it is a practical way to install sensors for continuous monitoring in a dynamic office environment. To maintain minimum accuracy for monitoring, it is preferred to place the sensor microphone at a height of about 2.7 meters (about 9 ft) above the floor. In general, for a ceiling of height equal to or lower than about 2.7 meters, it is preferable to install the acoustic sensor on the ceiling at the center of a zone. If the ceiling height is taller than about 2.7 meters, sensors can be installed such that they are hanging from the ceiling at about 2.7 meters above the floor and/or sensors may be installed on a partition, in or on furniture, or in a workstation-mounted configuration in the occupant zone or acoustic zone.

Figure 4:
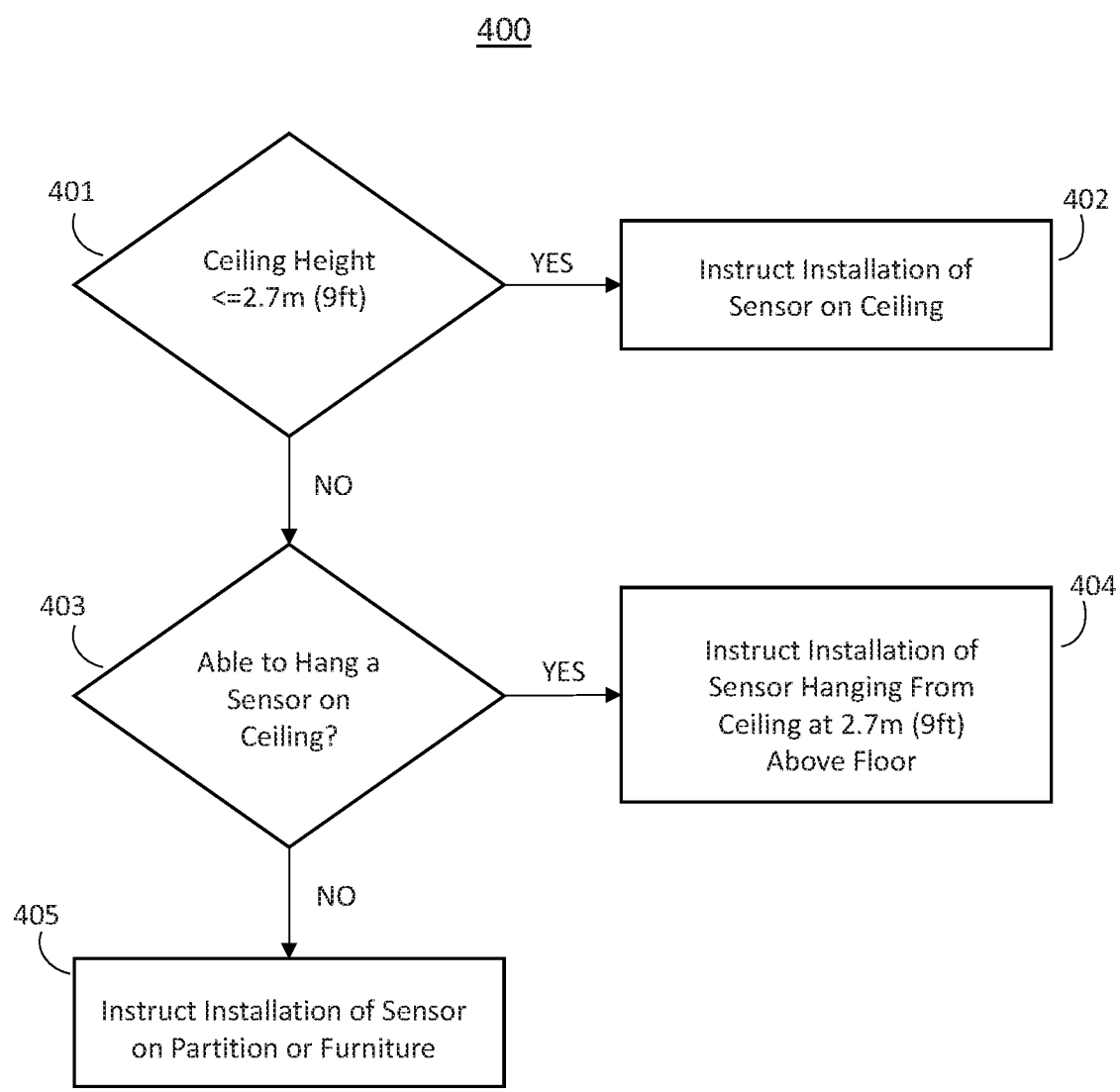
FIG. 4 is a flow diagram of an exemplary method for determining acoustic sensor installation by ceiling height in accordance with some embodiments.

In one approach, acoustic monitoring system 100 may instruct the installation of acoustic sensor arrays 140 within the built structure 110 based, in part, height determinations, as illustrated by the flow diagram in FIG. 4. In step 401, a determination is made as to whether the ceiling height of the occupant zone or acoustic zone is less than or equal to about 2.7 meters (about 9 ft). If the ceiling height of the occupant zone or acoustic zone is less than or equal to about 2.7 meters (about 9 ft), in step 402 the system instructs the installation of sensor arrays on the ceiling of the occupant zone or acoustic zone. If the ceiling height of the occupant zone or acoustic zone is greater than about 2.7 meters, in step 403 a determination is made as to whether the sensor array can be hung from the ceiling. If so, in step 404 the system instructs the installation of a sensor array hanging from the ceiling at about 2.7 meters above the floor. If the sensor array cannot be hung from the ceiling, in step 405 the system instructs the installation of a sensor array on a partition or on/in a piece of furniture. In some approaches, the system may instruct the installation of a sensor array in a workstation-mounted configuration in the occupant zone or acoustic zone. In some approaches, the plurality of acoustic sensors is installed in a center of the occupant zones and/or acoustic zones.

Figure 5:
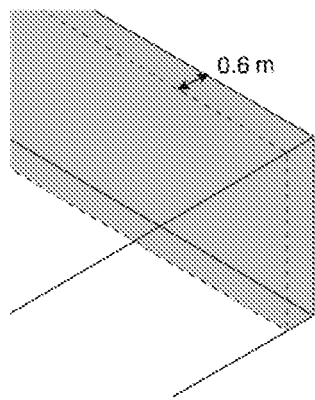
FIG. 5 is a diagram illustrating restricted areas for acoustic sensor placement in accordance with some embodiments.
Figure 5:
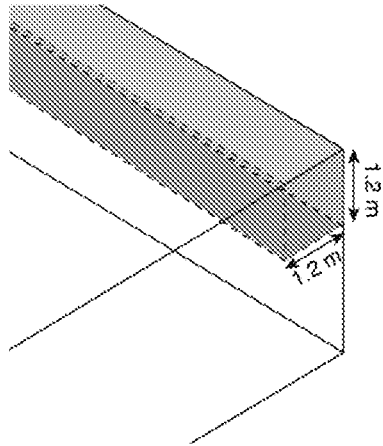
Figure 5:
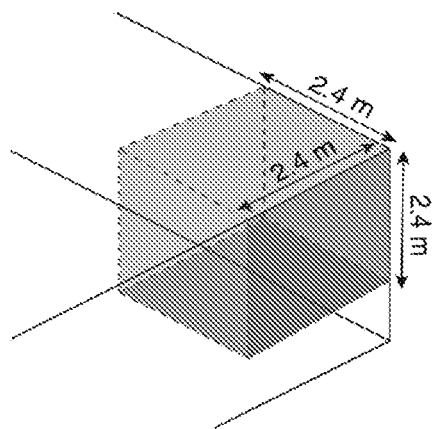

It should be noted that if a sensor array is too close in proximity to acoustically-reflective surfaces (typically hard surfaces such as walls and furniture surfaces), the measured sound level may be higher than the actual level. When using a sound level meter, it is preferable that the meter be located a distance away from reflective surfaces, as illustrated in FIG. 5. For example, in scenarios in which one reflective surface is at issue (e.g., one wall), it is preferable to locate the sensor array at least about 0.6 meters (about 2 ft) away from a reflective surface, as shown in FIG. 5(a). In scenarios in which two reflective surfaces are at issue (e.g., two intersecting walls), it is preferable to locate the sensor array at least about 1.2 meters (about 4 ft) away from the two intersecting surfaces, as shown in FIG. 5(b). In scenarios in which three reflective surfaces are at issue (e.g., three intersecting walls), it is preferable to locate the sensor array at least about 2.4 meters (about 8 ft) away from the three intersecting surfaces, as shown in FIG. 5(c). In an office setting, the above guidelines may be less practical because office furniture and furnishings may have reflective surfaces. At a minimum, it is preferable to maintain distances from walls as shown in FIG. 5 and hang a sensor's microphone on the ceiling to ensure sufficient distance from reflective furniture surfaces.

In addition to human activities, exposed HVAC ducts, inlets, and outlets are additional sources of noise. If acoustic sensors arrays are located too close to these objects, measurements may not accurately represent the overall noise level in a space. Thus, it is also preferred that acoustic sensor arrays be installed at least about 1.5 meters (about 5 ft) away from exposed HVAC ducts, inlets, outlets, windows, and the like. It is preferable to have as much distance as possible from these objects.

Temporal considerations are important due to variations in sound level. To facilitate convenient data analysis and visualization, a 1-second frequency recording interval is preferred. This interval is expected to sufficiently capture the most transient changes in the acoustic environment.

Figure 6:
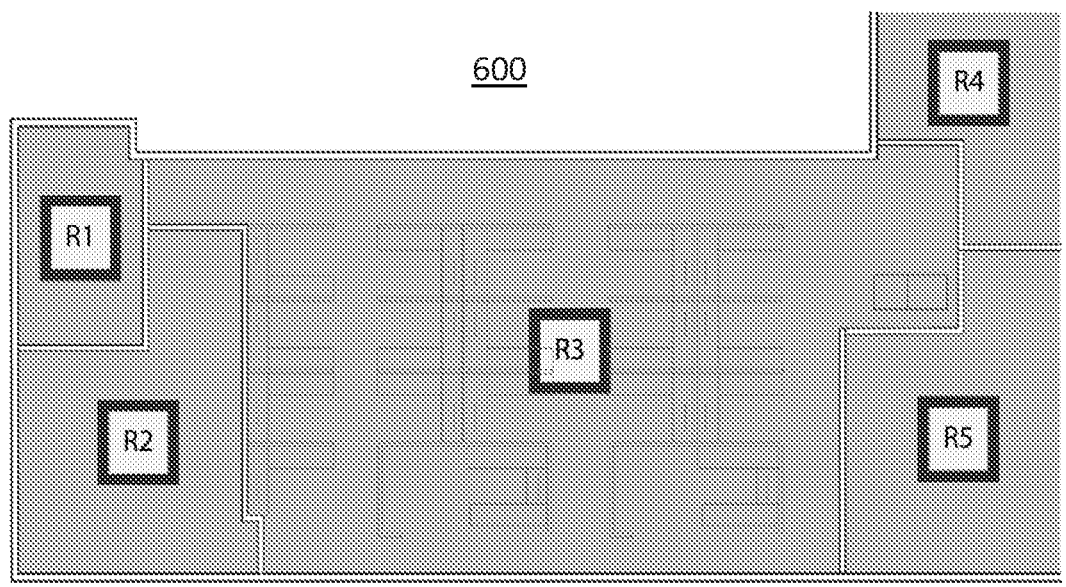
FIG. 6 is a diagram of a habitable environment divided into occupant zones in accordance with some embodiments.
Figure 7:
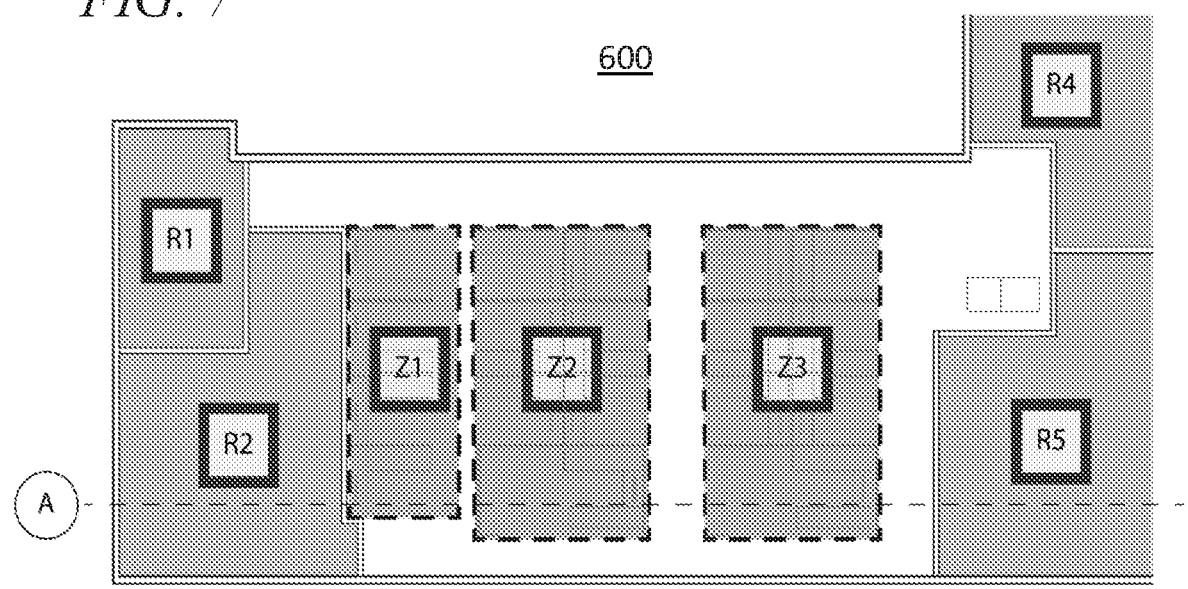
FIG. 7 is a diagram of a habitable environment divided into occupant zones and acoustic zones in accordance with some embodiments.
Figure 8:
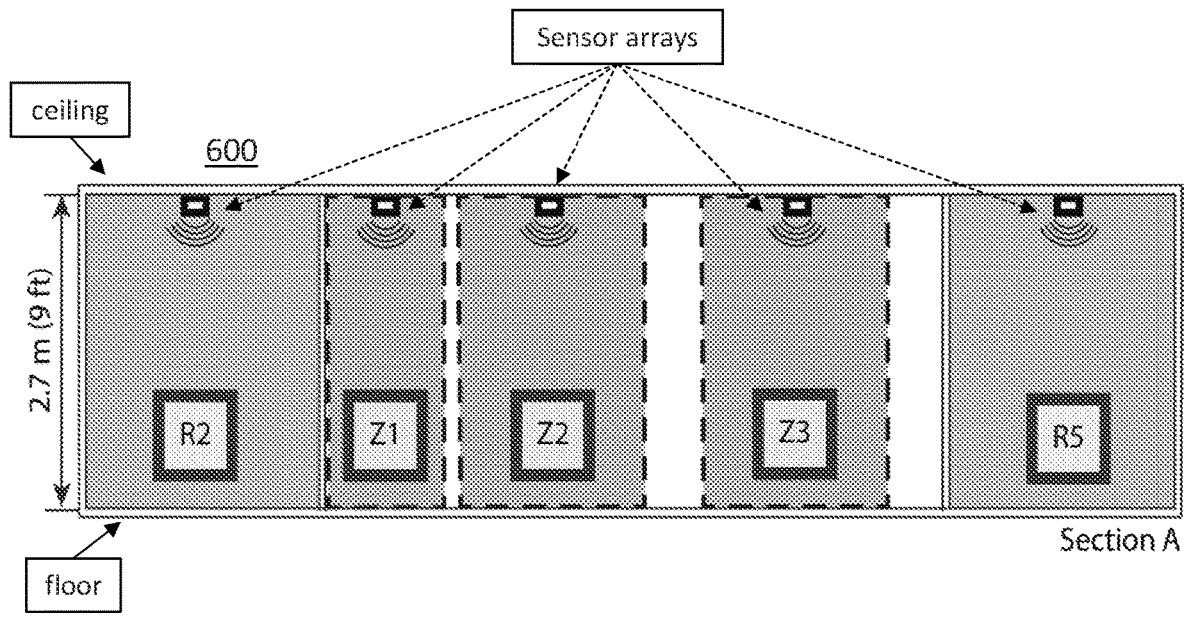
FIG. 8 is a cross-sectional view of installation heights of sensor arrays taken along line A in FIG. 7 in accordance with some embodiments.
Figure 9:
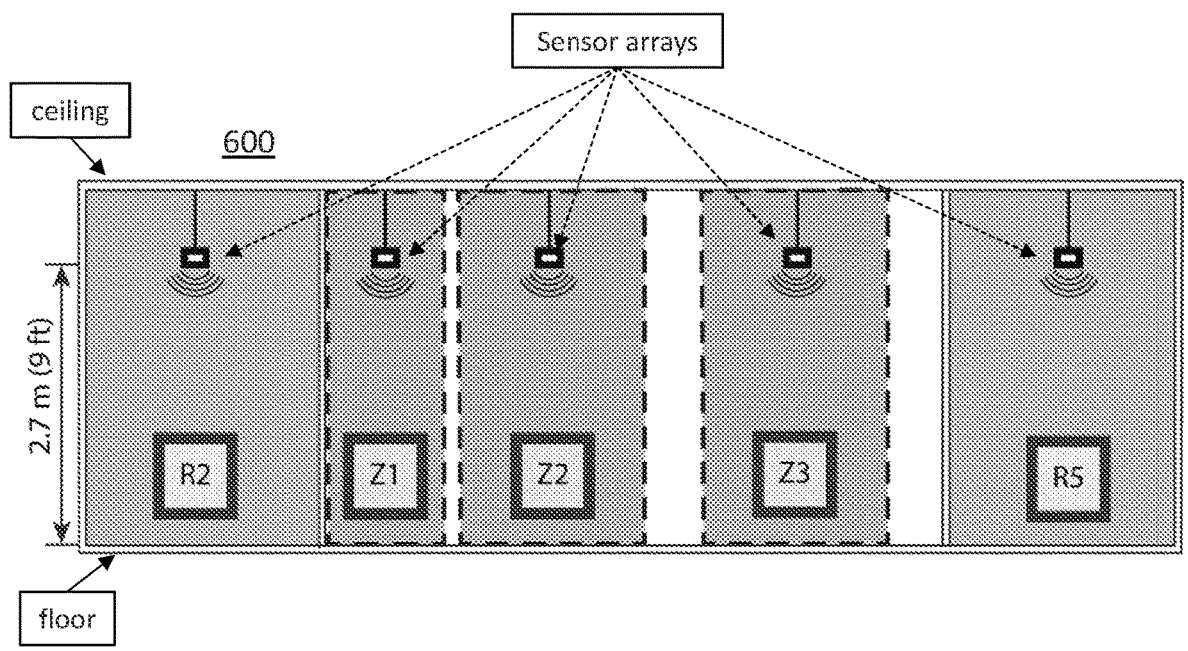
FIG. 9 is a cross-sectional view of installation heights of sensor arrays taken along line A in FIG. 7 in accordance with some embodiments.

FIGS. 6-9 illustrate an example of acoustic sensor placement and installation in an open office plan layout 600 in accordance with some embodiments. The dashed line A in FIG. 7 is the location where section views in FIGS. 8 and 9 are generated.

In this example, seven sensors are available to monitor the acoustic environment in the open office plan layout 600. As a first step, five occupant zones/rooms (R1 to R5) are identified in the open office plan layout 600 as illustrated in FIG. 6. In this example, the open office R3 is considered to be one room since it is not separated by walls other than the boundary.

Since the total number of sensors (seven, as mentioned above) is greater than the total number of rooms (five), the next step is to define acoustic zones in the rooms. As shown in FIG. 7, there are three acoustic zones (Z1, Z2, and Z3) delineated in room R3 (which are defined by work patterns), and only one acoustic zone per room for the other rooms (R1, R2, R4, and R5). Thus, the open office plan layout 600 in FIG. 7 has total of seven acoustic zones—R1, R2, R4, R5, Z1, Z2, and Z3.

Since the total number of sensors (seven) is the same as the total number of acoustic zones (seven), the system instructs the installation of sensors in every zone. In some approaches, determination of the location of the location of the sensors may be in accordance with the flow diagram illustrated in FIG. 4 as discussed above. As discussed above with reference to FIG. 4, there are three potential scenarios: i) ceiling height ≤2.7 m (9 ft), ii) ceiling height >2.7 m (9 ft) and sensors can be hung from the ceiling, iii) ceiling height >2.7 m (9 ft) and sensors cannot be hung from the ceiling.

If the ceiling height is equal to or lower than about 2.7 m (9 ft), the system instructs installation of sensors in the center of the ceiling, as illustrated in FIG. 8. FIG. 8 is a section view at the dashed line A in FIG. 7 and shows the sensor installation locations for the open office layout plan 600 when the ceiling height is equal to or lower than 2.7 m (9 ft). Sensors are installed at the center of a zone on the ceiling. Rooms R2 and R5 are assumed to have only one zone, so one sensor is installed per room. Rooms R1 and R4 are purposely omitted from view to more clearly illustrate sensor placement.

FIG. 9 is a section view at the dashed line A in FIG. 7 and shows the sensor installation locations for the open office layout plan 600 when the ceiling height is higher than 2.7 m (9 ft). If the ceiling height is higher than 2.7 m (9 ft), the system instructs sensors at a height of 2.7 m (9 ft) above the floor, hanging from the ceiling as shown in FIG. 9. If the ceiling height is higher than 2.7 m (9 ft), and it is not possible to install sensors that hang from the ceiling, the system instructs installation of the sensors on a partition or on furniture.

FIG. 10 illustrates a method of monitoring one or more acoustic parameters 1000 in accordance with some embodiments. The method of FIG. 10 may be deployed by the acoustic monitoring system 100 or portions thereof as described with reference to FIG. 1.

The method includes steps for sensor installation within the habitable environment. Spatial and temporal variation of parameters related to environmental quality, especially in the thermal environment and air quality, impact the quality of data collected by sensor arrays. In order to enhance performance of the acoustic monitoring system 100, the method also includes zoning of the habitable environment to determine optimal or near optimal sensor placement. By one approach, the method is primarily executed by the control circuit 180 of acoustic monitoring system 100.

The method begins at step 1001. In step 1001, the system delineates occupant zones. Occupant zones may be delineated based, in whole or in part, on a floor plan detailing the layout of the habitable environment, drawings of the interior layout of the habitable environment, and/or photographs of the habitable environment. In some approaches, the boundaries of the occupant zones may be physical or psychological partitions. Physical partitions may be defined by walls and/or partitions between spaces. For example, in some approaches, an occupant zone may take the form of a room in a habitable environment. Psychological partitions may be defined by the normal activities performed by occupants within the space. Psychological partitions, for example, may be defined based on different floorings, different furniture (e.g., desks, tables, couches, beds, chairs), and/or different appliances (e.g., copy machines, refrigerators, microwaves, printers, washers, dryers) within the built structure.

In some embodiments, the number of delineated occupant zones is less than the total number of sensor arrays. In step 1002, the system determines whether the number of available or usable sensor arrays is greater than or equal to the number of occupant zones. If the total number of sensor arrays is less than the number of occupant zones, then the system proceeds to step 1003. At step 1003, the system instructs the installation of sensor arrays based on the priority of occupant zones.

Criteria for determining the priority of occupant zones may include the current, expected, intended, or predicted number of occupants in occupant zones, frequency of use, and the similarity of occupant zones with respect to size, boundaries, and position. By one approach, more sensor arrays may be allocated to or installed in occupant zones which have more occupants. If two occupant zones are of similar size, share boundaries, and are adjacent then the two occupant zones may be combined in to a single zone which includes a single sensor array. In some approaches, the installation of sensors is based on occupancy zones having the highest frequency of use.

If the total number of sensor arrays is equal to the number of occupant zones (see step 1004), then the system proceeds to step 1005. At step 1005, the system instructs installation of one sensor array in each occupant zone.

If the total number of sensor arrays is greater than the number of occupant zones (see step 1004), then the system proceeds to step 1006. At step 1006, the system delineates acoustic zones in one or more of the occupant zones. Acoustic zones may be delineated based on for example, work activity, potential to generate noise, occupancy, size of the zone, or any other relevant factor(s).

Those skilled in the art appreciate that a primary source of noise within an office environment is often occupant-generated sound, such as from human speech and telephone conversations. Therefore, in some approaches, acoustic zones may be identified or otherwise delineated based on, for example, typical office work patterns. In some approaches, acoustic zones may be delineated based on the six work patterns typically observed in offices across the United States described by the US General Services Administration (GSA) and summarized above in Table 5 (Deskbound/Interactive; Deskbound/Concentrative; Internally-Mobile/Interactive; Internally-Mobile/Concentrative; Externally-Mobile/Interactive; and Externally-Mobile/Concentrative) and described above with reference to FIG. 2. In some approaches, acoustic zones may be delineated based on potentials to generate noise, as discussed above with reference to FIG. 3.

In some embodiments, the number of delineated acoustic zones is less than the total number of sensor arrays. In step 1007, the system determines whether the number of available or usable sensor arrays is greater than or equal to the number of acoustic zones. If the total number of sensor arrays is less than the number of acoustic zones, then the system proceeds to step 1008. At step 1008, the system instructs the installation of sensor arrays such that at least one sensor array is installed per occupant zone, and then based on the priority of acoustic zones within the occupant zone(s). Criteria for determining the priority of acoustic zones may include the current, expected, intended, or predicted number of occupants in occupant zones, frequency of use, and the similarity of occupant zones with respect to size, boundaries, and position. In some approaches, priority of acoustic zones may be based on typical office work patterns. As discussed above, acoustic zones may be delineated based on the six work patterns typically observed in offices across the United States described by the US General Services Administration (GSA) and summarized above in Table 5. For example, each acoustic zone may be identified as one of: Deskbound/Interactive; Deskbound/Concentrative; Internally-Mobile/Interactive; Internally-Mobile/Concentrative; Externally-Mobile/Interactive; and Externally-Mobile/Concentrative. In such a scenario, the identified order of preference for sensor array installation in acoustic zones may be in accordance with the following order:

$1^{st}$ - Deskbound/Interactive
$2^{nd}$ - Deskbound/Concentrative
$3^{rd}$ - Internally-Mobile/Interactive
$4^{th}$ - Internally-Mobile/Concentrative
$5^{th}$ - Externally-Mobile/Interactive
$6^{th}$ - Externally-Mobile/Concentrative This order of preference is based upon consideration of the duration in which occupants stay in an acoustic zone (mobility) and the expected noise level by activity type (interactive/concentrative). In other approaches, the order of preference may be based on potentials to generate noise. For example, as discussed above with reference to FIG. 3, acoustic zones having shared work spaces, which generally have a high potential to generate noise, may be delineated or otherwise identified as a noisier (interactive) acoustic zone, while acoustic zones having primarily individual work spaces, which generally have a low potential to generate noise, may be delineated or otherwise identified as a quieter (concentrative) acoustic zone. In such a scenario, quieter (concentrative) acoustic zones may be prioritized first for sensor array installation and noisier (interactive) acoustic zones prioritized second.

If the total number of sensor arrays is greater than or equal to the number of acoustic zones, then the system proceeds to step 1009. At step 1009, the system instructs installation of sensor arrays in each acoustic zone.

In some approaches, the method may further include monitoring via acoustic sensor arrays positioned in a space and/or receiving or otherwise obtaining data from acoustic sensor arrays positioned in a space and performing functions in response to the data obtained or otherwise received. For example, in some approaches, the method may include the step of operating an acoustic control system according to readings from the acoustic sensors in the delineated occupant zones and/or acoustic zones. In some approaches, the method may include determining, based at least in part on the data, if one or more acoustic parameters within at least one of the plurality of zones needs to be adjusted. In some approaches, the method may include operating an environmental system, in cases to adjust the one or more acoustic parameters within the built structure. In some approaches, the method may further include sending a signal indicative of the need for acoustic parameter adjustment within the one of the plurality of zones.

In some approaches, the method may further include installing the plurality of acoustic sensors in the occupant zones and/or acoustic zones based on height criteria, as discussed above with reference to FIGS. 4 and 6 to 9. For example, installation of the acoustic sensors in the occupant zones and/or acoustic zones may be such that if a height of a ceiling in an occupant zone or acoustic zone is equal to or lower than about 2.7 meters, at least one of the plurality of acoustic sensors is mounted on a ceiling of the occupant zone or acoustic zone (as shown in FIG. 8), and if a height of a ceiling in an occupant zone or acoustic zone is greater than about 2.7 meters, at least one of the plurality of acoustic sensors is suspended from a ceiling of the occupant zone or acoustic zone at a height of about 2.7 meters (as shown in FIG. 9). In some approaches, the plurality of acoustic sensors is installed in a center of the occupant zones and/or acoustic zones.

In some approaches, the plurality of acoustic sensors is installed at least 1.5 meters away from any HVAC ducts, inlets, outlets, and windows in the occupant zones and/or acoustic zones. In some approaches, the plurality of acoustic sensors is installed at least about 0.6 meters away from a reflective surface in the occupant zones and/or acoustic zones (as shown in FIG. 5(a)), at least about 1.2 meters away from two intersecting reflective surfaces in the occupant zones and/or acoustic zones (as shown in FIG. 5(b)), and/or at least about 2.4 meters away from three intersecting reflective surfaces in the occupant zones and/or acoustic zones (as shown in FIG. 5(c)).

In some approaches, the system may determine that at least one of the plurality of acoustic sensors cannot be mounted on or suspended from a ceiling in the occupant zone or acoustic zone. In such a scenario, the system instructs installation of the acoustic sensor at a height of about 1.2 meters in the occupant zone or acoustic zone where, in some approaches, the acoustic sensor may be installed in a center of the occupant zone or acoustic zone. In some approaches, the acoustic sensor may be installed on a partition, in furniture, or in a workstation-mounted configuration in the occupant zone or acoustic zone.

The above installation guidelines for sensor arrays in a system for monitoring acoustic parameters may be considered before operating an environmental control system or remediating sound or noise in habitable environment, such as an indoor space. The data obtained from the system for monitoring acoustic parameters may also be used to determine whether one or more acoustic parameters within the habitable environment needs adjustment.

The various embodiments described above can be combined to provide further embodiments. Aspects of the embodiments can be modified, if necessary or desirable to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed:

1. An apparatus for sheltering occupants comprising:
a built structure having a habitable environment;
an acoustic sensor array configured to measure sound parameters;
a central control circuit communicatively coupled to the acoustic sensor array, the central control circuit configured to:
delineate occupant zones based on an electronic floor plan;
delineate acoustic zones within one or more of the occupant zones based on the electronic floor plan; and
instruct installation of acoustic sensor arrays according to the following parameters:
if acoustic sensor arrays available are less than a total of the occupant zones, installation of the acoustic sensor arrays occurs based on occupant zones having a highest frequency of use, and
if acoustic sensor arrays available are equal to or greater than a total of the occupant zones, at least one acoustic sensor array is installed per occupant zone, and installation of acoustic sensor arrays in occupant zones with more than one delineated acoustic zone occurs based on an identified order of preference.

2. The apparatus of claim 1, wherein each acoustic zone is identified as one of:
deskbound/interactive; deskbound/concentrative; internally-mobile/interactive; internally-mobile/concentrative; externally-mobile/interactive; and externally-mobile/concentrative; and
the identified order of preference comprises: deskbound/interactive first, deskbound/concentrative second, internally-mobile/interactive third, internally-mobile/concentrative fourth, externally-mobile/interactive fifth, and externally-mobile/concentrative sixth.

3. The apparatus of claim 1, further comprising an acoustic control system and the central control circuit is further configured to instruct the acoustic control system to respond to readings from the acoustic sensor arrays in the occupant zones and/or acoustic zones.

4. The apparatus of claim 3, wherein the acoustic control system comprises at least one of a sound producing system and sound dampening system.

5. The apparatus of claim 1, further comprising at least one electronic user device in communication with the central control circuit and configured to receive instructions regarding installation location of one or more of the acoustic sensor arrays.

6. The apparatus of claim 5, wherein the at least one electronic user device is configured to send installation configuration information or floor plan updates to the central control circuit.

7. The apparatus of claim 1, wherein the central control circuit instructs installation of acoustic sensor arrays in the occupant zones and/or acoustic zones according to the following further parameters:
if a height of a ceiling in an occupant zone or acoustic zone is equal to or lower than about 2.7 m, an acoustic sensor array is mounted on a ceiling of the occupant zone or acoustic zone, and
if a height of a ceiling in an occupant zone or acoustic zone is greater than about 2.7 m, an acoustic sensor array is suspended from a ceiling of the occupant zone or acoustic zone at a height of about 2.7 m.

8. The apparatus of claim 7, wherein acoustic sensor arrays are installed at least 1.5 m away from any HVAC ducts, inlets, outlets, and windows in the occupant zones and/or acoustic zones.

9. The apparatus of claim 7, wherein acoustic sensor arrays are installed at least about 0.6 m away from a reflective surface in the occupant zones and/or acoustic zones.

10. The apparatus of claim 7, wherein acoustic sensor arrays are installed at least about 1.2 m away from two intersecting reflective surfaces in the occupant zones and/or acoustic zones.

11. The apparatus of claim 7, wherein acoustic sensor arrays are installed at least about 2.4 m away from three intersecting reflective surfaces in the occupant zones and/or acoustic zones.

12. The apparatus of claim 7, wherein if the central control circuit determines that an acoustic sensor array cannot be mounted on or suspended from a ceiling in the occupant zone or acoustic zone, the central control circuit instructs installation of the acoustic sensor array at a height of about 1.2 m in the occupant zone or acoustic zone.

13. The apparatus of claim 1, wherein the occupant zones include one or more psychological partitions defined by activities performed by occupants of the built structure.

14. A method for monitoring acoustic parameters in a habitable environment, the method comprising:
- delineating occupant zones in a built structure based on an electronic floor plan;
- delineating acoustic zones within one or more of the occupant zones based on the electronic floor plan;
- installing a plurality of acoustic sensors according to the following parameters:
  - if the plurality of acoustic sensors available is less than a total of the occupant zones, installing one of the plurality of acoustic sensors in occupant zones having a highest frequency of use, and
  - if the plurality of acoustic sensors available is equal to or greater than a total of the occupant zones, installing at least one of the plurality of acoustic sensors in each occupant zone, and installing one or more additional acoustic sensors in occupant zones with more than one delineated acoustic zone based on an identified order of preference; and
- operating an acoustic control system according to readings from the plurality of acoustic sensors in the occupant zones and/or acoustic zones.

15. The method of claim 14, wherein each acoustic zone is identified as one of:
- deskbound/interactive; deskbound/concentrative; internally-mobile/interactive; internally-mobile/concentrative; externally-mobile/interactive; and externally-mobile/concentrative; and
- the identified order of preference comprises: deskbound/interactive first, deskbound/concentrative second, internally-mobile/interactive third, internally-mobile/concentrative fourth, externally-mobile/interactive fifth, and externally-mobile/concentrative sixth.

16. The method of claim 14, further comprising installing the plurality of acoustic sensors in the occupant zones and/or acoustic zones according to the following further parameters:
- if a height of a ceiling in an occupant zone or acoustic zone is equal to or lower than about 2.7 m, at least one of the plurality of acoustic sensors is mounted on a ceiling of the occupant zone or acoustic zone, and
- if a height of a ceiling in an occupant zone or acoustic zone is greater than about 2.7 m, at least one of the plurality of acoustic sensors is suspended from a ceiling of the occupant zone or acoustic zone at a height of about 2.7 m.

17. The method of claim 14, wherein the plurality of acoustic sensors is installed at least 1.5 m away from any HVAC ducts, inlets, outlets, and windows in the occupant zones and/or acoustic zones.

18. The method of claim 14, wherein the plurality of acoustic sensors is installed at least about 0.6 m away from a reflective surface in the occupant zones and/or acoustic zones.

19. The method of claim 14, wherein the plurality of acoustic sensors is installed at least about 1.2 m away from two intersecting reflective surfaces in the occupant zones and/or acoustic zones.

20. The method of claim 14, wherein the plurality of acoustic sensors is installed at least about 2.4 m away from three intersecting reflective surfaces in the occupant zones and/or acoustic zones.

21. The method of claim 14, further comprising determining that at least one of the plurality of acoustic sensors cannot be mounted on or suspended from a ceiling in an occupant zone or an acoustic zone, and installing the at least one of the plurality of acoustic sensors at a height of about 1.2 m in the occupant zone or acoustic zone.

* * * * *